United States Patent
Jenkins et al.

(10) Patent No.: US 11,851,874 B2
(45) Date of Patent: Dec. 26, 2023

(54) INTERLOCKING GYPSUM BUILDING SURFACE PRODUCTS, METHODS OF MANUFACTURE, AND INTERLOCKING GYPSUM BUILDING SURFACE SYSTEMS

(71) Applicant: CertainTeed Gypsum, Inc., Malvern, PA (US)

(72) Inventors: Robert L. Jenkins, Honey Brook, PA (US); Garrett Loomis, Newton, MA (US); Kim Dupont-Madinier, Somerville, MA (US); Brock Jacobites, Northboro, MA (US); David Knutson, Lunenburg, MA (US); James Dimitrakopoulos, Conshohocken, PA (US); Stephen W. Reynolds, Malvern, PA (US); Douglas J. Wambaugh, Bend, OR (US); Rachel Z. Pytel, Newton, MA (US); Dennis Michaud, Groton, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 371 days.

(21) Appl. No.: 16/931,978

(22) Filed: Jul. 17, 2020

(65) Prior Publication Data
US 2021/0017764 A1    Jan. 21, 2021

Related U.S. Application Data

(60) Provisional application No. 63/037,485, filed on Jun. 10, 2020, provisional application No. 62/875,238, filed on Jul. 17, 2019.

(51) Int. Cl.
E04C 2/04 (2006.01)
C04B 14/38 (2006.01)
(Continued)

(52) U.S. Cl.
CPC .............. *E04C 2/043* (2013.01); *C04B 14/38* (2013.01); *C04B 28/14* (2013.01); *C04B 2111/0062* (2013.01)

(58) Field of Classification Search
None
See application file for complete search history.

(56) References Cited

U.S. PATENT DOCUMENTS 3,444,657 A   5/1969   Swanson
3,576,091 A   4/1971   Smith et al.
(Continued)

FOREIGN PATENT DOCUMENTS

CA   995871 A    8/1976
CA   1329690 C   5/1994
(Continued)

OTHER PUBLICATIONS

International Preliminary Report on Patentability and Written Opinion of International Patent Application No. PCT/US2020/042501, dated Jan. 18, 2022.

*Primary Examiner* — Jeffrey D Washville
(74) *Attorney, Agent, or Firm* — McDonnell Boehnen Hulbert & Berghoff LLP

(57) ABSTRACT

The present disclosure relates generally to building surface products, for example, panels suitable for forming a building surface. The present disclosure relates more particularly to a building surface product including a gypsum panel with an upper edge that overlaps a lower edge of a neighboring gypsum panel.

22 Claims, 31 Drawing Sheets

(51) Int. Cl.
*C04B 28/14* (2006.01)
*C04B 111/00* (2006.01)

(56) References Cited

U.S. PATENT DOCUMENTS

| | | | |
|---|---|---|---|
| 3,741,843 A | 6/1973 | Louis | |
| 4,157,271 A | 6/1979 | Moore | |
| 4,313,991 A | 2/1982 | Lamb | |
| 5,333,433 A | 8/1994 | Porambo et al. | |
| 6,202,377 B1 | 3/2001 | Krieger | |
| 6,226,957 B1 | 5/2001 | Stough | |
| 6,413,606 B1 | 7/2002 | Calderon | |
| 8,707,648 B2 | 4/2014 | Timko et al. | |
| 8,871,326 B2 | 10/2014 | Flennert | |
| 9,068,358 B2 | 6/2015 | Macdonald | |
| 9,080,331 B2 | 7/2015 | Aboukhalil | |
| 10,208,476 B2 | 2/2019 | Van Rijsingen | |
| 2004/0071933 A1 | 4/2004 | McConnell et al. | |
| 2005/0193666 A1 | 9/2005 | McConnell et al. | |
| 2006/0070331 A1 | 4/2006 | Yakobics | |
| 2009/0077922 A1* | 3/2009 | Pettine | E04F 19/062 |
| | | | 52/741.1 |
| 2009/0084055 A1* | 4/2009 | Mangiardi | E04F 13/083 |
| | | | 52/630 |
| 2009/0241444 A1 | 10/2009 | Griffiths | |
| 2011/0192519 A1 | 8/2011 | Gangl | |
| 2016/0201325 A1* | 7/2016 | Moore | E04C 2/30 |
| | | | 52/220.8 |
| 2018/0283002 A1 | 10/2018 | Tanguay et al. | |

FOREIGN PATENT DOCUMENTS

| | | |
|---|---|---|
| CA | 3051808 A1 | 9/2018 |
| CN | 201310169 Y | 9/2009 |
| CN | 103924762 A | 7/2014 |
| CN | 204001571 U | 12/2014 |
| CN | 204040216 U | 12/2014 |
| CN | 104831895 A | 8/2015 |
| CN | 105308246 A | 2/2016 |
| DE | 202010005397 U1 | 7/2010 |
| DE | 102018008489 A1 | 5/2019 |
| JP | H0932195 A | 2/1997 |
| WO | 2012/152994 A1 | 11/2012 |
| WO | 2015/057732 A1 | 11/2016 |

* cited by examiner

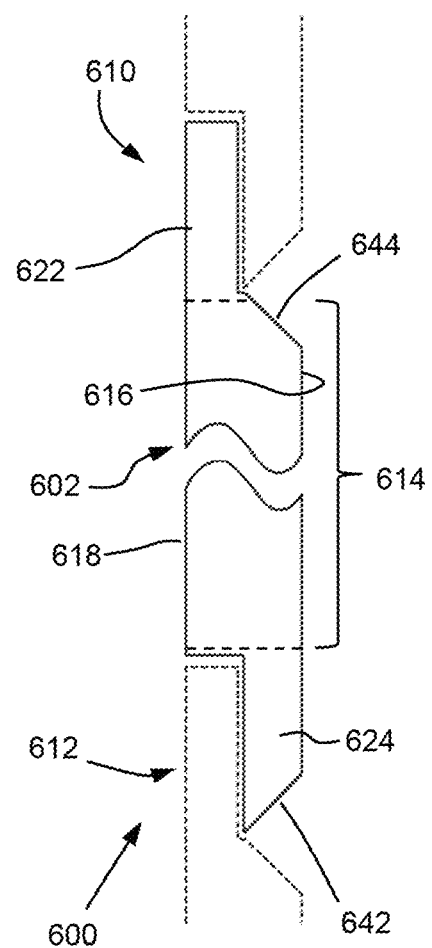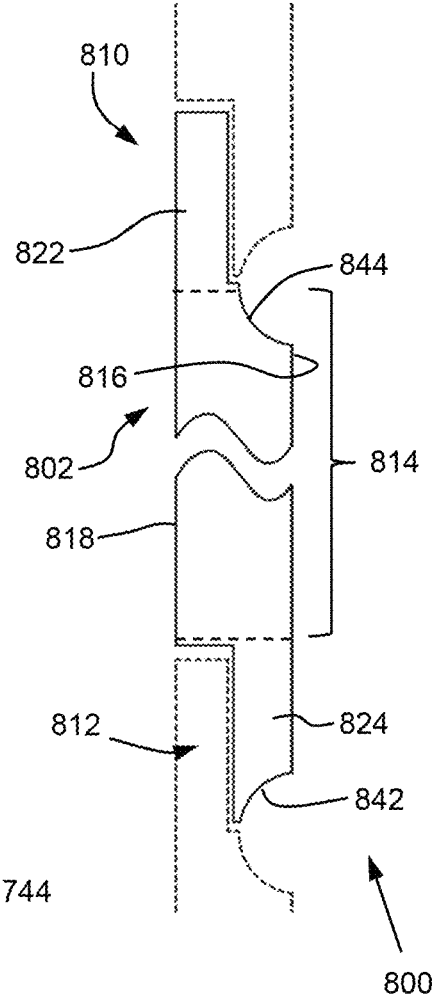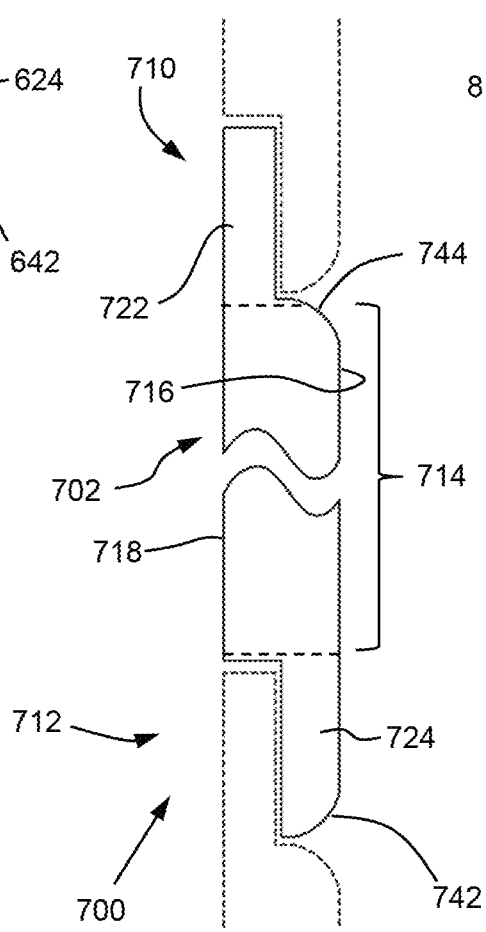
FIG. 6
FIG. 7
FIG. 8

INTERLOCKING GYPSUM BUILDING SURFACE PRODUCTS, METHODS OF MANUFACTURE, AND INTERLOCKING GYPSUM BUILDING SURFACE SYSTEMS

CROSS-REFERENCE TO RELATED APPLICATIONS

This application claims the benefit of priority of U.S. Provisional Patent Application 62/875,238, filed Jul. 17, 2019, and of U.S. Provisional Patent Application No. 63/037,485, filed Jun. 10, 2020, each of which is hereby incorporated herein by reference in its entirety.

BACKGROUND OF THE DISCLOSURE

1. Field of the Disclosure

The present disclosure relates generally to building surface products, for example, panels suitable for forming a building surface. The present disclosure relates more particularly to building surface products having overlapped edges.

2. Technical Background

Prefabricated panels, for example gypsum wallboards that are commonly referred to as drywall, are often used to construct building surfaces. The wallboards are attached to a supporting structure, such as the joists of a wall frame. Once the wallboards are hung on the supporting structure, the wall is finished using joint compound or another material to create a smooth surface. The wall may then be painted or covered with wall paper.

Gypsum wallboards are advantageous for use as a building surface for various reasons. Such wallboards are incredibly durable, have excellent fire resistance, are easily repaired, and are easy to mount on a supporting structure. Typically, mounting gypsum wallboard panels only requires attaching the wallboards to an underlying supporting structure using mechanical fasteners, such as screws.

While the mounting of gypsum wallboards is relatively easy, most wallboard panels are finished by covering the joints between the panels and the fasteners in order to create a smooth surface. The wallboards are then painted or covered with wall paper to create a pleasing aesthetic. The process of finishing the building surface is time consuming, as each application of joint compound or paint should be dried before the subsequent step can be performed. Moreover, the finishing steps require uncommon skills. Accordingly, the present inventors have determined that a building surface formed of gypsum-based products that are constructed without requiring timely finishing would be attractive to both builders and customers.

SUMMARY OF THE DISCLOSURE

In one aspect, the present disclosure provides an interlocking building surface product comprising:
a substantially planar gypsum panel having an upper edge, a lower edge, and two ends, wherein the gypsum panel includes:
 a body comprising a front face, a rear face, and a thickness between the front face and the rear face;
 an upper interlocking structure disposed at the upper edge of the gypsum panel, the upper interlocking structure including a first upper projection extending upward from the body and having a thickness that is smaller than the thickness of the body; and
 a lower interlocking structure disposed at the lower edge of the gypsum panel, the lower interlocking structure including a first lower projection extending downward from the body and having a thickness that is smaller than the thickness of the body, and
wherein the upper interlocking structure and lower interlocking structure are configured to cooperate with neighboring gypsum panels so as to form a building surface.

In another aspect, the disclosure provides a method of making an interlocking building surface product according to the disclosure, the method comprising:
forming the substantially planar gypsum panel with the upper edge, the lower edge, the upper interlocking structure disposed at the upper edge, the lower interlocking structure disposed at the lower edge, and the two ends.

In another aspect, the disclosure provides an interlocking building surface system comprising:
a plurality of building surface products according to the disclosure secured to a support structure and arranged so as to provide a building surface,
wherein the plurality of building surface products includes a first building surface product with an upper interlocking structure coupled to a lower interlocking structure of a second building surface product.

In another aspect, the disclosure provides a fastenable building surface product comprising:
a substantially planar gypsum panel having a first edge, a second edge, and two ends, wherein the gypsum panel includes:
 a body comprising a front face, a rear face, and a thickness between the front face and the rear face, and
 a first lapping projection extending outward from the body at the second edge, the first lapping projection being configured to overlap a portion of a neighboring gypsum panel so as to form a building surface; and
a first press-on connector disposed on the rear face of the body toward the first edge of the gypsum panel, the press-on connector being configured to engage a corresponding second press-on connector.

In another aspect, the disclosure provides a method of making a fastenable building surface product according to the disclosure, the method comprising:
forming the substantially planar gypsum panel with the first edge, the second edge, first lapping projection extending outward from the body at the second edge, and the two ends;
attaching the first press-on connector to the rear face of the body of the gypsum panel.

In another aspect, the disclosure provides a method of making a fastenable building surface system comprising:
a support structure;
a plurality of second press-on connectors disposed on a front side of the support structure, and
a plurality of building surface products of the disclosure secured to the support structure and arranged so as to provide a building surface,
wherein the first press-on connector of each building surface product is coupled to at least one of the second press-on connectors, and wherein the first edge of the gypsum panel of each building surface product overlaps the first lapping projection of a neighboring building surface product.

In another aspect, the present disclosure provides a joint support configured to cover a joint between coplanar wall panels, the joint support comprising:
an elongate support strip including a first end, a second end, a first side edge, a second side edge, an inner surface, and an outer surface; and
a facing sheet secured to the outer surface of the support strip, the facing sheet including:
a first flap extending laterally beyond the first side edge of the support strip,
a second flap extending laterally beyond the second side edge of the support strip, and
a first adhesive disposed on an inside surface of the first flap and an inside surface of the second flap.

In another aspect, the disclosure provides a joint supported wall construction comprising:
a first wall panel;
a second wall panel adjacent to and substantially coplanar with the first wall panel forming a seam between the between the first wall panel and the second wall panel;
a joint support according to the disclosure disposed over the first wall panel and the second wall panel and covering at least a portion of the seam.

In another aspect, the disclosure provides a method of installing the joint support of the disclosure on a joint between two substantially coplanar wall panels so as to form the joint supported wall panel construction of the disclosure, the method comprising:
placing the joint support over first and second wall panels that are substantially coplanar so as to cover at least a portion of a seam between the first and second wall panels and with the inner surface of the support strip of the joint support adjacent to a surface of the wall panels;
securing the joint support to the wall panels by adhering the first flap of the facing sheet of the joint support to the first wall panel and adhering the second flap of the facing sheet of the joint support to the second wall panel.

In another aspect, the disclosure provides an overlapping wall panel construction comprising:
a first wall panel having a front face, a rear face, a first edge, a second edge, and a rear projection along the first edge that is coextensive with the rear face and extends past the front face, wherein the rear projection of the first wall panel includes a front-facing attachment surface;
a second wall panel having a front surface, a rear, surface, a first edge, a second edge, and a front projection along the second edge that is coextensive with the front face and extends past the rear face, wherein the front projection of the second wall panel includes a rear-facing attachment surface and overlaps the rear projection of the first wall panel so as to form an overlapping joint and an interface between the front-facing attachment surface of the first wall panel and the rear-facing attachment surface of the front projection of the second wall panel; and
an adhesive disposed in the interface and bonding the front projection of the second wall panel to the rear projection of the first wall panel.

In another aspect, the disclosure provides a method of installing an overlapping wall panel construction according to the disclosure, the method comprising:

placing the first wall panel adjacent to and coplanar with the second wall panel with the front projection of the second wall panel overlapping the rear projection of the first wall panel so as to form an overlapping joint and an interface between the front-facing attachment surface of the first wall panel and the rear-facing attachment surface of the front projection of the second wall panel;
providing adhesive in the interface.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

FIG. 6 is a side view of an interlocking building surface product according to yet another embodiment of the disclosure;

FIG. 7 is a side view of an interlocking building surface product according to another embodiment of the disclosure;

FIG. 8 is a side view of an interlocking building surface product according to still another embodiment of the disclosure;

DETAILED DESCRIPTION

As described above, the present inventors have noted that conventional building surfaces formed of gypsum products involve extensive finishing to meet customer expectations. The present inventors have determined that a building surface formed of gypsum-based products that are constructed without requiring timely finishing would be attractive to both builders and customers.

Accordingly, one aspect of the disclosure is an interlocking building surface product including a substantially planar gypsum panel having an upper edge, a lower edge, and two ends. The gypsum panel includes a body comprising a front face, a rear face, and a thickness between the front face and the rear face. An upper interlocking structure is disposed at the upper edge of the gypsum panel and a lower interlocking structure is disposed at the lower edge of the gypsum panel. The upper interlocking structure includes a first upper projection that extends upward from the body of the gypsum panel and has a thickness that is smaller than the thickness of the body. Likewise, the lower interlocking structure includes a first lower projection that extends downward from the body and has a thickness that is smaller than the thickness of the body. The upper interlocking structure and the lower interlocking structure are configured to cooperate with neighboring gypsum panels so as to form a building surface.

Figure 1:
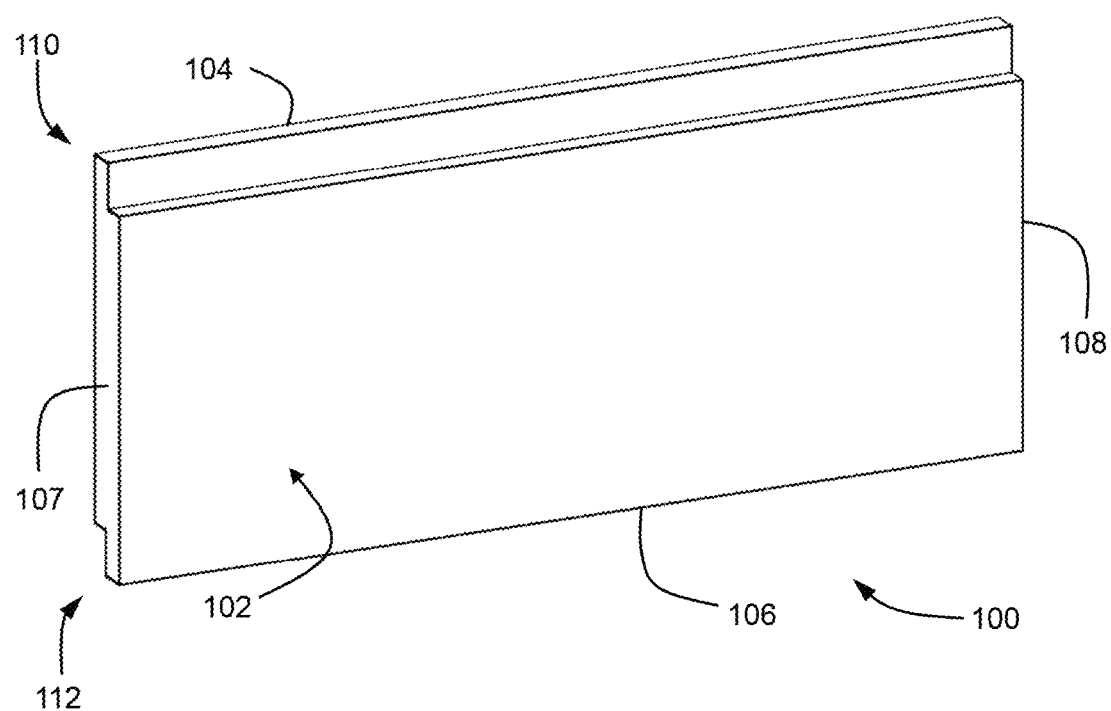
FIG. 1 is a schematic perspective view of an interlocking building surface product according to an embodiment of the disclosure.

Such a building surface product is shown in perspective view in FIG. 1. Building surface product 100 includes a gypsum panel 102 that is substantially planar and has an upper edge 104, a lower edge 106, a first end 107, and a second end 108. The term planar, as used herein, refers to a panel in which a plane can pass through the entirety of the panel from one end to the other. Thus, the surfaces of a planar panel are not required to be entirely flat, so long as the shape of the panel follows a plane. The term substantially planar refers to a shape that bows along its length or width to an extent of no more than 5 degrees. In some embodiments of the present disclosure, the building surface product is substantially planar, and in some embodiments the building surface product is planar. Still, in other embodiments, the building surface curves along its length to a greater extent than 5 degrees.

Gypsum panel 102 also includes an upper interlocking structure 110 disposed at the upper edge 104 thereof. Moreover, a lower interlocking structure 112 is similarly disposed at the lower edge 106 of the gypsum panel 102. Upper interlocking structure 110 and lower interlocking structure 112 are configured to cooperate with neighboring gypsum panels so as to form a building surface. For example, as explained in more detail below, the upper interlocking structure 110 of building surface product 100 may cooperate with the lower interlocking structure of a neighboring building surface product. Likewise, the lower interlocking structure 112 of building surface product 100 may cooperate with the upper interlocking structure of another neighboring building surface product. The terms upper and lower, as used herein, refer to one possible installation configuration of the building surface product on a support frame, and are used for relative directions in such a configuration. However, embodiments of the building surface product can be installed in other configurations, such as configurations in which features described as being on an upper side of the product are disposed on the bottom. Likewise, the building surface product of the disclosure can also be installed vertically, such that features described as upper and lower are disposed on the left and/or right.

Figure 2:
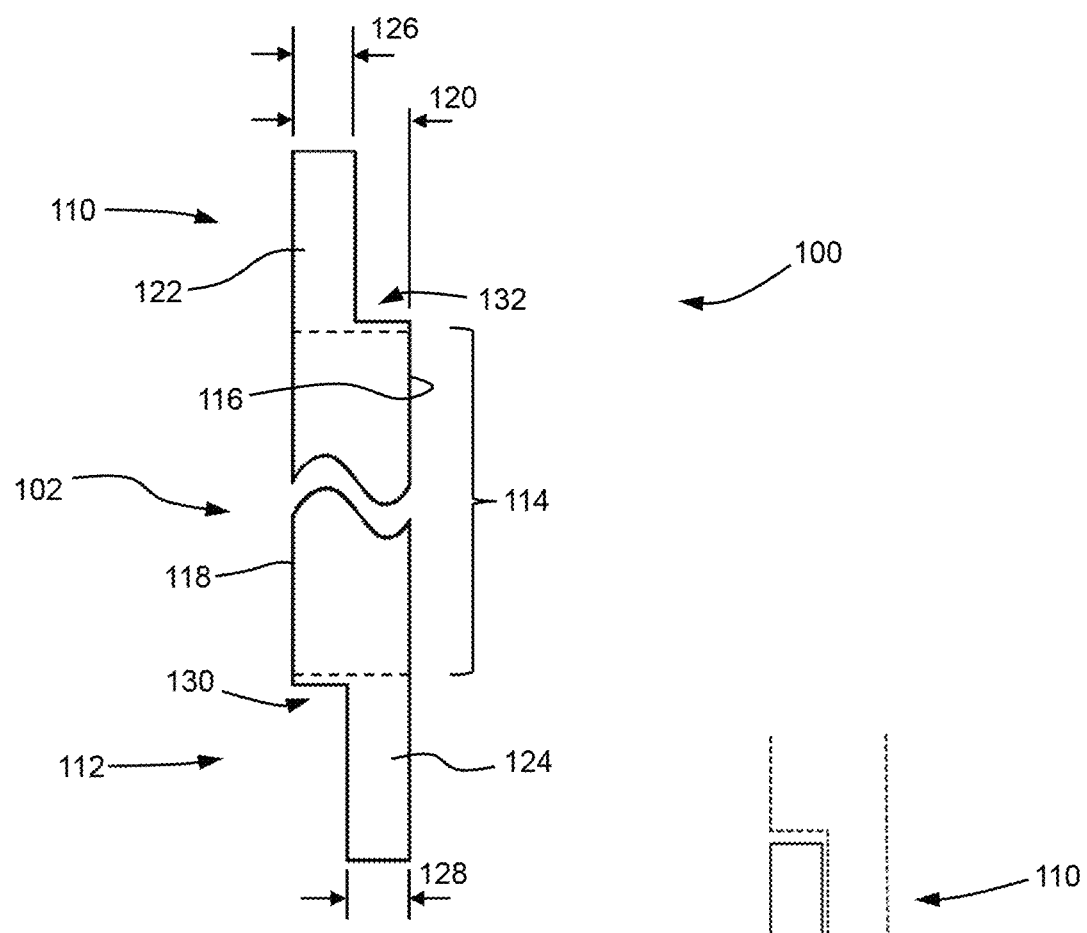
FIG. 2 is a side view of the building surface product of FIG. 1.

As shown in the side view of building surface product 100, in FIG. 2, gypsum panel 102 includes a body 114 having a front face 116 and a rear face 118. Further gypsum panel 102 has a thickness 120 that extends from front face 116 of body 114 to rear face 118 of body 114. In some embodiments, the thickness of the body is equal to the thickness of the building surface product as a whole, in other embodiments, the building surface product is thicker than the thickness of the body. Upper interlocking structure 110 includes a first upper projection 122 that extends upward from body 114 of gypsum panel 102. Similarly, lower interlocking structure 112 includes a first lower projection 124 that extends downward from body 114. The thickness of each projection is smaller than thickness 120 of the body 114 of gypsum panel 102. In particular, the thickness 126 of first upper projection 122 is smaller than thickness 120 of body 114 and thickness 128 of first lower projection 124 is smaller than thickness 120. In some embodiments, the combined thickness of the first upper projection and the first lower projection is no greater than the thickness of the body of the gypsum panel. This allows the first upper projection of one panel and the first lower projection of another panel to overlap while the body of the two panels are coplanar, as described in more detail below.

In certain embodiments of the interlocking building surface product as otherwise described herein, the gypsum panel comprises a reinforced gypsum material. In some embodiments, the gypsum panel includes at least 1% by weight polymer. Reference to the weight percentage of a component of the gypsum panel, as used herein, refers to the weight after the gypsum has set. In certain embodiments, the polymer includes starch and/or polyvinyl acetate.

In certain embodiments of the interlocking building surface product as otherwise described herein, the gypsum panel includes at least 1% by weight of reinforcing fibers. For example, in some embodiments, the gypsum panel includes glass fibers. Further, in some embodiments, the gypsum panel includes cellulose-based fibers. Moreover, in some embodiments, the gypsum panel includes polyethylene, polypropylene or polyester fibers. Various embodiments of the building surface product include different combinations of the aforementioned fibers in the gypsum panel.

In some embodiments, the gypsum panel includes one or more additives, such as biocides, hydrophobic additives, and fire resistance additives.

In certain embodiments of the interlocking building surface product as otherwise described herein, the first lower projection is coextensive with the front face of the body. For example, in building surface product 100 first lower projection 124 extends downward from body 114 at the front face 116 of body 114, such that the front surface of first lower projection 124 is flush with front face 116. Accordingly, the lower projection 124 forms an extension of body 114 along front face 116, forming a continuous surface between body 114 and first lower projection 124.

Figure 3:
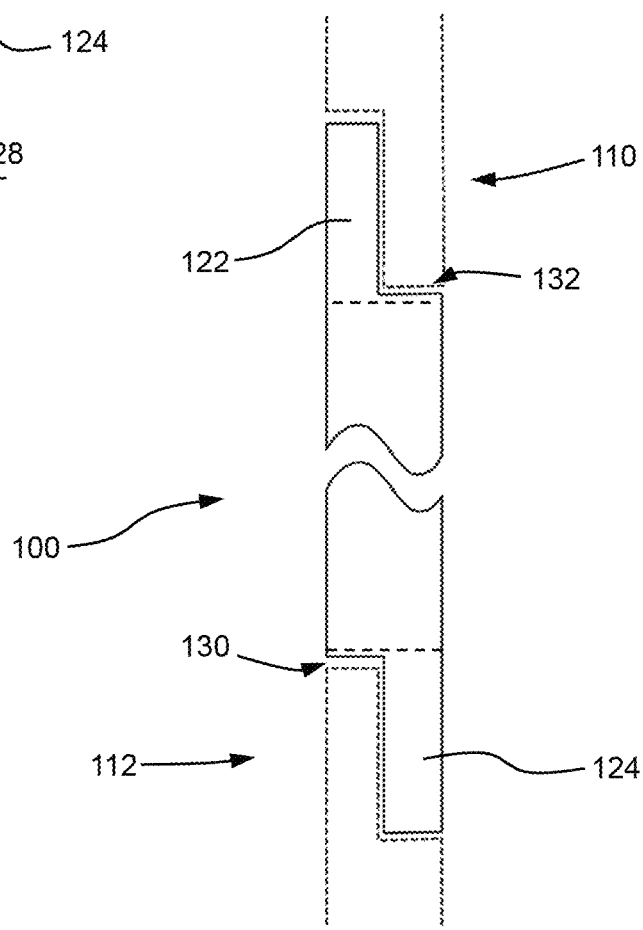
FIG. 3 is another side view of the building surface product of FIG. 1 coupled to neighboring building surface products.

In certain embodiments of the interlocking building surface product as otherwise described herein, the lower interlocking structure includes a lower recess formed next to the first lower projection, and the first upper projection is configured to fit in the lower recess of a neighboring building surface product. For example, in building surface product 100, lower interlocking structure 112 includes a lower recess 130 adjacent to first lower projection 124. As shown in FIG. 3, the first upper projection of a neighboring building surface product of similar configuration is configured to fit in the lower recess 130 of interlocking structure 112. As a result, lower interlocking structure 112 overlaps and cooperates with the corresponding upper interlocking structure of the neighboring building surface product.

In certain embodiments of the interlocking building surface product as otherwise described herein, the first upper projection is coextensive with the rear face of the body. For example, as shown in FIG. 2, the first upper projection extends upward from body 114 at the rear face 118 of body 114, such that the rear surface of first upper projection 122 is flush with rear face 118. This allows upper projection 122 and rear face 118 of body 114 form flat surface for bracing against a support frame, as explained in more detail below. In particular, the upper projection 122 and rear face 118 are coextensive and form a continuous surface between body 114 and first upper projection 122.

In some embodiments of the interlocking building surface product as otherwise described herein, the upper interlocking structure 110 includes an upper recess formed next to the first upper projection, and the first lower projection is configured to fit into the upper recess of a neighboring building surface product. For example, in building surface product 100, upper interlocking structure 110 includes an upper recess 132, similar to lower recess 130, that is adjacent to first upper projection 122. As shown in FIG. 3, the first lower projection of a neighboring building surface product is configured to fit in the upper recess 132 of interlocking structure 110. As a result, upper interlocking structure 110 overlaps and cooperates with the corresponding lower interlocking structure of the neighboring building surface product.

Figure 4:
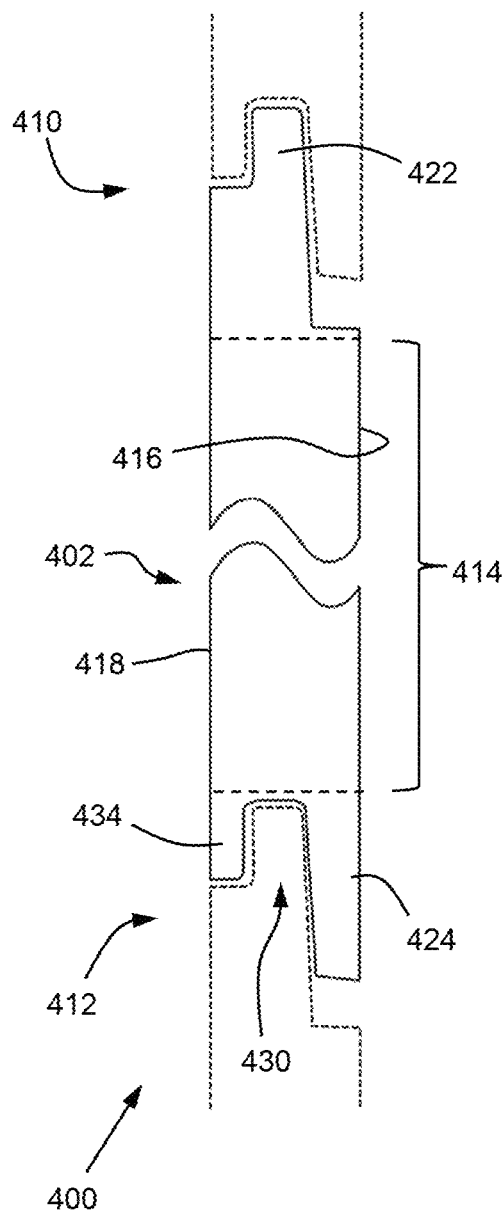
FIG. 4 is side view of an interlocking building surface product according to another embodiment of the disclosure.

In certain embodiments of the interlocking building surface product as otherwise described herein, the lower interlocking structure includes a second lower projection adjacent the rear face of the body, and wherein the lower recess is in the form of a lower groove disposed between the first lower projection and the second lower projection. An example of such a building surface product is shown in FIG. 4. Building surface product 400 includes a gypsum panel 402 that has a body 414, which includes a front face 416 and a rear face 418. An upper interlocking structure 410 is disposed above body 414 and a lower interlocking structure 412 is disposed below body 414. The lower interlocking structure 412 includes a first lower projection 424 extending downward from body 414 that is adjacent to and coextensive with front face 416 of body 414. In addition, lower interlocking structure 412 also includes a second lower projection 434 that is adjacent to rear face 418 of body 414. A gap is provided between first lower projection 424 and second lower projection 434 to provide a lower recess 430 in the form of a groove. In order to interlock with a neighboring building surface product, the groove 430 provided between first lower projection 424 and second lower projection 434 is configured to receive an upwardly extending projection of a neighboring building surface product.

In certain embodiments of the interlocking building surface product as otherwise described herein, the first upper projection is disposed between the front face and the rear face and forms a tongue configured for insertion into the groove of a neighboring building surface product. For example, building surface product 400, shown in FIG. 4, includes an upper interlocking structure 410 that has a first upper projection 422 positioned between the front face 416 and rear face 418 of body 414 of gypsum panel 402. First upper projection 422 is specifically configured as a tongue to fit into a groove of a neighboring building surface product. In particular, the first upper projection 422 of upper interlocking structure 410 is configured so as to cooperate with the recess 430 of lower interlocking structure 412 and be received therein. Thus, a series of building surface products all having the same configuration as that of building surface product 400 can form a building surface wherein the upper interlocking structure of each gypsum panel fits into the lower interlocking structure of a neighboring gypsum panel.

Figure 5:
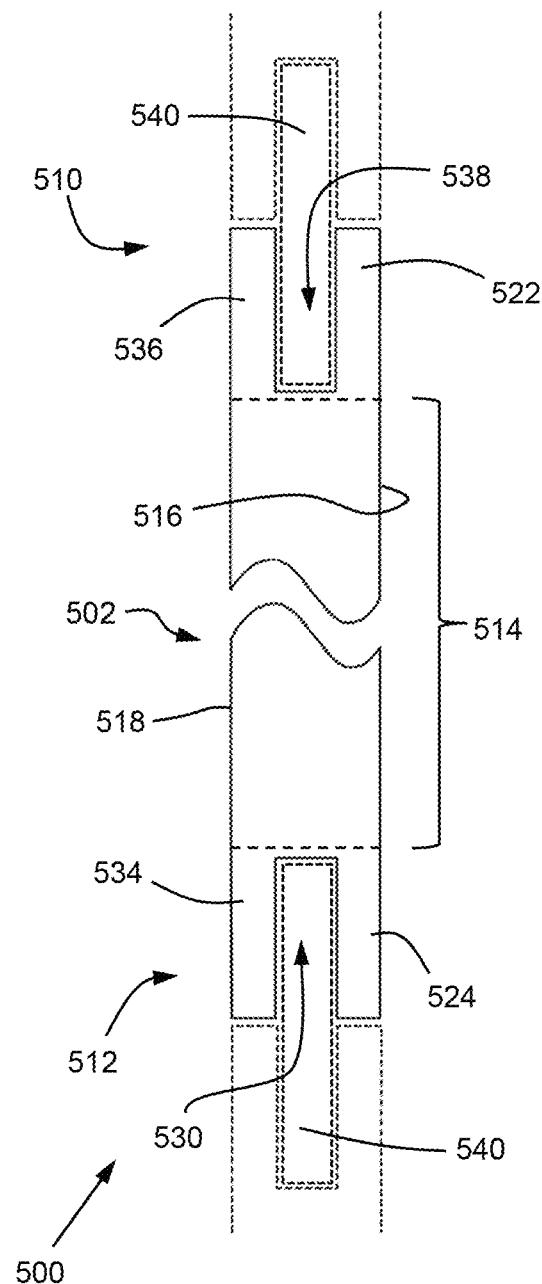
FIG. 5 is a side view of an interlocking building surface product according to another embodiment of the disclosure.

In certain embodiments of the interlocking building surface product as otherwise described herein, the upper interlocking structure includes a second upper projection, wherein an upper groove is disposed between the first upper projection and the second upper projection, and wherein the upper groove and the lower groove are each configured to receive an insert that cooperates with a corresponding groove of a neighboring building surface product. Such a building surface product is shown in FIG. 5. Building surface product 500 includes a gypsum panel 502 that has a body 514, which includes a front face 516 and a rear face 518. An upper interlocking structure 510 is disposed above body 514 and a lower interlocking structure 512 is disposed below body 514. The lower interlocking structure 512 includes a first lower projection 524 extending downward from body 514 that is adjacent to and coextensive with front face 516 and a second lower projection 534 that is adjacent to rear face 518 of body 514. A lower recess 530 in the form of a groove is formed between first lower projection 522 and second lower projection 534. Upper interlocking structure 510 has a similar configuration as lower interlocking structure 512 and includes a first upper projection 522 extending upward from body 514 that is adjacent to and coextensive with front face 516 and a second upper projection 536 that is adjacent to rear face 518 of body 514. An upper recess 538 in the form of a groove is formed between first upper projection 522 and second upper projection 536.

Each of the upper interlocking structure 510 and lower interlocking structure 512 are configured to receive an insert, such as insert 540, in the respective upper recess 538 and lower recess 530. Accordingly, neighboring building surface products having a configuration similar to that of building surface product 500 connect to one another using the upper interlocking structure and lower interlocking structure via an insert disposed in the adjacent recesses. In some embodiments, the recesses of adjacent building surface products are aligned such that the insert may be a straight plank. In other embodiments, the recesses are offset or have complex shapes, and the insert has a corresponding shape configured to be received in the recesses of two neighboring building surface products. In some embodiments, the upper and lower recesses extend along the entire length of the building surface product, and the insert likewise extends across all or a substantial majority of the building surface product. In other embodiments, the upper and lower recesses are intermittently positioned along the length of the building surface product, and one or more inserts are positioned therein to connect neighboring building surface products.

In certain embodiments of the interlocking building surface product as otherwise described herein, the first lower projection has a chamfered edge. For example, such a building surface product is shown in FIG. 6. Building surface product 600 includes a gypsum panel 602 that has a body 614, which includes a front face 616 and a rear face 618. An upper interlocking structure 610 is disposed above body 614 and a lower interlocking structure 612 is disposed below body 614. Upper interlocking structure 610 includes a first upper projection 622 and lower interlocking structure 612 includes a first lower projection 624. The lower end of first lower projection 624 has an angled surface 642 that forms a chamfered edge on first lower projection 624.

In certain embodiments of the interlocking building surface product as otherwise described herein, the first lower projection has a rounded edge. For example, such a building surface product is shown in FIG. 7 and FIG. 8. Building surface product 700 includes a gypsum panel 702 that has a body 714, which includes a front face 716 and a rear face 718. An upper interlocking structure 710 is disposed above body 714 and a lower interlocking structure 712 is disposed below body 714. Upper interlocking structure 710 includes a first upper projection 722 and lower interlocking structure 712 includes a first lower projection 724. The lower end of first lower projection 724 has a convex curved surface 742 that forms a rounded edge on first lower projection 724. Similarly, building surface product 800 includes a gypsum panel 802 that has a body 814, which includes a front face 816 and a rear face 818. An upper interlocking structure 810 is disposed above body 814 and a lower interlocking structure 812 is disposed below body 814. Upper interlocking structure 810 includes a first upper projection 822 and lower interlocking structure 812 includes a first lower projection 824. The lower end of first lower projection 824 has a concave curved surface 842 that forms a rounded edge on first lower projection 824.

In certain embodiments of the interlocking building surface product as otherwise described herein, the upper side of the body has a chamfered edge. For example, building surface product 600 includes an angled surface extending from front face 616 of body 614 toward first upper projection 622 that forms a chamfered edge 644.

In certain embodiments of the interlocking building surface product as otherwise described herein, the upper side of the body has a rounded edge. For example, building surface product 700 includes a convex curved surface extending from front face 716 of body 714 toward first upper projection 722 that forms a rounded edge 744. Similarly, building surface product 800 includes a concave curved surface extending from front face 816 toward first upper projection 822 that forms a rounded edge 844. While building surface product 600 includes chamfered edges 642, 644 toward both the top and bottom of front face 616, building surface product 700 includes convex rounded edges 742, 744 toward both the top and bottom of front face 716, and building surface product 800 includes concave rounded edges 842, 844 toward both the top and bottom of front face 816, in other embodiments, the building surface product may include a chamfered edge combined with a rounded edge, or a concave rounded edge combined with a convex rounded edge. Likewise, in some embodiments, the building surface product includes a straight edge combined with a rounded or chamfered edge. Other combinations and edges are also possible.

Figure 9:
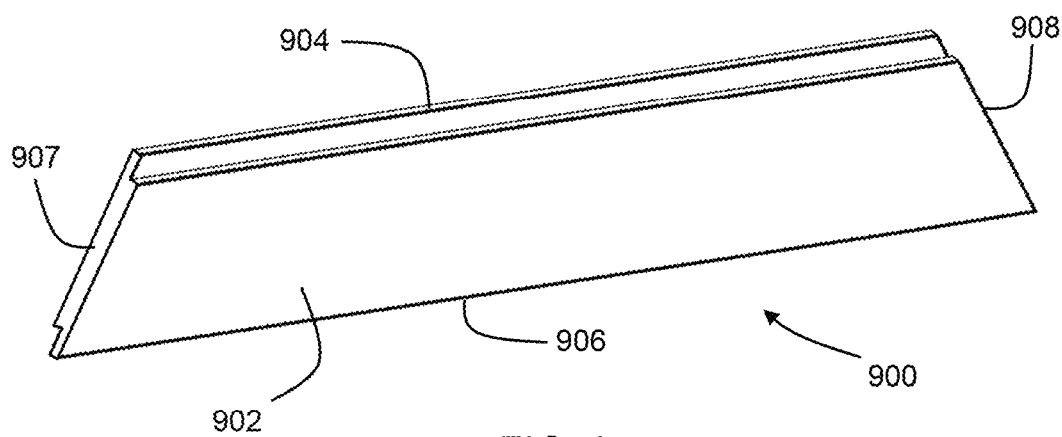
FIG. 9 is a perspective view of an interlocking building surface product according to another embodiment of the disclosure.

In certain embodiments of the interlocking building surface product as otherwise described herein, the ends are perpendicular to the upper edge and the lower edge. For example, building surface product 100, shown in FIGS. 1 and 2, has a rectangular shape, and ends 107 and 108 are perpendicular to upper edge 104 and lower edge 106. In other embodiments, the ends are disposed at an angle to the upper edge and lower edge. The phrase "at an angle" as used herein, refers to an angle that is at least 3 degrees from parallel (0 degrees) or perpendicular (90 degrees). In some embodiments, the angle is in a range of 30 degrees to 80 degrees. For example, building surface product 900, shown in FIG. 9, includes a gypsum panel 902 that is substantially planar and has an upper edge 904, a lower edge 906, a first end 907, and a second end 908. Each of the first end 907 and second end 908 are disposed at an angle to the upper edge 904 and lower edge 906. In particular, first end 907 intersects upper edge 904 and lower edge 906 at an angle of about 60 degrees. Likewise, second end 908 intersects upper edge 904 and lower edge 906 at an angle of about 60 degrees. While the corners of the gypsum panel 902 are obtuse at the upper edge 904 and acute at the lower edge 906, in other embodiments, the corners are obtuse at the lower edge and acute at the upper edge. Further, in some embodiments, respective corners at the upper edge are obtuse and acute and respective corners at the lower edge are also obtuse and acute, such that the gypsum panel is in the shape of a parallelogram.

Figure 10:
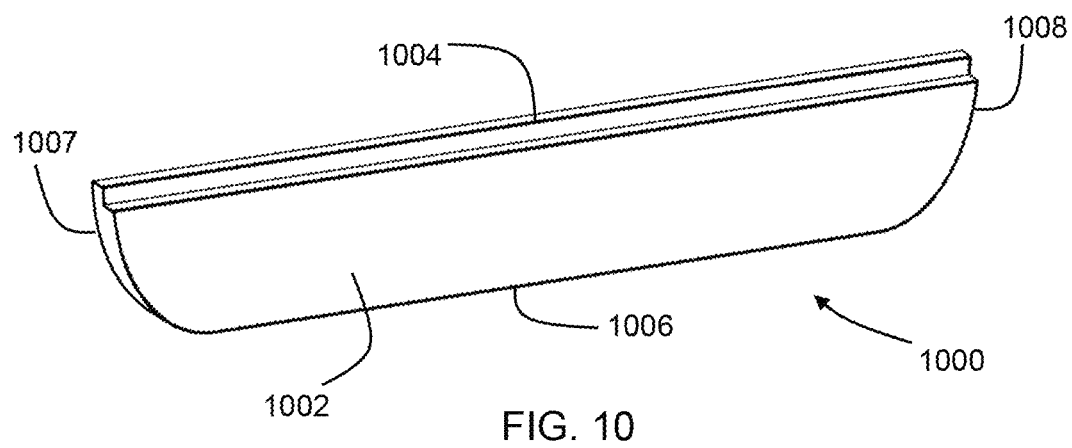
FIG. 10 is a perspective view of an interlocking building surface product according to yet another embodiment of the disclosure.

In certain embodiments of the interlocking building surface product as otherwise described herein, the ends are curved. For example, building surface product 1000, shown in FIG. 10, includes a gypsum panel 1002 that is substantially planar and has an upper edge 1004, a lower edge 1006, a first end 1007, and a second end 1008. Each of the first end 1007 and second end 1008 are curved. While the curved first and second ends 1007, 1008 of building surface product 1000 form rounded corners at lower edge 1006 and sharp corners at upper edge 1004, in other embodiments, the curved ends may form four rounded corners, or configurations of rounded and sharp corners.

Figure 11:
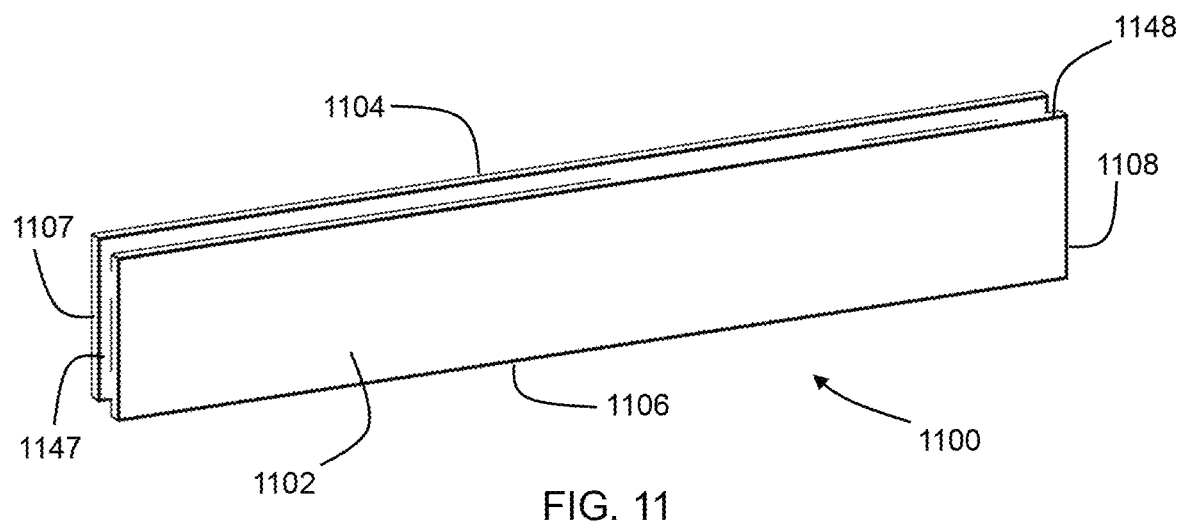
FIG. 11 is a perspective view of an interlocking building surface product according to another embodiment of the disclosure.

In certain embodiments of the interlocking building surface product as otherwise described herein, a portion of a first end of the gypsum panel is configured to overlap with a portion of a neighboring building surface product. For example, building surface product 1100, shown in FIG. 11, includes a first lateral projection 1147 at first end 1107 that is adjacent the rear face of gypsum panel 1102 and a second lateral projection 1148 at second end 1108 that is adjacent the front face of gypsum panel 1102. Thus, when building surface product 1100 is positioned laterally adjacent to a building surface product of a similar design, the second lateral projection of the neighboring product can overlap the first lateral projection 1147 of building surface product 1100 at first end 1107. Likewise, the second lateral projection 1148 can overlap a corresponding first lateral projection of a neighboring building surface product at the second end 1108 of building surface product 1100.

In certain embodiments of the interlocking building surface product as otherwise described herein, the building product further includes a facing that lines at least a portion of the gypsum panel. In some embodiments, the facing is a paper facing. In other embodiments, the facing includes reinforcing fibers. For example, in some embodiments, the facing includes a fiberglass mat. Further, in some embodiments, the gypsum product of the gypsum panel the building surface product is embedded into the facing.

In certain embodiments of the interlocking building surface product as otherwise described herein, the facing surrounds the gypsum panel along its length. For example, in some embodiments, the facing is formed from two distinct sheets that are wrapped around the gypsum panel. The facing sheets may then be attached to one another to surround the panel. In some embodiments, the facing sheets wrap around the panel along its length. The ends of the panel may then either be left uncovered or the facing sheets may also be folded over the ends.

In certain embodiments of the interlocking building surface product as otherwise described herein, the facing includes a reinforcing sheet disposed at the rear face of the gypsum panel. For example, in some embodiments, the facing includes a robust paper, board, or fiber-reinforced sheet at the rear of the gypsum panel. The reinforcing sheet may provide added strength for attaching the building surface product to a support structure. In some embodiments, the reinforcing sheet is disposed only along the rear face of the gypsum panel. For example, the reinforcing sheet may be used in combination with another facing along the front face of the gypsum panel that has a lower tear strength than the reinforcing sheet. Likewise, in some embodiments, the front face of the gypsum panel may be free of any facing, while the reinforcing sheet is disposed along the rear face of the gypsum panel.

Figure 12:
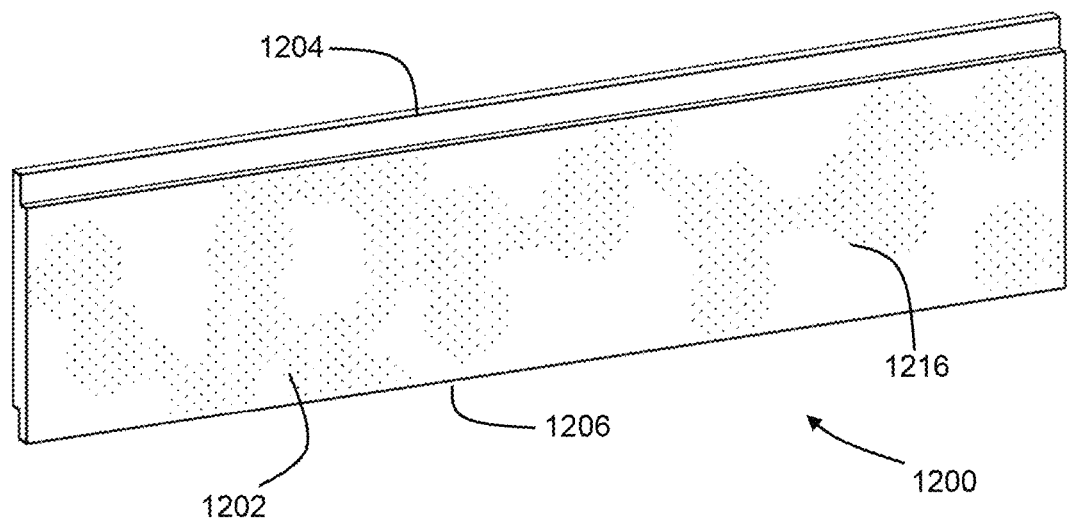
FIG. 12 is a perspective view of an interlocking building surface product according to another embodiment of the disclosure.

In certain embodiments of the interlocking building surface product as otherwise described herein, a front surface of the building surface product includes a textured surface. For example, in some embodiments, the front surface of the building surface product is sanded or roughened to provide a surface texture to the front face of the building surface product. Further, in some embodiments, a coating of a grainy or heterogeneous coating is applied to the front surface of the building surface product. For example, building surface product 1200, shown in FIG. 12, includes a heterogeneous coating applied to portions of the front face 1216 of gypsum panel 1202, which provides the front surface of the building surface product with a textured surface. The surface texture of the front face of the building surface product may provide the product with a visual appearance similar to venetian plaster or cast concrete.

Figure 13:
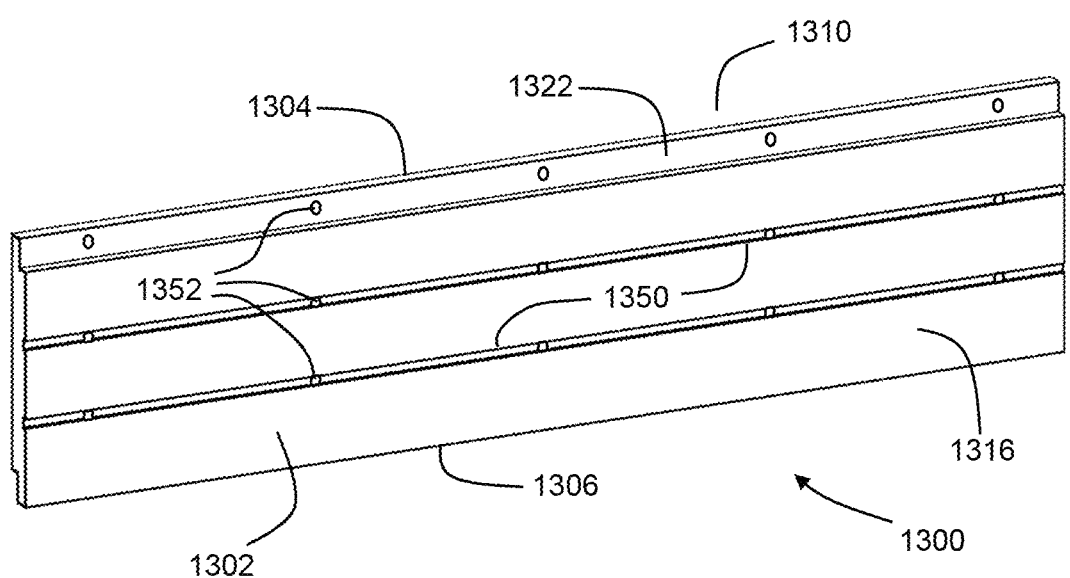
FIG. 13 is a perspective view of an interlocking building surface product according to another embodiment of the disclosure.

In certain embodiments of the interlocking building surface product as otherwise described herein, the front face of the body includes grooves along the length of the gypsum panel. For example, building surface product 1300, shown in FIG. 13, includes grooves 1350 that extend across the front surface of the building surface product 1300 parallel to the upper edge 1304 and lower edge 1306. In some embodiments, the grooves are disposed at regular intervals and provide a gap in the front face of the building surface product that is similar to the gap that is formed where two neighboring building surface products meet. Accordingly, the grooves may help obscure the location of the actual joints between adjacent building surface products.

In certain embodiments of the interlocking building surface product as otherwise described herein, the building product further includes fastener holes extending through the gypsum panel. For example, building surface product 1300 includes fastener holes 1352 that extend through the first upper projection 1322 of the upper interlocking structure 1310. By placing the fastener holes within a portion of the upper interlocking structure, the fastener holes can be obscured by the first lower projection of a neighboring building surface product that hangs over the first upper projection 1322. The building surface product 1300 also includes fastener holes 1352 through the body of the gypsum panel 1302 within grooves 1350. The fastener holes within the grooves are also obscured by their placement within the grooves, where lighting is reduced. In other embodiments, fastener holes are provided alternatively, or in addition, within the lower interlocking structure, or through the entire thickness of the gypsum panel.

In certain embodiments of the interlocking building surface product as otherwise described herein, the front surface of the building surface product provides acoustical dampening to the building surface product. For example, in some embodiments, the front surface of the building surface product includes baffles, ridges, protrusions or other surface features that enhance sound dampening.

In certain embodiments of the interlocking building surface product as otherwise described herein, a front surface of the building surface product is painted. For example, in some embodiments, the building surface product is painted prior to installation on a support structure, such as in a manufacturing facility. Thus, in some embodiments, the building surface product is painted before any mechanical fasteners are used to attach the building surface product to a support structure, such as wall joists. Indeed, in some embodiments the building surface product is painted and is free of mechanical fasteners extending therethrough.

In certain embodiments of the interlocking building surface product as otherwise described herein, a width from the upper edge to the lower edge is in a range from 3 inches to 4 feet, e.g., from 4 inches to 2 feet, e.g., from 6 inches to 1 foot. A width of the building surface product that is smaller than standard gypsum wallboard products, for example from a few inches up to a foot, can provide an aesthetic that is similar to shiplap. As a result, the joints between the building surface products form part of the aesthetic of the building surface, and do not need to be covered and hidden. This allows surfaces that are made using the building surface products according to the disclosure to be constructed without the need to cover the joints between the building surface products, which can save considerable time and effort.

In certain embodiments of the interlocking building surface product as otherwise described herein, a length from a first end of the gypsum panel to a second end of the gypsum panel is in a range from 1 foot to 20 feet, e.g., from 2 feet to 15 feet, e.g., from 4 feet to 12 feet. In some embodiments, thickness of the gypsum panel is in a range of ¼ inch to 3 inches, e.g., from ½ inch to 2 inches. Other thicknesses are also possible.

In another aspect, the disclosure provides a method of making an interlocking building surface product according to any of the above-described embodiments. In various embodiments, the method includes forming the substantially planar gypsum panel with the upper edge, the lower edge, the upper interlocking structure disposed at the upper edge, the lower interlocking structure disposed at the lower edge, and the two ends. For example, a method of the disclosure includes forming gypsum panel 102, shown in FIGS. 1-3 to include the upper edge 104, the lower edge 106, the upper interlocking structure 110 as upper edge 104, the lower interlocking structure 112 at lower edge 106, the first end 107, and the second end 108. As explained in more detail below, some embodiments of the method include cutting the general shape of the gypsum panel from a larger sheet of material, and other embodiments include forming the general shape of the gypsum panel directly from a gypsum slurry. Further, in some embodiments, the upper and lower interlocking structures are machined into the gypsum panel. In other embodiments, the upper and lower interlocking structures are provided in the gypsum panel when it is formed from a slurry.

Figure 14:
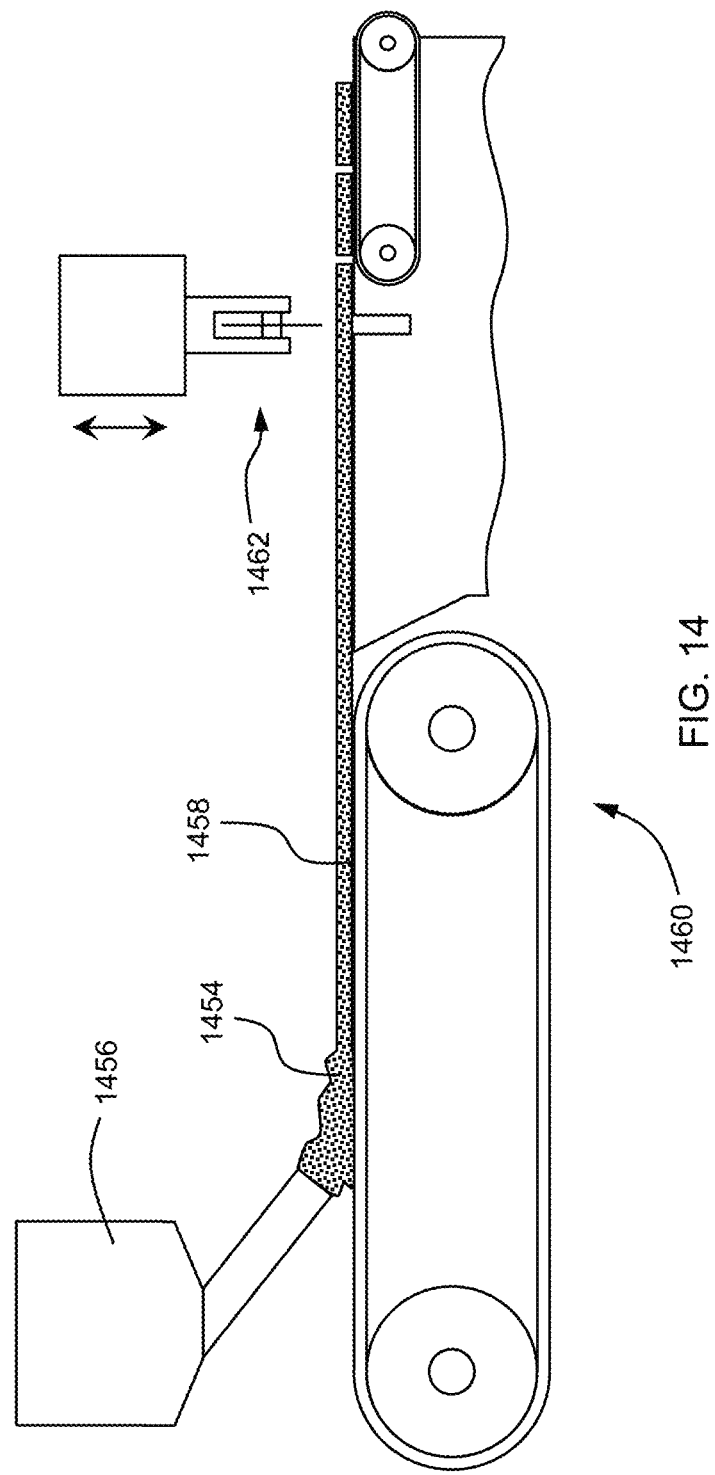
FIG. 14 is a schematic side view of an apparatus used in a method of making a building surface product according to an embodiment of the disclosure.

In particular, in certain embodiments of the method as otherwise described herein, forming the gypsum panel includes depositing a gypsum slurry over a forming surface and allowing the gypsum slurry to set. An embodiment of a method including this stage is shown in FIG. 14. Slurry 1454 is dispensed from a mixer 1456 onto a forming surface 1458 positioned on a conveyor 1460. The forming surface 1458 is a flat plane that allows the gypsum slurry 1454 to set in the form of a flat sheet of gypsum. In some embodiments, the forming surface includes sidewalls that contain the outer sides of the gypsum material as it sets. Further, in some embodiments, the method further includes the use one or more rollers or dies to further form the gypsum panel into its desired shape, such as a flat sheet. In some embodiments of the method the gypsum product passes through one or more ovens to facilitate drying of the gypsum material.

In certain embodiments of the method as otherwise described herein, the forming surface is configured to form a sheet of gypsum material, and the gypsum panel is cut from the sheet of gypsum material. For example, in FIG. 14, the conveyor 1460 moves the gypsum material to a blade 1462 that cuts the gypsum material into the general shape of the gypsum panel. The blade can take various forms, for example, a circular saw. In other embodiments, other cutting devices are also possible, such as a laser cutting device, or a water-jet cutting device. In some embodiments, the width of the sheet of gypsum material is the same as the length of the gypsum panels, and the gypsum panels are cut from the sheet of gypsum material along their upper and lower edges. In other embodiments, the width of the sheet of gypsum material is the same as the width of the gypsum panels, and the gypsum panels are cut from the sheet of gypsum material along their ends.

In other embodiments, the forming surface is configured to form the gypsum panel. For example, in some embodiments, the forming surface is part of a mold and the shape of the gypsum panel is formed in mold. Thus, the mold may include boundaries corresponding to the upper edge, the lower edge, the first end and the second end of the gypsum panel. Further, in some embodiments, the mold may include a cover. In other embodiments, the upper surface of the mold is open.

Figure 15:
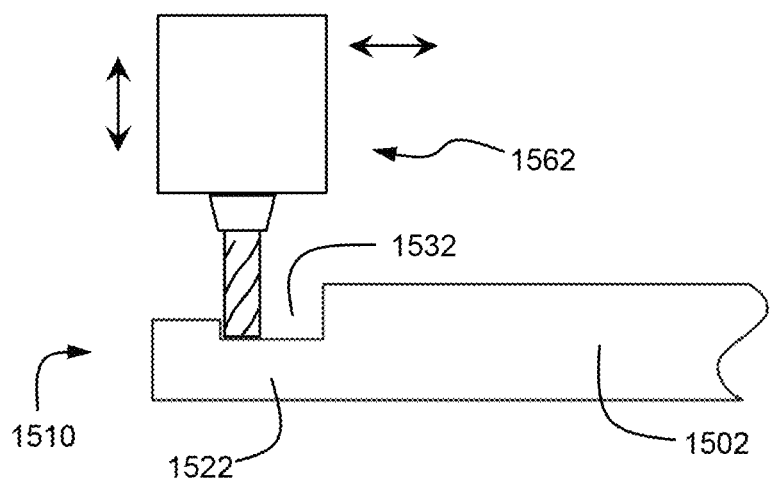
FIG. 15 is a schematic side view of another tool used in a method of making a building surface product according to an embodiment of the disclosure.

In certain embodiments of the method as otherwise described herein, the upper interlocking structure and the lower interlocking structure are machined into the gypsum panel. For example, portions of the gypsum panel can be cut, routed or otherwise removed in order to form the upper and lower interlocking structures. Such a method is schematically illustrated in FIG. 15. In the illustrated method, a CNC machine 1562 is removing a portion of gypsum panel 1502 corresponding to recess 1532 so as to form upper projection 1522 of upper interlocking structure 1510. In other embodiments, a machine is used to remove other portions of the gypsum panel so as to form the lower interlocking structure. Further, in some embodiments, material is removed from the front and/or rear face of the gypsum panel, such as is shown in FIG. 15. In some embodiments, material is removed from the upper edge and/or lower edge of the gypsum panel. Likewise, in some embodiments, material is removed from the ends.

Figure 16:
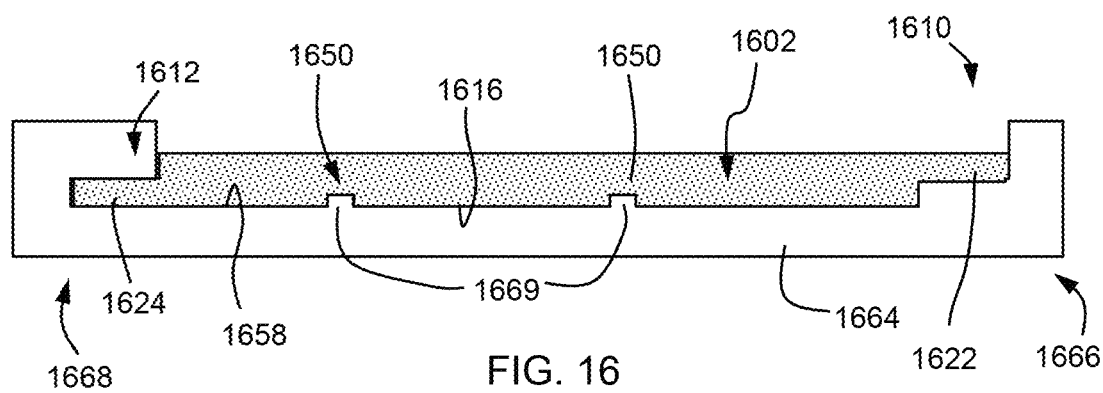
FIG. 16 is a schematic front view of a mold used in a method of making a building surface product according to an embodiment of the disclosure.

In certain embodiments of the method as otherwise described herein, the forming surface is part of a mold that includes a first portion configured to form the upper interlocking structure and a second portion configured to form the lower interlocking structure. For example, such a method is shown in FIG. 16, in which a gypsum slurry is dispensed onto forming surface 1658, which is part of a mold 1664. The mold 1664 includes a first portion 1666 shaped as a step that occupies a recess of the final gypsum panel 1602 in order to form the first upper projection 1622 of upper interlocking structure 1610. On the opposite end of mold 1664 is a second portion 1668 shaped as an overhang that occupies another recess of the final gypsum panel in order to form the first lower projection 1624 of lower interlocking structure 1612.

In the illustrated embodiment, mold 1664 is open at the ends, so as to form a continuous sheet of the gypsum material that includes the upper interlocking structure 1610 and the lower interlocking structure 1612. The sheet of gypsum material is then cut at intervals to create the gypsum panels. In other embodiments, the mold includes boundaries at the ends and forms a single gypsum panel.

In certain embodiments of the method as otherwise described herein, the method further includes positioning a flexible sheet on the forming surface so as to provide a facing that lines at least a portion of the gypsum panel. In some embodiments, the method further includes positioning a second flexible sheet over the gypsum panel so as to provide the facing that lines another portion of the gypsum panel. For example, in some embodiments, a flexible sheet is positioned on the forming surface and the gypsum slurry is then dispensed over the flexible sheet. As the gypsum slurry takes the form of the panel, the flexible sheet may be wrapped around the sides of the gypsum panel using rollers or guides. A second flexible sheet may cover the opposing side of the gypsum panel. In some embodiments, the flexible sheet is paper. In other embodiments, the flexible sheet is a mat, for example a glass fiber mat. In some embodiments, the flexible sheet includes reinforcing fibers, as described above.

In some embodiments, the method further includes connecting the flexible sheet and the second flexible sheet such that the facing surrounds the gypsum panel. For example, with the flexible sheet wrapped around the sides of the gypsum panel, the flexible sheet may be secured to the second flexible sheet on the opposite side of the panel. When secured on the gypsum panel, the flexible sheet forms a facing around the surface of the panel. The two flexible sheets may be secured to one another, for example, using a combination of folds and adhesive, as will be appreciated by those of ordinary skill in the art.

In certain embodiments of the method as otherwise described herein, the method further includes forming a surface texture on a front surface of the building surface product. In some embodiments, forming the surface texture includes spraying a heterogeneous coating on the front surface of the building surface product. In other embodiments, forming the surface texture includes forming grooves in the front face of the body of the gypsum panel. For example, the formation of the grooves may be carried out by removing material from the gypsum panel, such as by using a CNC machine as shown in FIG. 15. In other embodiments, the grooves are provided by the forming surface. For example, mold 1664, shown in FIG. 16, includes ridges 1669 that from grooves 1650 in the front face 1616 of the gypsum panel 1602.

In certain embodiments of the method as otherwise described herein, the method further includes providing fastener holes through the gypsum panel. For example, in some embodiments, fastener holes are drilled through the gypsum panel. The fastener holes promote proper placement of mechanical fasteners to secure the building surface product to a support structure. Further, the fastener holes may also assist in maintaining the structural integrity of the gypsum panel.

Figure 17:
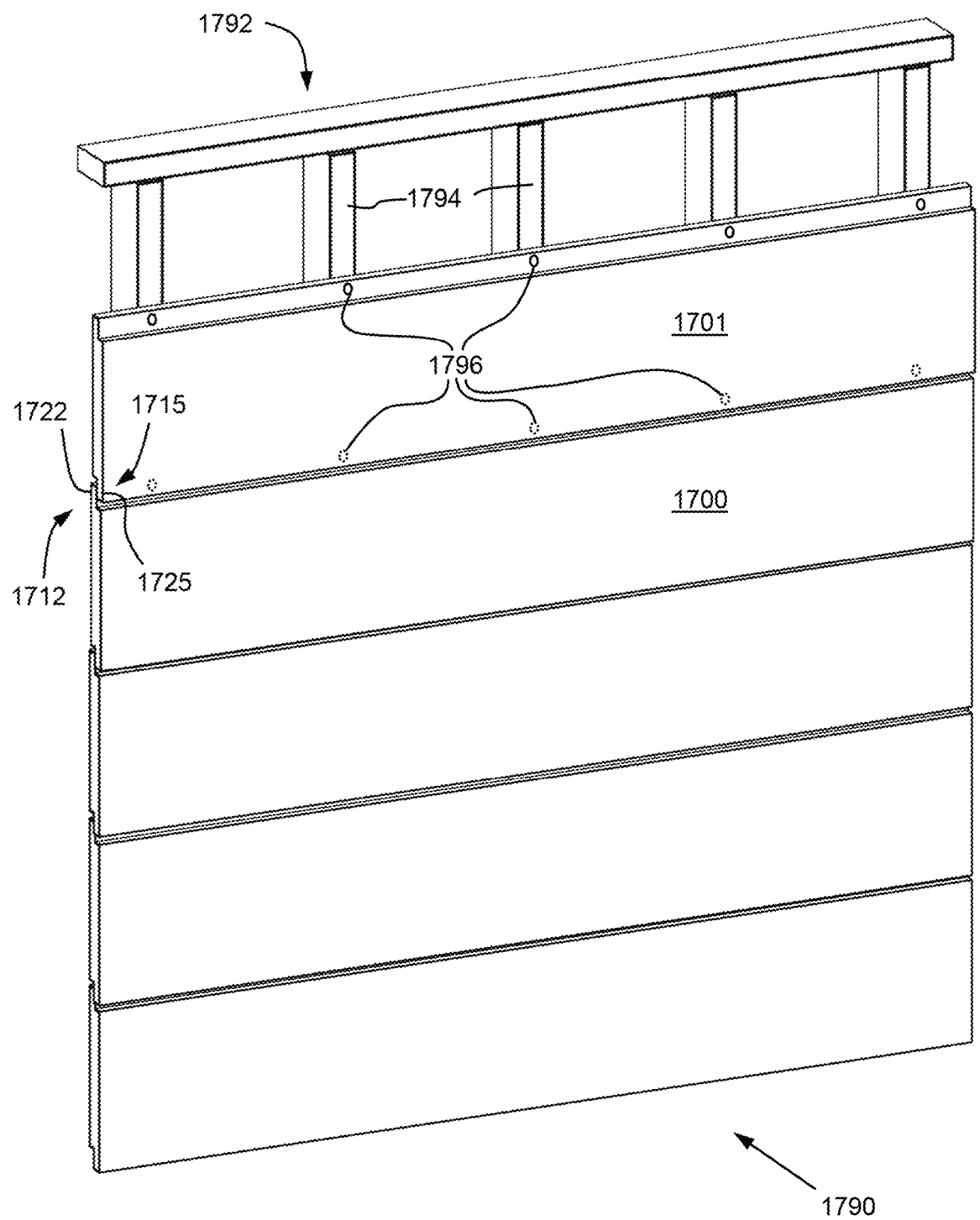
FIG. 17 is a schematic perspective view of a portion of a building surface system according to an embodiment of the disclosure.

In another aspect, the disclosure provides an interlocking building surface system comprising: a plurality of building surface products according to the disclosure secured to a support structure and arranged so as to provide a building surface, wherein the plurality of building surface products includes a first building surface product with an upper interlocking structure coupled to a lower interlocking structure of a second building surface product. Such a system is schematically shown in FIG. 17. Building surface system 1790 includes a plurality of building surface products secured to a support structure 1792. The support structure 1792 is in the form of a wall frame including a plurality of periodically spaced studs 1794. In other embodiments, the support structure includes other framing elements. Further, in some embodiments, the support structure is in the form sheathing or panels. The building surface products of system 1790 include a first building surface product 1700 and a second building surface product 1701. The first building surface product 1700 includes an upper interlocking structure 1712 that is coupled to a lower interlocking structure 1715 of the second building surface product 1701.

In certain embodiments of the interlocking system as otherwise described herein, the first upper projection of the upper interlocking structure of the first building surface product is covered by a first lower projection of the lower interlocking structure of the second building surface product. For example, first lower projection 1725 of lower interlocking structure 1715 of second building surface product 1701 covers first upper projection 1722 of upper interlocking structure 1712 of first building surface product 1701.

In certain embodiments of the interlocking system as otherwise described herein, the system further includes mechanical fasteners securing the plurality of building surface products to the support structure. For example, mechanical fasteners 1796, such as screws, secure the building surface products to the framing elements 1794 of the support structure 1792. In some embodiments, the mechanical fasteners pass through fastener holes in the building surface products, while in other embodiments, the fasteners are forced through the gypsum material.

In certain embodiments of the interlocking system as otherwise described herein, a first group of the mechanical fasteners extend through the first upper projection of the upper interlocking structure of the first building surface product into the support structure, and the first lower projection of the lower interlocking structure of the second building surface product covers the first group of mechanical fasteners. For example, the mechanical fasteners 1796 which attach first building surface product 1700 to support structure 1792 are shown with dotted lines, as they are positioned behind first lower projection 1725 of second building product 1701. Accordingly, because each building surface product overlaps the lower neighboring building surface product, the system may be installed with the mechanical fasteners obscured without the need for any joint compound to cover the mechanical fasteners.

Figure 18:
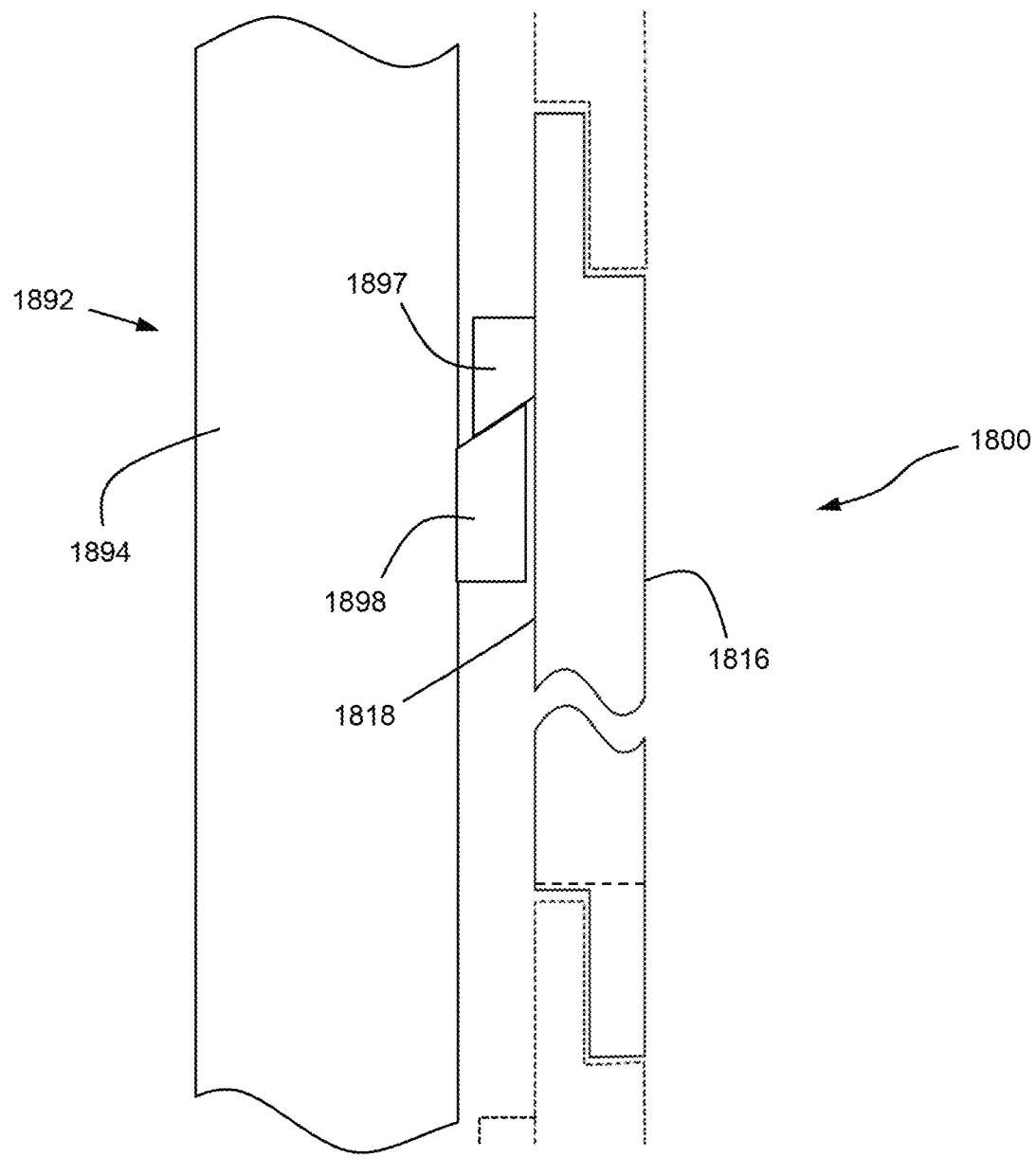
FIG. 18 is a schematic side view of an interlocking building surface product according to another embodiment of the disclosure.

In certain embodiments of the interlocking system as otherwise described herein, each of the building surface products includes a cleat disposed on the rear face of the body, and wherein the support structure includes corresponding cleats adapted to engage the cleats of the building surface products. For example, such a system is shown in FIG. 18. Building surface product 1800 includes a body 1814 with a front face 1816 and a rear face 1818. A cleat 1897 is attached to the rear face 1818 of body 1814. Likewise a corresponding cleat 1898 is attached to a framing element 1894 of support structure 1892. Accordingly, building surface product 1800 is secured to support structure 1892 using the cooperative cleats 1897 and 1898.

In other embodiments, the building surface products are attached to the support structure using various other methods. For example, in some embodiments, the building surface products are attached to the support structure using an adhesive, such as a pressure sensitive adhesive.

In certain embodiments of the interlocking system as otherwise described herein, a portion of the second building surface product is attached to a portion of the first building surface product using an adhesive. For example, in some embodiments the front surface of the upper projection of the first building surface product is attached to a rear surface of the lower projection of the second building surface product using an adhesive.

In certain embodiments of the interlocking system as otherwise described herein, a rear surface of a portion of the second building surface product is attached to a front surface of a portion of the first building surface product using a fastener. For example, in some embodiments the front surface of the upper projection of the first building surface product is attached to a rear surface of the lower projection of the second building surface product using hook and loop fastener.

Figure 19:
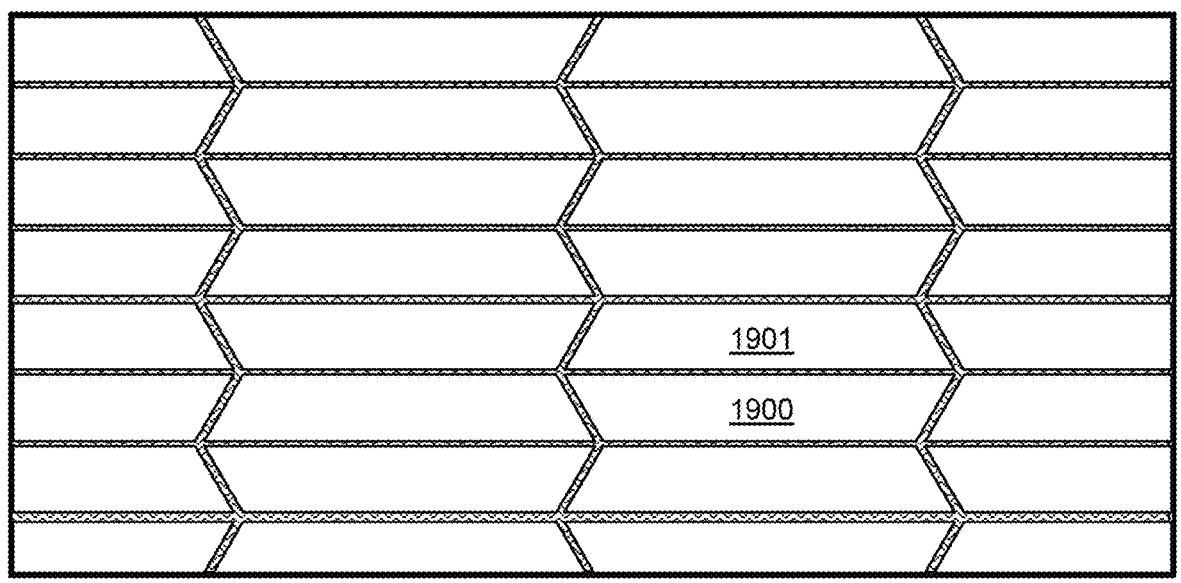
FIG. 19 is a schematic front view of a portion of an interlocking building surface system according to another embodiment of the disclosure.

In certain embodiments of the interlocking system as otherwise described herein, the plurality of building surface products have different shapes that are arranged in a pattern, and wherein the first building surface product has a first shape and the second building surface product has a second shape. Such as building surface system is shown in FIG. 19. Building surface system 1990 includes a plurality of building surface products in two configurations. Some of the building surface products are wider at the upper edge than at the lower edge, while some are wider at the lower edge than at the upper edge. In particular, building surface system 1990 includes a first building surface product 1900 that is wider at the upper edge and a second building surface product 1901 that is wider at the lower edge.

In certain embodiments of the interlocking system as otherwise described herein, a joint between the first building surface product and the second building surface product is free of any joint compound. For example, the upper interlocking structure and the lower interlocking structure may be configured to have an attractive appearance when the building surface products are adjacent, without the need of any joint compound to hide the joints. Accordingly, the building surface system can be constructed without the need to apply or finish any joint compound, which can save considerable effort in preparing the building surface.

In certain embodiments of the interlocking system as otherwise described herein, a front surface of the first building surface product and a front surface of the second building surface product are covered with a layer of paint. In some embodiments, the paint covers the entire exposed front surface of each building surface product. For example, if the building surface is constructed without the use of joint compound, the layer of paint can be applied directly to building surface products from the upper edge to the lower edge and from the first end to the second end.

Figure 20:
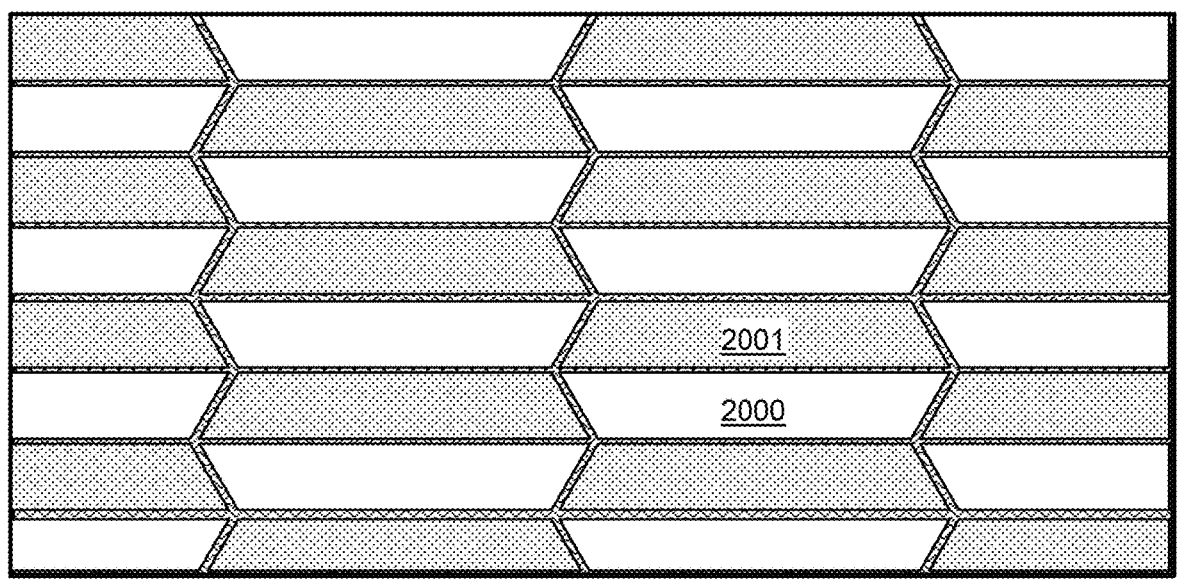
FIG. 20 is a schematic front view of a portion of an interlocking building surface system according to an embodiment of the disclosure.

In certain embodiments of the interlocking system as otherwise described herein, the first building surface product is painted a first color and the second building surface product is painted a second color. Such a building surface system is shown in FIG. 20. Building surface system 2090 includes a plurality of building surface products in two configurations. Some of the building surface products are wider at the upper edge than at the lower edge, while some are wider at the lower edge than at the upper edge. Further, some of the building surface products are painted a first color while some of the building surface products are painted a second color. In particular, building surface system 2090 includes a first building surface product 2000 that is painted a first color and a second building surface product 2001 that is painted a second color.

In another aspect, the disclosure provides a fastenable building surface product including a substantially planar gypsum panel having a first edge, a second edge, and two ends. The gypsum panel includes a body comprising a front face, a rear face, and a thickness between the front face and the rear face. A first lapping projection extends outward from the body at the second edge and is configured to overlap a portion of a neighboring gypsum panel so as to form a building surface. The building surface product also includes a first press-on connector disposed on the rear face of the body toward the first edge of the gypsum panel. The press-on connector is configured to engage a corresponding second press-on connector.

The phrase "toward the first edge," refers to the position of the press-on connector being disposed closer to the first edge than the second edge.

Figure 21:
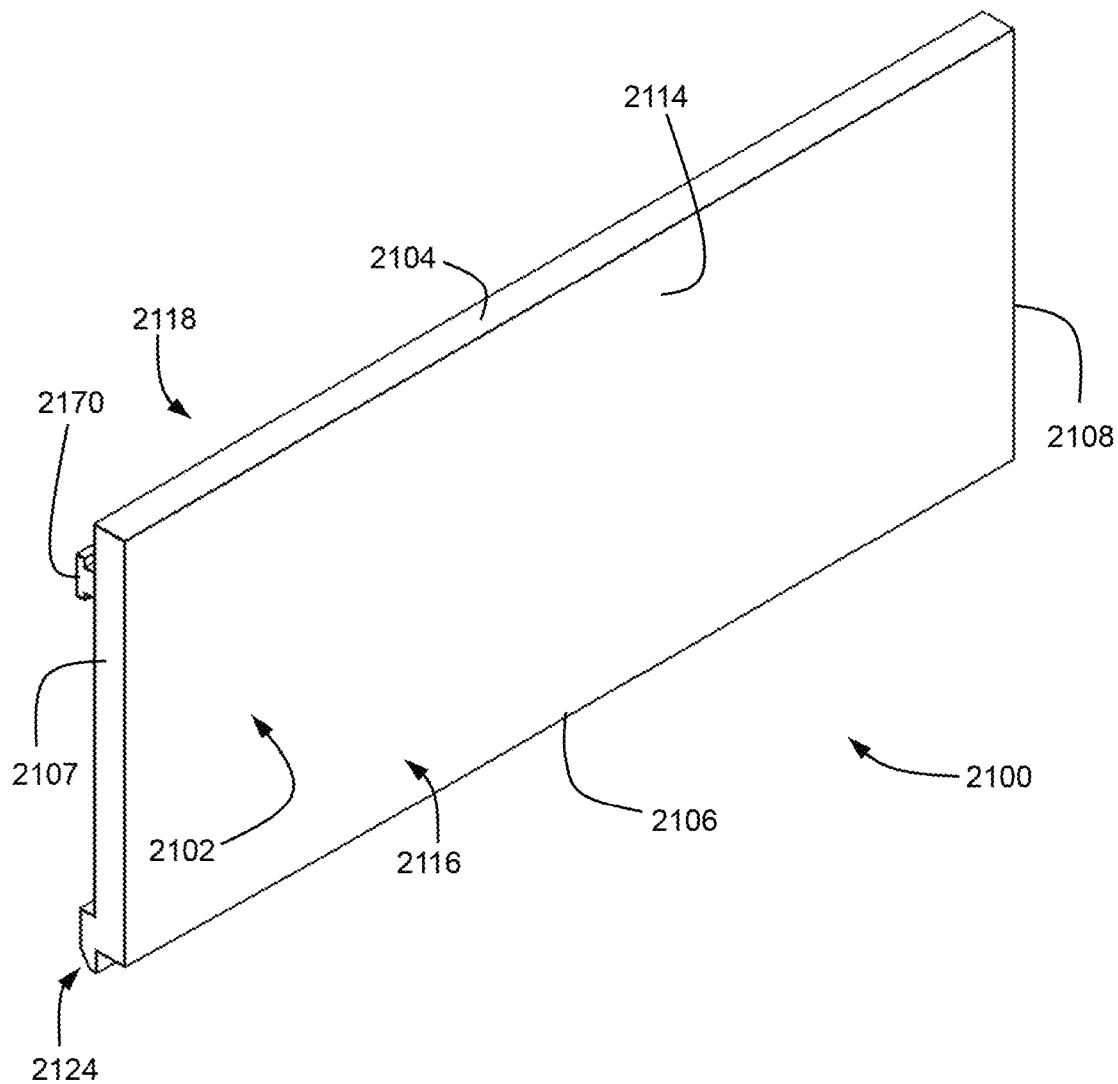
FIG. 21 is a schematic perspective view of an fastenable building surface product according to an embodiment of the disclosure.

Such a building surface product is shown, for example, in FIG. 21. Building surface product 2100 includes a substantially planar gypsum panel 2102 including a first edge 2104, a second edge 2106, a first end 2107, and a second end 2108. The gypsum panel 2102 also includes a body 2114 that has a front face 2116, a rear face 2118 and a thickness between front face 2116 and rear face 2118. Building surface product 2100 also includes a first lapping projection 2124 that extends outward from body 2114 at second edge 2106 and that is configured to overlap a portion of a neighboring gypsum panel so as to form a building surface, as described in more detail below. A first press-on connector 2170 is disposed on the rear face 2118 of body 2114 near the first edge 2104 of gypsum panel 2102. The press-on connector is configured to engage a corresponding second press-on connector, as described in more detail below.

The press-on connector and lapping projection are complementary components that allow the fastenable building surface product to have an interlocking engagement with neighboring building surface products while also being modular. The building surface product can be positioned so that the lapping projection extends behind a portion of a neighboring panel. Subsequently, the first press-on connector can be used to secure the building surface product in place by engaging with a complementary second press-on connector. Further, depending on the construction of the first press-on connector, as explained in more detail below, in some embodiments, the building surface product can be removable and/or re-installable. For example, the building surface product can be removed from a constructed building surface by initially disengaging the first press-on connector and then removing the lapping projection from behind the neighboring panel.

Furthermore, by using a lapping projection and press-on connector, the connections formed between both adjacent building surface products as well as the connections between the building surface products and the support surface are hidden. This allows building surfaces constructed using the building surface products to be completed without the time consuming process of obscuring attachment devices, such as covering mechanical fasteners with joint compound.

While the first edge of building surface product 2100 is shown at the top of the gypsum panel, and the second edge is shown at the bottom, in other embodiments the first and second edges are reversed. Furthermore, in some embodiments, the product can be rotated and installed with either edge at the top. Moreover, in some embodiments, the building surface products are installed vertically.

Figure 22:
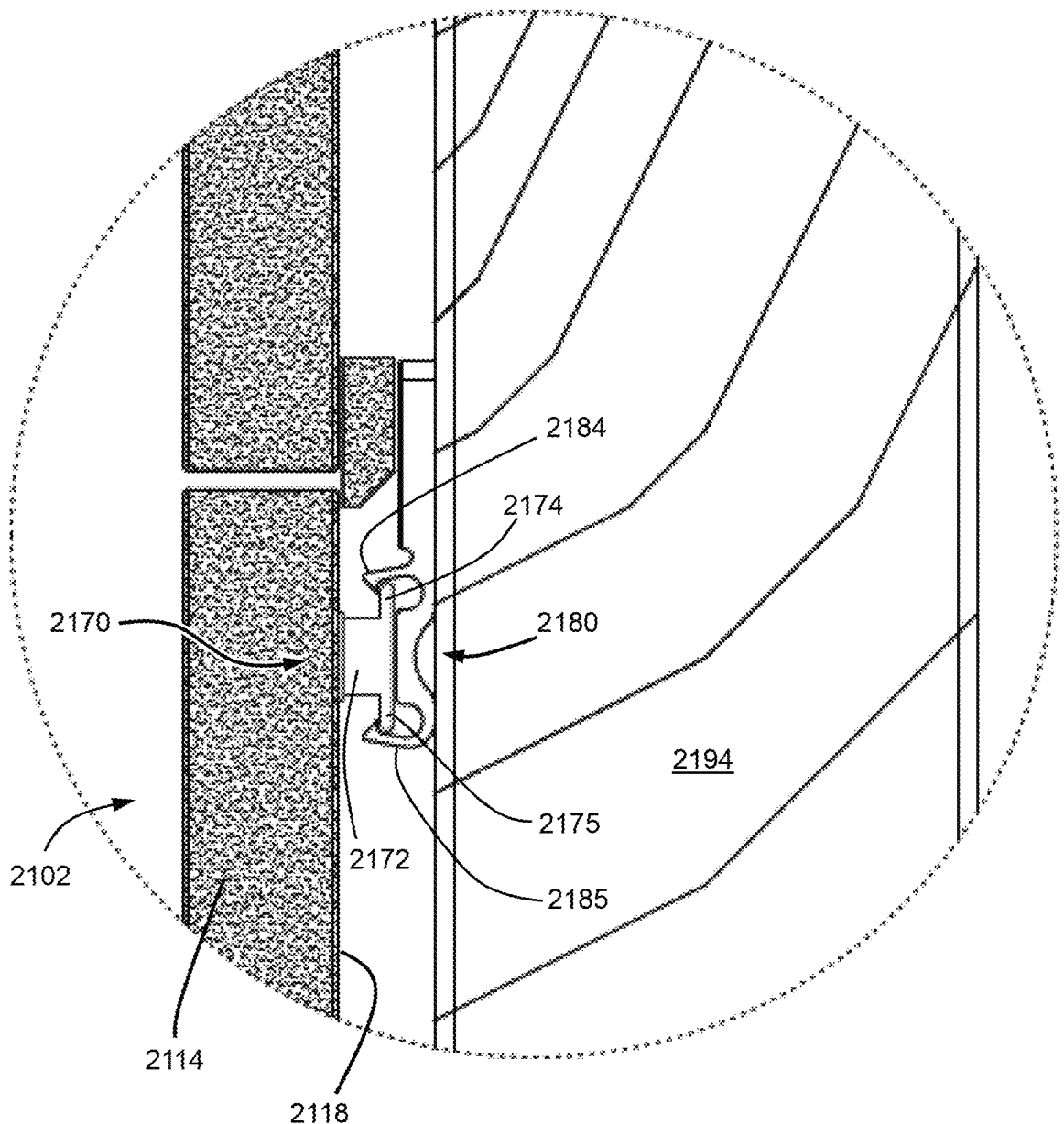
FIG. 22 is a schematic detailed side view of snap-fit connectors according to an embodiment of the disclosure.

In certain embodiments of the fastenable building surface product as otherwise described herein, the first press-on connector is a first snap-fit connector and the corresponding second press-on connector is a second snap-fit connector. For example, FIG. 22 shows a more detailed view of first press-on connector 2170 of FIG. 21, in the form of a first snap-fit connector attached to the rear face 2118 of the body 2114 of gypsum panel 2102. The first snap-fit connector 2170 is coupled to a corresponding second snap-fit connector 2180 that is secured to a framing member 2194.

The term snap-fit, as used herein, is defined as a connection between components where at least one of the components undergoes a deflection as the components are connected. Accordingly, if the connection is detachable, a corresponding deflection is needed in order to disconnect the assembled components. Such a snap-fit connection can provide a relatively stable attachment without the need for any additional fasteners. The deformation that occurs may be elastic, such that the components return to their original shape after the connection is made or after the components are disconnected. Alternatively, the deformation can be plastic and a permanent connection can be established.

A snap-fit connection, as the term is used herein, encompasses connections where either or both of the components being attached can undergo the deformation. Thus, the first snap-fit connector of the building surface product can undergo a deformation as it is attached to the corresponding second snap-fit connector, or the second snap-fit connector can undergo a deflection as it is attached to the first snap-fit connector.

In other embodiments, the first press-on connector can have another configuration, such as a component of a hook and loop fastener, or another recloseable fastener.

In certain embodiments of the fastenable building surface product as otherwise described herein, the first snap-fit connector includes a connector body and a first flange that extends laterally outward from the connector body and is configured to engage the second snap-fit connector. For example, as shown in FIG. 22, first snap-fit connector 2170 includes a body 2172 with a first flange 2174 extending laterally outward therefrom. In particular, first flange 2174 extends upward from body 2172. Further, second snap-fit connector 2180 has a first flexible hook member 2184 that receives and retains first flange 2174.

In certain embodiments of the fastenable building surface product as otherwise described herein, the first snap-fit connector includes a second flange that extends from the connector body in an opposite direction of the first flange and is configured to engage the second snap-fit connector. For example, first snap-fit connector 2170 includes a second flange 2175 that extends in an opposite direction from connector body 2172 compared to first flange 2174, specifically, in a downward direction. Like first flange 2174, second flange 2175 is configured to be secured by a second flexible hook 2185 of second snap-fit connector 2180.

Figure 23:
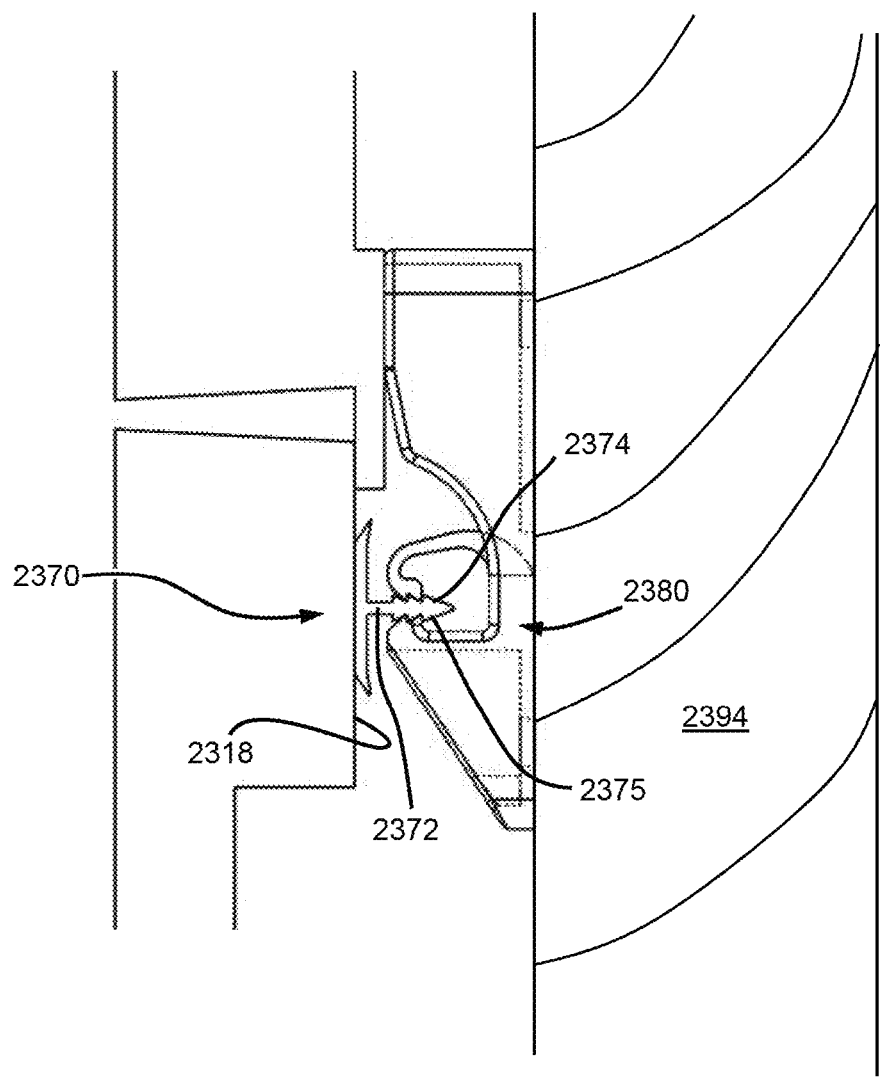
FIG. 23 is a schematic detailed side view of snap-fit connectors according to another embodiment of the disclosure.

Another embodiment of a first snap-fit connector and a second snap-fit connector is shown in FIG. 23. Similar to first snap-fit connector 2170, first snap-fit connector 2370 includes a connector body 2372 with a first flange 2374 extending laterally outward therefrom and a second flange 2375 extending from the connector body 2372 in a direction opposite first flange 2374. Further, second snap-fit connector 2380 has a first flexible hook member 2384 that receives and retains first flange 2374 and a second hook member 2385 that receives and retains second flange 2375. Accordingly, second snap-fit connector, which is attached to framing member 2394, holds the building surface product securely against the framing member by its connection to first snap-fit connector 2370.

Both first snap-fit connectors 2170 and 2370 have male configurations and second snap-fit connectors 2180 and 2380 have female configurations that receive the first snap-fit connectors. However, in other embodiments, the first snap-fit connector has a female configuration that receives the second snap-fit connector.

Figure 24:
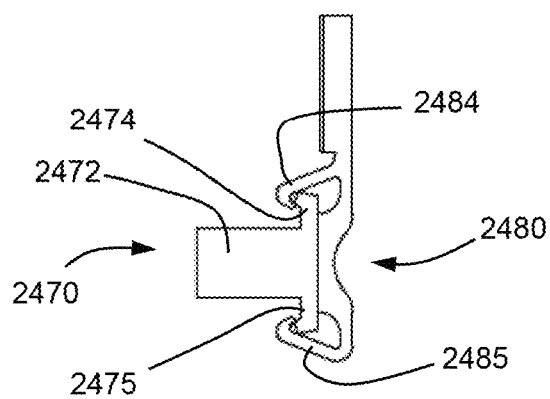
FIG. 24 is a schematic detailed side view of snap-fit connectors according to yet another embodiment of the disclosure.
Figure 25:
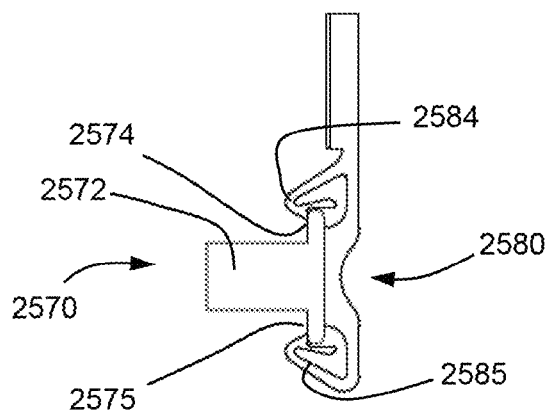
FIG. 25 is a schematic detailed side view of snap-fit connectors according to another embodiment of the disclosure.
Figure 26:
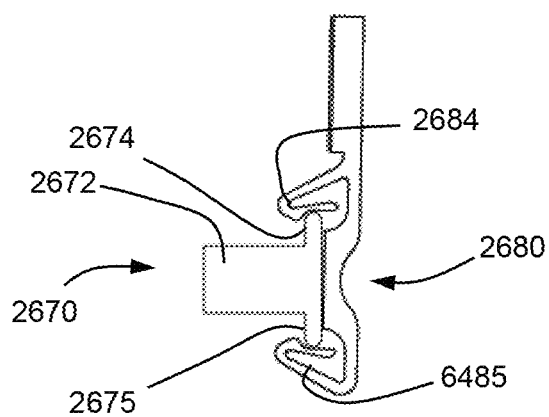
FIG. 26 is a schematic detailed side view of snap-fit connectors according to still another embodiment of the disclosure.

The first and second snap-fit connectors may be configured according to different design constraints to have a permanent installation, a re-installable installation, or a removable installation. Various embodiments of such snap-fit connectors are shown in FIGS. 24, 25 and 26. First snap-fit connector 2470, shown in FIG. 24, provides a permanent connection to second snap-fit connector 2480. First snap-fit connector 2470 has a first flange 2474 and a second flange 2475 extending from connector body 2472. The first flange 2474 and second flange 2475 respectively cooperate with a first hook 2484 and a second hook 2485 of second snap-fit connector 2480. On the other hand, first snap-fit connector 2570, shown in FIG. 25, provides a re-installable connection with second snap-fit connector 2580. Like that of FIG. 24, first snap-fit connector 2570 has a first flange 2574 and a second flange 2575 extending from connector body 2572, and cooperates with a second snap-fit connector 2580 that includes a first hook 2584 and a second hook 2585. Furthermore, first snap-fit connector 2670, shown in FIG. 26, has a removable connection with second snap-fit connector 2680. Like the others, first snap-fit connector 2670 has a first flange 2674 and a second flange 2675 extending from connector body 2672. The first flange 2674 and second flange 2675 cooperate with a first hook 2684 and a second hook 2685 of second snap-fit connector 2680.

The removability or permanence of the connection between the first snap-fit connector and second snap-fit connector is dependent upon the angles and edges of the mating components. In the embodiments shown in each of FIGS. 24, 25 and 26, the outer surfaces of the flanges and hooks are slanted or curved so as to allow the respective components to flex so that a connection of the first snap-fit connector and second snap-fit is possible. In contrast, the inner surfaces and edges have differing shapes to provide various different permanence and removability. For example, the inner surfaces of the flanges 2474 and 2475 of first snap-fit connector 2470 and the inner surfaces of the hooks 2484 and 2485 of second snap-fit connector 2480 have sharp edges to prevent removal of the first snap-fit connector 2470 from the second snap-fit connector once installed. This permanent connection can be advantageous in instances where removal of the building surface products is only permitted in instances where portions of the wall are being destroyed. In some cases, removal of the snap-fit connectors in instances using such a permanent connection requires removal of the second snap-fit connector from the framing members.

In contrast, first snap-fit connector 2570 and second snap-fit connector 2580 are configured to allow disconnection of the two components, so that a new building surface product can be installed. However, the inner surfaces of the flanges 2574, 2575 and hooks 2584, 2585 have an appropriate shape to allow disconnection so long as sufficient force is used. In some embodiments, this force is sufficiently high to damage the building surface products, but maintain the function of the second snap-fit connector. Such a configuration allows new building surface products to be installed when one is damaged, but prevents inadvertent or accidental removal upon moderate forces applied to the panels.

Further, first snap-fit connector 2670 and second snap-fit connector 2680 have inner surfaces of the flanges 2674, 2675 and hooks 2584, 2585 to allow repeated removal and reinsertion. This configuration allows maintenance to be on the building surface, or behind the building surface, without the need to replace any components of the building surface itself.

In certain embodiments of the fastenable building surface product as otherwise described herein, the first snap fit connector is in the form of a rail that extends along a length of the building surface product. For example, in some embodiments, the rail extends across at least 50% of the length of the building surface product, e.g., at least 80% of the length of the building surface product, e.g., at least 90% of the length of the building surface product. It should be understood that the length of the building surface product is the longest dimension of the product extending from the first end to the second end. For example, first snap-fit connector 2170, shown in FIGS. 21 and 22 is configured as a rail and extends across a vast majority of the gypsum panel 2102 to within two inches of the first end 2107 and second end 2108.

In certain embodiments of the fastenable building surface product as otherwise described herein, a distance between the first snap-fit connector and the first edge is less than 30% of the width of the gypsum panel body, e.g., less than 20%, e.g., less than 10%. For example, in some embodiments, the first snap-fit connector is disposed in a range of ¼ inch to 3 inches from the first edge of the building surface product.

In certain embodiments of the fastenable building surface product as otherwise described herein, the first snap-fit connector is attached to the gypsum panel using adhesive. In some embodiments, the adhesive is an organic adhesive, such as a curable glue, a single component epoxy, a two component epoxy, a hot-melt thermoplastic, or a polyurethane resin. In other embodiments, the adhesive is an inorganic adhesive, such as cement. Further, in other embodiments, the first snap-fit connector is attached to the gypsum panel using a mechanical fastener, such as a screw.

In certain embodiments of the fastenable building surface product as otherwise described herein, the first lapping projection is disposed behind the body of the gypsum panel, and wherein the first projection is configured to extend behind the body of the gypsum panel of a neighboring building surface product. For example, as shown in FIGS. 21 and 22, first lapping projection 2170 is positioned behind body 2114 of gypsum panel 2102. Accordingly, as shown in FIG. 22, when installed, the first lapping projection 2170 is positioned behind the body of the gypsum panel of a neighboring building surface product.

In other embodiments, the first lapping projection is coextensive with the rear face but thinner than the thickness of the panel. In such embodiments, the second edge may include a second lapping projection that cooperates with the first lapping projection of a neighboring panel.

In certain embodiments of the fastenable building surface product as otherwise described herein, the first lapping projection extends outward from the body in a direction of the plane of the gypsum panel a distance in a range of ¼ inch to 3 inches, e.g., ⅜ inch to 2.5 inches, e.g., ½ inch to 2 inches.

Figure 27:
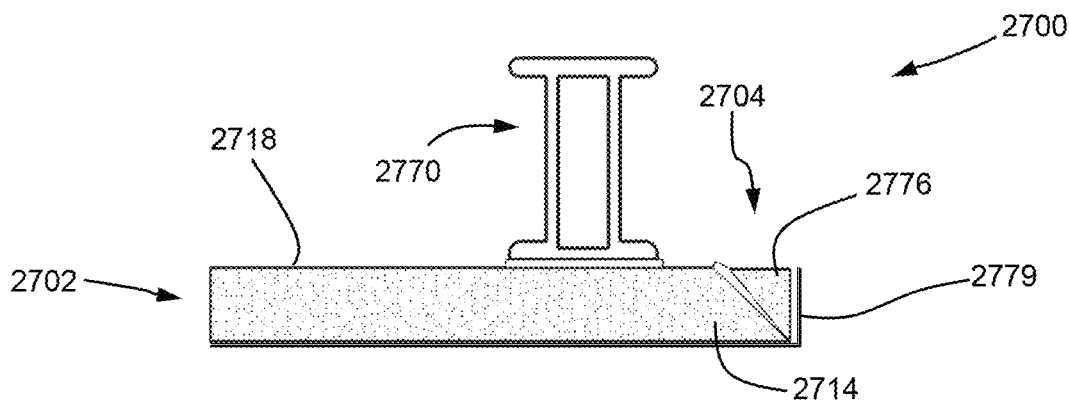
FIG. 27 is a schematic detailed side view of an edge of a building surface product according to an embodiment of the disclosure.

In certain embodiments of the fastenable building surface product as otherwise described herein, the first edge includes a folded gypsum edge. Likewise, in some embodiments, the second edge also includes a folded gypsum edge. Further, in some embodiments, the first and second ends also include folded gypsum edges. In certain embodiments, the folded gypsum edge is a flat fold including a first folded section adhered to the body of the gypsum panel along an angled slit, where the body of the gypsum panel and the first folded section are covered by a continuous facing sheet. Such a folded edge is shown in FIG. 27. Building surface product 2700 includes first snap-fit connector 2770 attached to the rear surface 2718 of gypsum panel 2702. The building surface product also includes a first edge 2704 with a folded gypsum edge including a flat fold. The folded edge includes a first folded section 2776 that is secured to the body 2714 of gypsum panel 2702 with an adhesive. The body 2714 of the gypsum panel 2702 and the first folded section 2776 are covered by a continuous facing sheet 2779 that wraps around the folded edge 2704.

Figure 28:
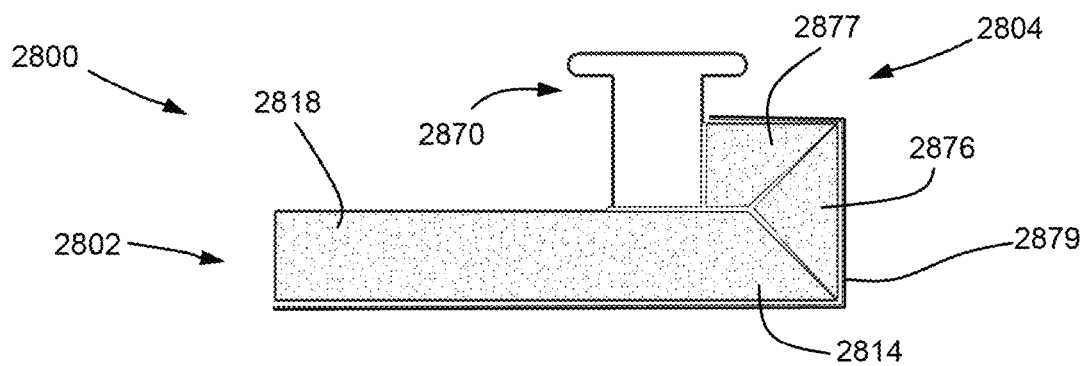
FIG. 28 is a schematic detailed side view of an edge of a building surface product according to another embodiment of the disclosure.

In certain embodiments of the fastenable building surface product as otherwise described herein, the folded edge is a corner fold including a first folded section and a second folded section. The first folded section is adhered to the body of the gypsum panel along a first angled slit and the second folded section is adhered to the first folded section along a second angled slit. Further, the body of the gypsum panel, the first folded section, and the second folded section are all covered by a continuous facing sheet. Such a folded edge is shown in FIG. 28. Building surface product 2800 includes first snap-fit connector 2870 attached to the rear surface 2818 of gypsum panel 2802. The building surface product also includes a first edge 2804 with a folded gypsum edge including a corner fold. The folded edge includes a first folded section 2876 that is secured to the body 2814 of gypsum panel 2802 along an angled slit using an adhesive. Further, a second folded section 2877 is secured to the first folded section 2876 along another angled slit by adhesive. The body 2814 of the gypsum panel 2802, the first folded section 2886, and the second folded section 2877 are all covered by a continuous facing sheet 2879 that wraps around the folded edge 2804.

In certain embodiments of the fastenable building surface product as otherwise described herein, the second folded section is adhered to the first snap-fit connector. For example, second folded edge 2877 is attached to first snap-fit connector 2870 with an adhesive.

Figure 29:
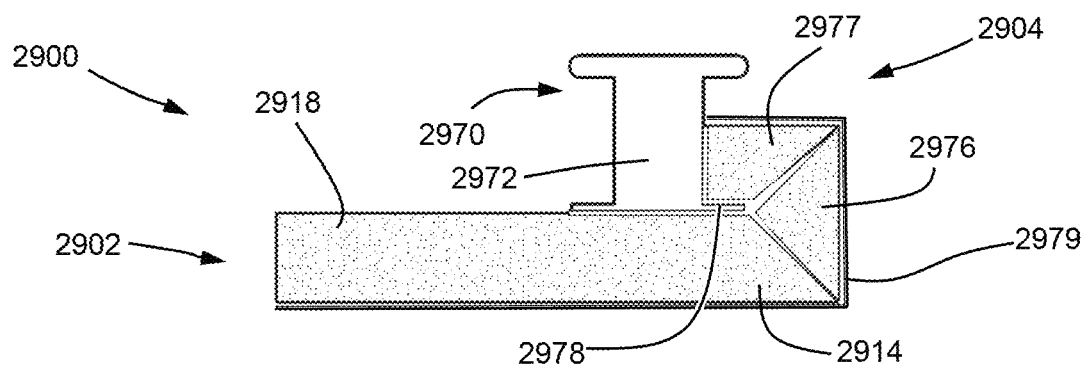
FIG. 29 is a schematic detailed side view of an edge of a building surface product according to yet another embodiment of the disclosure.

In certain embodiments of the fastenable building surface product as otherwise described herein, the first snap-fit connector includes a base extending outward from the connector body, wherein the base is adhered to the body of the gypsum panel, and wherein the second folded section overlaps the base of the first snap-fit connector. Such a folded edge is shown in FIG. 29. Building surface product 2900 includes first snap-fit connector 2970 attached to the rear surface 2918 of gypsum panel 2902. First snap-fit connector 2970 includes a base 2978 extending outward from connector body 2972. The building surface product also includes a first edge 2904 with a folded gypsum edge including a corner fold. The folded edge includes a first folded section 2976 that is secured to the body 2914 of gypsum panel 2902 along an angled slit using an adhesive. Further, a second folded section 2977 is secured to the first folded section 2976 along another angled slit by adhesive. Moreover, second folded edge 2977 overlaps base 2978 of first snap-fit connector 2970. Furthermore, the body 2914 of the gypsum panel 2902, the first folded section 2986, and the second folded section 2977 are all covered by a continuous facing sheet 2979 that wraps around the folded edge 2904.

Figure 30:
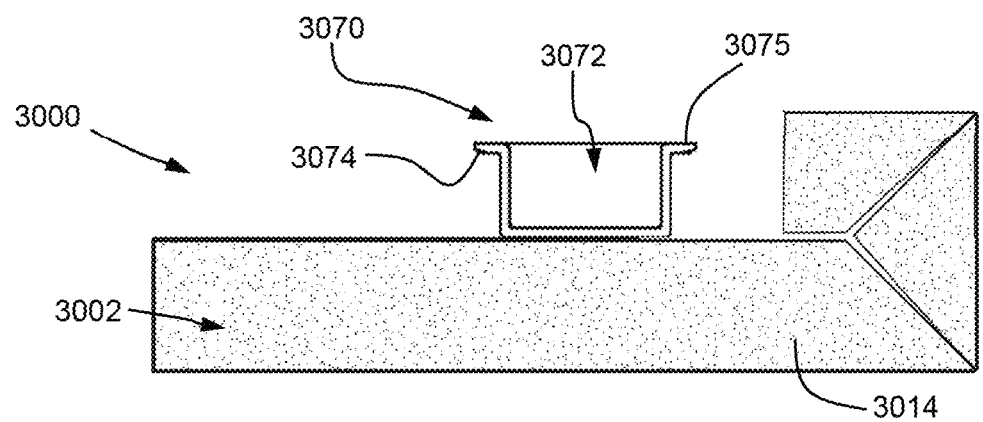
FIG. 30 is a schematic detailed side view of an edge of a building surface product according to another embodiment of the disclosure.

In certain embodiments of the fastenable building surface product as otherwise described herein, the connector body of the first snap-fit connector is solid. For example, connector body 2472 of first snap-fit connector 2470, shown in FIG. 24 is a solid body. In other embodiments, the connector body of the first snap-fit connector is hollow. Such an embodiment is shown in FIG. 30. Building surface product 3000 includes a first snap-fit connector 3070 includes a hollow connector body 3072 having a "U" shaped cross-section and including first flange 3074 and second flange 3075 extending outward from the upper ends of connector body 3072. In some embodiments, the snap-fit connector has a standard rail configuration, such as DIN rail. As will be appreciated by those of ordinary skill in the art, the rail can be formed of metal, such as cold-rolled steel or a polymer, such as an extruded plastic.

Figure 31:
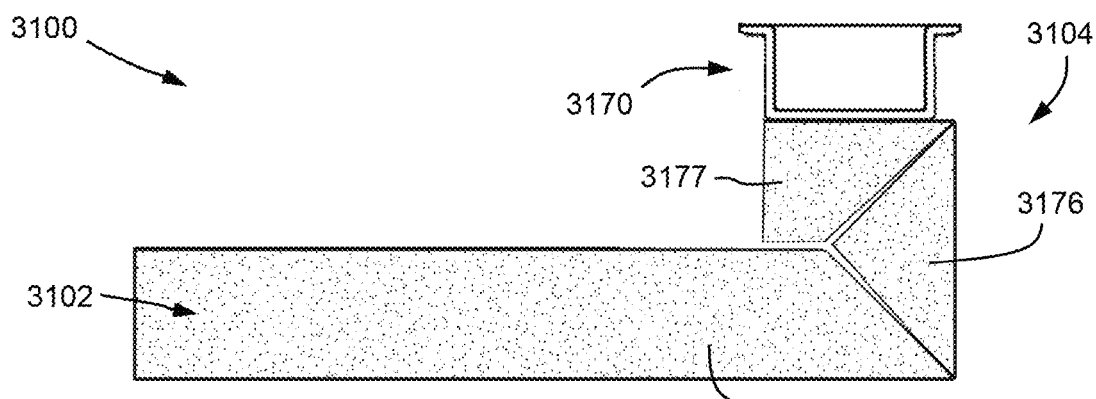
FIG. 31 is a schematic detailed side view of an edge of a building surface product according to yet another embodiment of the disclosure.
Figure 32:
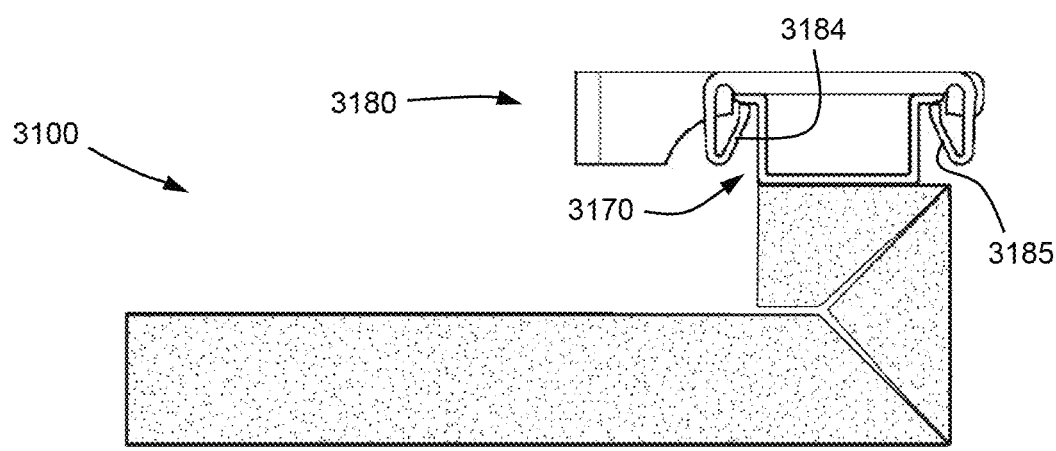
FIG. 32 is a schematic detailed side view of an edge of a building surface product according to yet another embodiment of the disclosure.

In some embodiments, the snap-fit connector is disposed on the body of the gypsum panel. For example, snap-fit connector 3070 is disposed on the body 3014 of gypsum panel 3002. In other embodiments, the snap-fit connector is disposed on the folded edge of the gypsum panel. For example, building surface product 3100, shown in FIG. 31, includes a gypsum panel 3102 with a folded edge 3104 having a first folded section 3176 and a second folded section 3177. First snap-fit connector 3170 is disposed on top of the second folded section 3177 of folded edge 3104. FIG. 32 shows the first snap-fit connector 3170 coupled to a second snap-fit connector 3180 using a first hook 3184 and a second hook 3185 that secure the respective flanges of first snap-fit connector.

In certain embodiments of the fastenable building surface product as otherwise described herein, the gypsum panel comprises a reinforced gypsum material. In some embodiments, the gypsum panel includes at least 1% by weight polymer. Further, in some embodiments, the polymer includes starch and/or polyvinyl acetate.

In certain embodiments of the fastenable building surface product as otherwise described herein, the gypsum panel includes at least 1% by weight of reinforcing fibers. For example, in some embodiments, the gypsum panel includes glass fibers. Further, in some embodiments, the gypsum panel includes cellulose-based fibers. Moreover, in some embodiments, the gypsum panel includes polyethylene, polypropylene or polyester fibers. Various embodiments of the building surface product include different combinations of the aforementioned fibers in the gypsum panel. Further, in some embodiments of the fastenable building surface product, the gypsum panel includes one or more additives, such as biocides, hydrophobic additives, and fire resistance additives.

In certain embodiments of the fastenable building surface product as otherwise described herein, the ends are perpendicular to the upper edge and the lower edge. In other embodiments, the ends are disposed at an angle to the upper edge and lower edge. For example, in some embodiments of the fastenable building surface product, the ends are at an angle in a range of 30 degrees to 80 degrees from the upper edge or lower edge. Further, in some embodiments of the fastenable building surface product, the ends are curved.

In certain embodiments of the fastenable building surface product as otherwise described herein, a portion of a first end of the gypsum panel is configured to overlap with a portion of a neighboring building surface product.

In certain embodiments of the fastenable building surface product as otherwise described herein, the fastenable building surface product further includes a facing that lines at least a portion of the gypsum panel. In some embodiments, the facing is a paper facing. In other embodiments, the facing includes reinforcing fibers. For example, in some embodiments, the facing includes a fiberglass mat. Further, in some embodiments, the gypsum product of the gypsum panel the building surface product is embedded into the facing.

In certain embodiments of the fastenable building surface product as otherwise described herein, a front surface of the building surface product includes a textured surface. For example, in some embodiments, the front surface of the building surface product is sanded or roughened to provide a surface texture to the front face of the building surface product. Further, in some embodiments, a coating of a grainy or heterogeneous coating is applied to the front surface of the building surface product. The surface texture of the front face of the building surface product may provide the product with a visual appearance similar to venetian plaster or cast concrete, for example.

In certain embodiments of the fastenable building surface product as otherwise described herein, the front face of the body includes grooves along the length of the gypsum panel. In some embodiments, the grooves are disposed at regular intervals and provide a gap in the front face of the building surface product that is similar to the gap that is formed where two neighboring building surface products meet. Accordingly, the grooves may help obscure the location of the actual joints between adjacent building surface products.

In certain embodiments of the fastenable building surface product as otherwise described herein, the front surface of the building surface product provides acoustical dampening to the building surface product. For example, in some embodiments, the front surface of the building surface product includes baffles, ridges, protrusions or other surface features that enhance sound dampening.

In certain embodiments of the fastenable building surface product as otherwise described herein, a front surface of the building surface product is painted. For example, in some embodiments, the building surface product is painted prior to installation on a support structure, such as in a manufacturing facility.

In certain embodiments of the fastenable building surface product as otherwise described herein, a width from the upper edge to the lower edge is in a range from 3 inches to 4 feet, e.g., from 4 inches to 2 feet, e.g., from 6 inches to 1 foot. A width of the building surface product that is smaller than standard gypsum wallboard products, for example from a few inches up to a foot, can provide an aesthetic that is similar to shiplap. As are result, the joints between the building surface products form part of the aesthetic of the building surface, and do not need to be covered and hidden. This allows surfaces that are made using the building surface products according to the disclosure to be constructed without the need to cover the joints between the building surface products, which can save considerable time and effort.

In certain embodiments of the fastenable building surface product as otherwise described herein, a length from a first end of the gypsum panel to a second end of the gypsum panel is in a range from 1 foot to 20 feet, e.g., from 2 feet to 15 feet, e.g., from 4 feet to 12 feet. In certain embodiments of the fastenable building surface product as otherwise described herein, the thickness of the gypsum panel is in a range of ¼ inch to 3 inches, e.g., from ½ inch to 2 inches. Other thicknesses are also possible In another aspect, the disclosure provides a method of making a fastenable building surface product according to the disclosure. The method includes forming the substantially planar gypsum panel with the first edge, the second edge, the first lapping projection extending outward from the body at the second edge, and the two ends. The method also includes attaching the first press-on connector to the rear face of the body of the gypsum panel. For example, a method of the disclosure includes forming gypsum panel 2102, shown in FIGS. 21 and 22 to include the upper edge 2104, the lower edge 2106, the first lapping projection extending from the body 2114 of gypsum panel 2102 at second edge 2106, the first end 2107, and the second end 2108. Press-on connector 2170 is then attached to the rear face 2118 of gypsum panel 2102. As explained in more detail below, some embodiments of the method include cutting the general shape of the gypsum panel from a larger sheet of material, and other embodiments include forming the general shape of the gypsum panel directly from a gypsum slurry. Further, in some embodiments, the lapping projection is attached to the rear face of the gypsum panel. In other embodiments the lapping projection is machined into the gypsum panel. Still in other embodiments, the lapping projection is provided in the gypsum panel when it is formed from a slurry.

In certain embodiments of the method of making the fastenable building surface product, forming the gypsum panel includes depositing a gypsum slurry over a forming surface and allowing the gypsum slurry to set. In some embodiments the forming surface is configured to form a sheet of gypsum material, and the gypsum panel is cut from the sheet of gypsum material. Further, in some embodiments, the method includes positioning a flexible sheet on the forming surface so as to provide a facing that lines at least a portion of the gypsum panel. A similar method including these steps shown in FIG. 14 and described above.

In certain embodiments of the method of making the fastenable building surface product, the method further includes positioning a second flexible sheet over the gypsum panel so as to provide a facing that lines another portion of the gypsum panel.

In certain embodiments of the method of making the fastenable building surface product, the method further includes forming the first edge of the gypsum panel as a folded edge with a flat fold by: cutting a first notch in the sheet of gypsum material so as to form a first folded section adjacent to the body of the gypsum panel, folding the first folded section toward the body of the gypsum panel so as to close the notch, and adhering the first folded section to the body of the gypsum panel. For example, first edge 2704, shown in FIG. 27, is formed by cutting a notch in the gypsum material to form first folded section 2776 next to the body 2714 of gypsum panel 2702. First folded section 2776 is then folded toward body 2714 so as to close the notch, such that first folded section 2776 abuts body 2714. An adhesive is provided between first folded section 2776 and body 2714 to hold the folded edge closed.

In certain embodiments of the method of making the fastenable building surface product, the method further includes forming the first edge of the gypsum panel as a folded edge with a corner fold by: cutting a first notch in the sheet of gypsum material so as to form a first folded section adjacent to the body of the gypsum panel, cutting a second notch in the sheet of gypsum material so as to form a second folded section adjacent to the first folded section, folding the second folded section toward the first folded section so as to close the second notch, adhering the second folded section to the first folded section, folding the first folded section toward the body of the gypsum panel so as to close the first notch and to place the second folded section over the body of the gypsum panel, and adhering the first folded section to the body of the gypsum panel. For example, first edge 2804, shown in FIG. 28, is formed by cutting a first notch in the gypsum material to form first folded section 2876 adjacent body 2814 of gypsum panel 2802, and cutting a second notch in the gypsum material to form a second folded section 2877 adjacent to the first folded section 2876. The first folded section 2876 is folded toward second folded section 2877 and adhered thereto. The second folded section 2877 is then folded toward first folded section 2876 in order to close the second notch and the two sections are attached with adhesive. The first folded section 2876 is then folded toward the body 2814 to close the first notch and the first folded section 2876 is attached to the body with more adhesive.

In certain embodiments of the method of making the fastenable building surface product, the first press-on connector is a snap-fit connector, and the method further includes adhering the second folded section to the snap-fit connector. For example, in forming building surface product 2800, second folded section 2877 is attached to first snap-fit connector 2870 using adhesive.

In certain embodiments of the method of making the fastenable building surface product, the snap-fit connector includes a base extending outward from the connector body, and the method further includes folding the second folded section over the base of the snap-fit connector so as to place the base of the snap-fit connector between the second folded section and the body of the gypsum panel. For example, in forming building surface product 2900, shown in FIG. 29, second folded section 2977 is folded over the base 2978 of first snap-fit connector 2970 in order to place the base 2978 between second folded section 2977 and body 2914 of gypsum panel 2902.

In certain embodiments of the method of making the fastenable building surface product, the method includes adhering the first snap-fit connector onto the folded edge of the gypsum panel. For example, in forming building surface product 3100, shown in FIG. 31, the first snap-fit connector 3170 is adhered to the second folded section 3177 of folded edge 3104 of gypsum panel 3102.

In certain embodiments of the method of making the fastenable building surface product, the first lapping projection is machined into the gypsum panel. For example, in some embodiments, the first lapping projection is formed in the gypsum panel using a CNC machine, as shown in FIG. 15.

In certain embodiments of the method of making the fastenable building surface product, the first lapping projection is adhered to the body of the gypsum panel. For example, in some embodiments, a layer of adhesive is placed on an inside surface of the first lapping projection, and the first lapping projection is attached to the rear face of the gypsum panel. In some embodiments, the adhesive is an organic adhesive, such as a curable glue, a single component epoxy, a two component epoxy, a hot-melt thermoplastic, or a polyurethane resin. In other embodiments, the adhesive is an inorganic adhesive, such as cement.

In certain embodiments of the method of making the fastenable building surface product, the method further includes forming a surface texture on a front surface of the building surface product. In some embodiments, forming the surface texture includes spraying a heterogeneous coating on the front surface of the building surface product. In other embodiments, forming the surface texture includes forming grooves in the front face of the body of the gypsum panel. For example, the formation of the grooves may be carried out by removing material from the gypsum panel, such as by using a CNC machine as shown in FIG. 15. In other embodiments, the grooves are provided by the forming surface.

Figure 33:
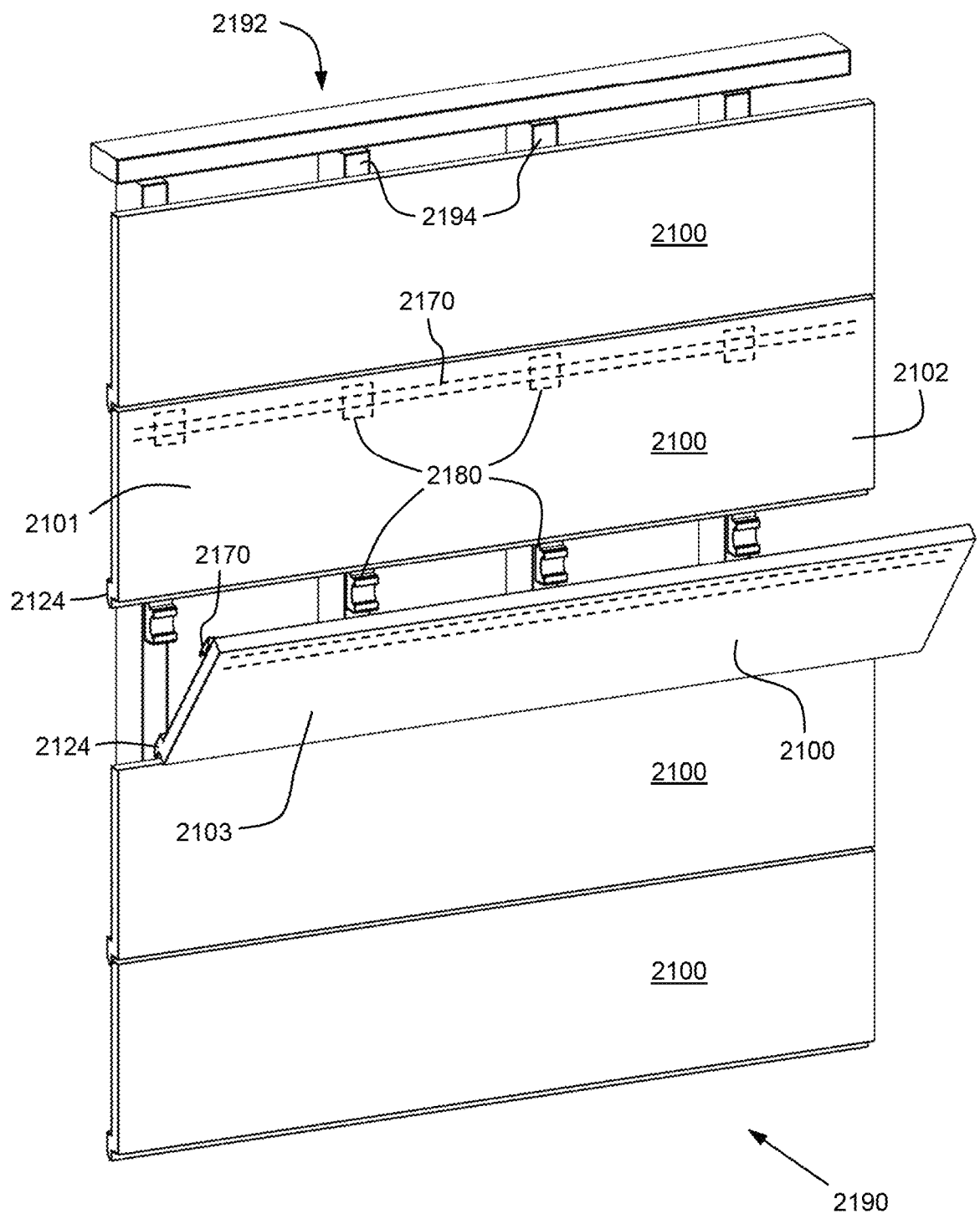
FIG. 33 is a schematic perspective view of a fastenable building surface system according to an embodiment of the disclosure.

In another aspect, the disclosure provides a fastenable building surface system including a support structure, a plurality of second press-on connectors disposed on a front side of the support structure, and a plurality of fastenable building surface products according to the disclosure secured to the support structure and arranged so as to provide a building surface. The first press-on connector of each building surface product is coupled to at least one of the second press-on connectors. Further, the first edge of the gypsum panel of each building surface product overlaps the first lapping projection of a neighboring building surface product. Such a system is schematically shown in FIG. 33. Building surface system 2190 includes a plurality of building surface products 2100, such as that shown in FIGS. 21 and 22 secured to a support structure 2192. The support structure 2192 is in the form of a wall frame including a plurality of periodically spaced studs 2194. In other embodiments, the support structure includes other framing elements. Further, in some embodiments, the support structure is in the form of sheathing or panels. Each of the building surface products 2100 of system 2190 include a first building surface product 2101 and a second building surface product 2103. The first building surface product 2101 includes a first press-on connector 2170 that is coupled to a plurality of second press-on connectors 2180 attached to the support structure 2192. The first and second press-on connectors 2170 and 2180 of first building surface product 2101 are positioned behind the gypsum panel 2102 and therefore are schematically depicted using dashed lines. The first building surface product 2101 also includes a first lapping projection 2124 that is configured to be positioned behind second building surface product 2103.

The second building surface product 2103 is presented as it is being installed. Second building surface product 2103 includes first lapping projection 2124 that is being inserted behind the gypsum panel of a lowering neighbor building surface product. Further, second building surface product 2103 includes a first press-on connector 2170 that is prepared to connect to a plurality of second press-on connectors 2180.

In certain embodiments of the fastenable building surface system as otherwise described herein, the first press-on connectors are first snap-fit connectors and the second press-on connectors are second snap-fit connectors. For example, in the embodiment depicted in FIGS. 21, 22 and 30, first press-on connectors 2170 are second press-on connectors 2180 are both complementary snap-fit connectors.

In certain embodiments of the fastenable building surface system as otherwise described herein, each of the first snap-fit connectors includes a connector body and a first flange that extends laterally outward from the connector body, and each of the second snap-fit connectors includes a clip having a first flexible hook configured to engage the first flange. For example, as shown in FIG. 22 and explained above, first snap-fit connector 2170 includes a body 2172 with a first flange 2174 extending laterally outward therefrom, and second snap-fit connector 2180 is formed as a clip and has a first flexible hook member 2184 that receives and retains first flange 2174.

In certain embodiments of the fastenable building surface system as otherwise described herein, each of the first snap-fit connectors includes a second flange that extends from the connector body in an opposite direction of the first flange, and wherein the second snap-fit connector includes a second flexible hook configured to engage the second flange. For example, as explained above, first snap-fit connector 2170 includes a second flange 2175 that extends in an opposite direction from connector body 2172 compared to first flange 2174. Further, second flange 2175 is configured to be secured by a second flexible hook 2185 of second snap-fit connector 2180.

In certain embodiments of the fastenable building surface system as otherwise described herein, each first flexible hook includes an outer angled ramp surface configured to deflect the flexible hook as the first snap-fit connector is inserted into the clip. For example, first flexible hook 2184 of second snap-fit connector includes an outer surface that has the shape of an angled ramp so as to allow the insertion of first snap-fit connector to push the flexible hook laterally as the first snap-fit connector is inserted into the clip.

In certain embodiments of the fastenable building surface system as otherwise described herein, each first flexible hook includes a sharp inner edge configured to inhibit removal of the first snap-fit connector from the clip of the second snap-fit connector. For example, flexible hooks 2484 and 2485 of second snap-fit connector 2480, shown in FIG. 24 have sharp inner edges. The sharp inner edge of each flexible hook 2484 and 2485 promote a permanent connection of first snap-fit connector 2470 and second snap-fit connector 2480 when they are attached to one another.

In certain embodiments of the fastenable building surface system as otherwise described herein, each first flexible hook includes an angled inner edge configured to deflect the flexible hook as the first snap-fit connector is removed from the clip. For example, flexible hooks 2684 and 2685 of second snap-fit connector 2680, shown in FIG. 26 have angled inner edges, which promote a removable connection of the first and second snap-fit connectors. As a retraction force is exerted on first snap-fit connector 2670, the angled inner edges of flexible hooks 2684 and 2685 allow the hooks to be flexed outward so that first snap-fit connector 2670 can be removed from the second snap-fit connector 2680.

In certain embodiments of the fastenable building surface system as otherwise described herein, each of the second snap-fit connectors is secured to the support structure with at least one mechanical fastener. For example, in some embodiments the second snap-fit connectors are coupled to framing members or a surface of the support structure using screws or nails. In other embodiments, the second snap-fit connectors are secured to the support structure using an adhesive.

In certain embodiments of the fastenable building surface system as otherwise described herein, each of the second snap fit connectors includes a support platform, and wherein each support platform provides a contact surface for a respective first lapping projection of a building surface product. For example, second snap fit connector 2180, as shown in FIG. 22, includes a platform 2186. The platform serves as contact surface for the first lapping projection of the neighboring building surface product.

In certain embodiments of the fastenable building surface system as otherwise described herein, the plurality of building surface products have different shapes that are arranged in a pattern, and wherein the first building surface product has a first shape and the second building surface product has a second shape. A building surface system with such a construction is shown in FIG. 19, and described above.

In certain embodiments of the fastenable building surface system as otherwise described herein, a joint between the first building surface product and the second building surface product is free of any joint compound. For example, the first and second edges of the building surface products may be configured to have an attractive appearance when the building surface products are adjacent, without the need of any joint compound to hide the joints. Accordingly, the building surface system can be constructed without the need to apply or finish any joint compound, which can save considerable effort in preparing the building surface.

In certain embodiments of the fastenable building surface system as otherwise described herein, a front surface of each of the building surface products is covered with a layer of paint. In some embodiments, a first of the building surface products is painted a first color and a second of the building surface products is painted a second color. A building surface system with such a construction is shown in FIG. 20, and described above.

In another aspect, the disclosure provides a joint support configured to cover a joint between coplanar wall panels. The joint support includes an elongate support strip with a first end, a second end, a first side edge, a second side edge, an inner surface, and an outer surface. The joint support also includes a facing sheet secured to the outer surface of the support strip. The facing sheet includes a first flap extending laterally beyond the first side edge of the support strip and a second flap extending laterally beyond the second side edge of the support strip. A first adhesive in disposed on an inside surface of the first flap and on an inside surface of the second flap.

Figure 34:
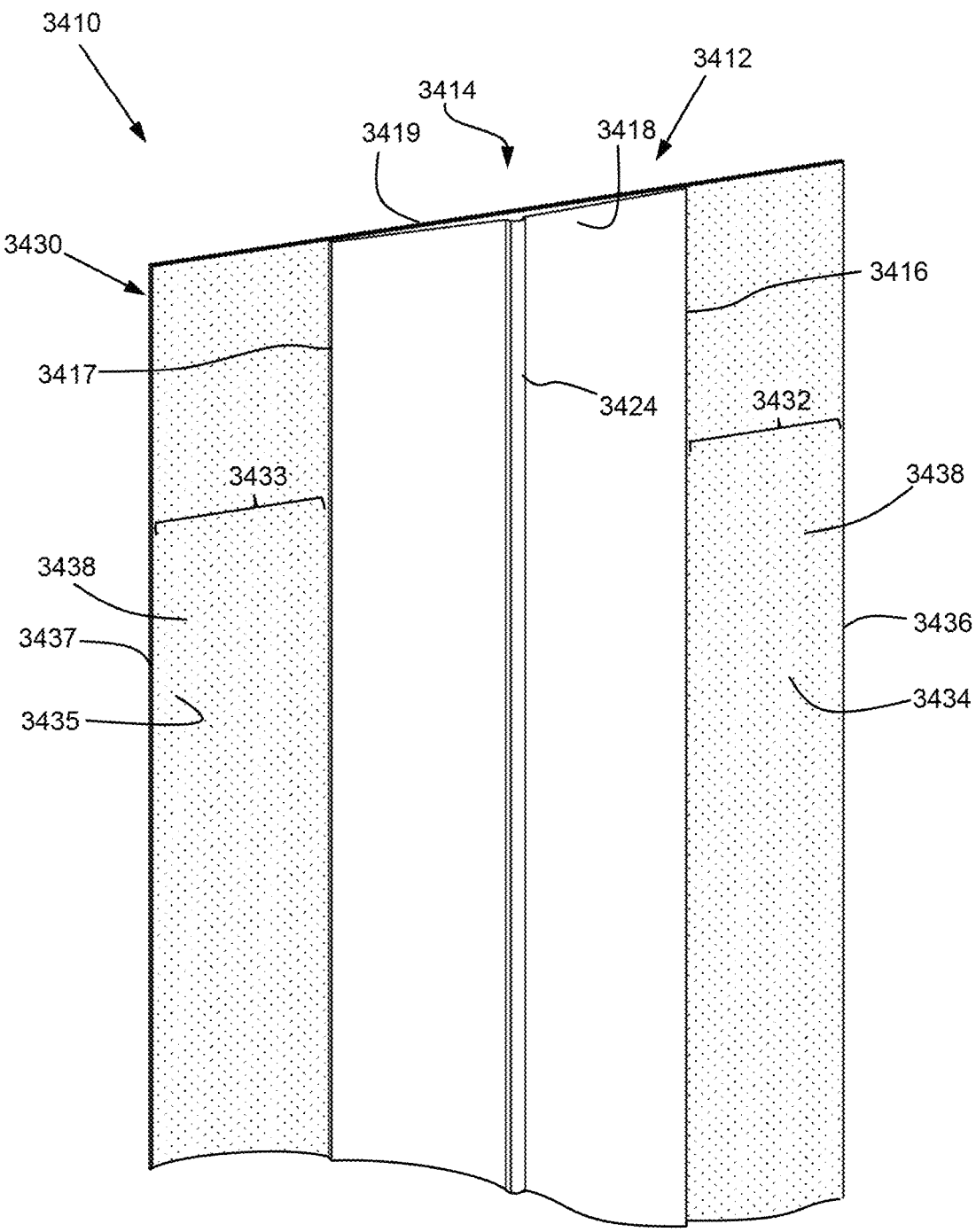
FIG. 34 is a schematic perspective view of a joint support according to an embodiment of the disclosure.

A portion of such a joint support is shown in perspective view in FIG. 34. Joint support 3410 includes an elongate support strip 3412 that has a first end 3414, a second end opposite the first end, a first side edge 3416, a second side edge 3417, an inner surface 3418 and an outer surface 3419. A facing sheet 3430 is secured to the outer surface 3419 of support strip 3412. The facing sheet 3430 includes a first flap 3432 with an inside surface 3434 and an outside surface 3436. The first flap 3432 extends laterally beyond the first side edge 3416 of support strip 3412. The facing sheet 3430 also includes a second flap 3433 that similarly has an inside surface 3435 and an outside surface 3437. Likewise, second flap 3433 extends laterally beyond the second side edge 3417. A first adhesive 3438 is disposed on the inside surface 3434 of first flap 3432 and on the inside surface 3435 of second flap 3433.

As explained in more detail below, in some embodiments, the joint support is configured to cover the seam between two coplanar wall boards. The term coplanar, as used herein, includes wall boards that are substantially coplanar, for example, including wall panels that are angled no more than 3 degrees from one another in any direction, or no more than 2 degrees, or no more than 1 degree, or no more than 0.5 degrees. The support strip of the joint support is placed directly over the seam and the first and second flaps are respectively attached to the two wall boards.

The use of the joint support has several advantages over conventional wall board joint preparations. For example, in some embodiments, the joint support is installed without a typical tape and embed step, where a joint tape is embedded in joint compound. Skipping the embedding of joint tape within joint compound along the seam can save considerable time. Not only is the process of embedding the joint tape within joint compound time consuming. After the joint has been filled, additional preparation steps typically must wait for the joint compound to dry, which often requires at least 24 hours. Accordingly, using the joint support of the disclosure can substantially reduce both preparation and waiting times.

Further, in certain embodiments, use of the joint support displaces a thick layer of joint compound. Such thick layers of compound are more susceptible to cracking and other damage than a thin layer that might cover the joint support. Accordingly, a wall joint constructed with the joint support of the disclosure may be more robust. Moreover, this added structural integrity of a wall board joint made with the joint support of the disclosure can allow a wider range of uses for completed wall board constructions. For example, wall boards are typically installed and finished after the frame of the wall is in place and stationary. However, by reducing the likelihood of cracking, a section of finished wall that utilizes the joint support of the disclosure can be transported and then installed. Accordingly, prefabricated constructions can be made using finished or partially finished walls that contain standard wall boards with the use of the joint support of the disclosure.

Furthermore, the joint support of the disclosure may provide added safety and performance benefits compared to a typical joint prepared with tape and joint compound. For example, in some embodiments, the joint support provides added fire protection. For example, where the seams of a typical wall board construction might begin to separate during a fire and allow the fire to penetrate through the wall board, the joint support of the disclosure can cover the seam between the wall panels and hinder advancement of the fire through the seam. Similarly, by covering the seam between the wall panels, the joint support of the disclosure can also impeded water intrusion or mold advancement.

In certain embodiments of the joint support as otherwise described herein, at a first position along a length of the support strip, the outer surface extends in a straight line from the first side edge to the second side edge. For example, as shown in the cross-sectional view in FIG. 35, the outside surface 3419 of joint support 3412 extends in a straight line from first side edge 3416 to second side edge 3417. Further, in some embodiments, the outer surface extends in a straight line from the first side edge to the second side edge at every position along the length of the support strip. In other words, in some embodiments, the outside surface of the support strip runs straight across the width of the joint support at every point along the length of the support strip. For example, in some embodiments, the outer surface of the support strip is planar or flat such that the outside surface of the support strip runs in a straight line in all directions. For example, support strip 3412 of joint support 3410 is planar.

In other embodiments, the joint support is a rolled product, and the support strip is curved along its length in the form of a coil. For example, in some embodiments the support strip and facing sheet are formed of a flexible material that may be rolled along its length. Such a rolled product may be convenient for storage and transport of the joint support. It should be understood that the above description of the shape of the outer surface of the support strip relates to the shape when the support strip is at rest. For example, embodiments where the outer surface is planar may be bent or twisted to have a curve across the width of the support strip, but it should be understood that the outer surface is planar when no loads are applied to the joint support. Likewise, a joint support that is formed as a rolled product may be unrolled into a straight shape when installed, but is rolled when it is at rest.

In certain embodiments of the joint support as otherwise described herein, a cross section of the support strip is uniform in shape along the length of the support strip. For example, support strip 3412 of joint support 3410 has a uniform cross section along its length. In other embodiments, the shape of the support strip varies along the length thereof. For example, in some embodiments, the thickness of the support strip varies along its length. In other embodiments, the width of the support strip varies along its length.

In certain embodiments of the joint support as otherwise described herein, a length of the joint support is at least 4 feet, e.g., at least 6 feet, e.g., at least 8 feet. Further, in some embodiments, the length of the joint support is no more than 20 feet, e.g., no more than 15 feet, e.g., no more than 12 feet. For example, in some embodiments where the joint support is substantially planar, the length of the joint support is limited to no more than 20 feet. In other embodiments, the length of the joint support is longer. For example, in some embodiments a long joint support is used in connection with long wall panels. Further, in some embodiments where the joint support is a rolled product, the joint support is considerably longer, such as 100 feet or more.

In certain embodiments of the joint support as otherwise described herein, a width of the support strip is at least 1 inch, e.g., at least 2 inches, e.g., at least 3 inches. Further, in some embodiments, the width of the support strip is no more than 10 inches, e.g., no more than 8 inches, e.g., no more than 5 inches. For example, in some embodiments the width of the support strip is in a range from 1 inch to 10 inches, e.g., from 2 inches to 8 inches, e.g., from 3 inches to 5 inches.

In certain embodiments of the joint support as otherwise described herein, the first and second flaps of the facing sheet extend at least 1 inch beyond the respective first and second side edges of the support strip, e.g., at least 1.5 inches, e.g., at least 2 inches. Further, in some embodiments, the first and second flaps of the facing sheet extend no more than 6 inches beyond the respective first and second side edges of the support strip, e.g., no more than 5 inches, e.g., no more than 4.5 inches. For example, in some embodiments, the first and second flaps extend in a range of 1 inch to 6 inches from a respective side edge of the support strip, e.g., 1.5 to 5 inches, e.g., 4.5 to 2 inches. In some embodiments the first and second flaps extend an equal distance beyond the respective sides of the support strip. In other embodiments, the first and second flaps are asymmetrical, and one flap extends beyond the respective edge further than the other flap.

In certain embodiments of the joint support as otherwise described herein, a thickness of the support strip is at least 0.02 inches, e.g., at least 0.03 inches, e.g., at least 0.05 inches. Further, in some embodiments, the thickness of the support strip is no more than 0.25 inches, e.g., no more than 0.15 inches, e.g., no more than 0.1 inches. For example, in some embodiments, the thickness of the support strip is in a range of 0.02 inches to 0.25 inches, e.g., from 0.03 inches to 0.15 inches, e.g., from 0.05 inches to 0.1 inches.

Figure 35:
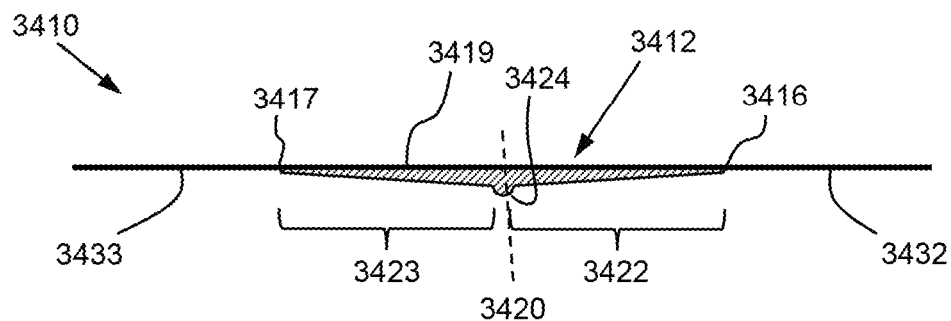
FIG. 35 is a schematic cross-sectional view the joint support of FIG. 34.

In certain embodiments of the joint support as otherwise described herein, a thickness of the support strip is greatest at a center line that extends along the length of the support strip. For example, in some embodiments, the thickness of the support strip is substantially equal across its width and the thickness is no greater than it is along the center line. In other embodiments, across the width of the support strip the thickness is greater at the center line than it is on either side of the center line. For example, as shown in FIG. 35, support strip 3412 of joint support 3410 has a center line 3420 across its width. Moreover, the thickness of support strip 3412 is thickest at the center line 3420 and is thicker than it is on either side of the center line 3420.

In certain embodiments of the joint support as otherwise described herein, the support strip includes a first portion that extends from the center line to the first side edge that tapers to a reduced thickness at the first side edge, and a second portion that extends from the center line to the second side edge that tapers to a reduced thickness at the second side edge. For example, as shown in FIG. 35, the support strip 3412 of joint support 3410 includes a first portion 3422 that tapers from a greater thickness near center line 3420 to a reduced thickness at first edge 3416. Likewise, supports trip 3412 also includes a second portion 3423 that tapers from a greater thickness near center line 3420 to a reduced thickness at second edge 3417. In some embodiments, the tapered first and second portions of the support strip may be configured to correspond to and fill the indent formed by the tapered edges of two adjacent wall panels.

In certain embodiments of the joint support as otherwise described herein, a thickness of the support strip at the first side edge is at least 0.005 inches, e.g., at least 0.010 inches, e.g., at least 0.015 inches. For example, in some embodiments, the support strip tapers from the center line to a thin edge that runs along the entire length of the support strip.

In certain embodiments of the joint support as otherwise described herein, the inner surface of the support strip includes a ridge extending along the center line. In some embodiments the ridge is formed as the peak where tapered first and second portions of the support strip meet at the center line. In other embodiments, the ridge is formed by an elongate protrusion that runs along the center line of the support strip. Still, in some embodiments, the ridge is formed by an elongate protrusion disposed on the peak formed where the tapered first and second portions of the support strip meet at the center line. For example, support strip 3412 includes a ridge 3424 that extends along the length of the support strip and is aligned with center line 3420, as shown in FIG. 35. The ridge 3424 is configured to be inserted into a groove formed at the seam between adjacent wall panels. For example, the slightly rounded corners at the edge of most wall panels may form a small groove where two of the wall panels meet. The ridge 3424 may be placed within such a groove. The ridge 3424 is effective both in filling the groove at the seam between wall panels and in locating the joint support 3410 along the seam.

In certain embodiments of the joint support as otherwise described herein, the first adhesive is a pressure sensitive adhesive. Accordingly, in some embodiments, the joint support is configured to be secured to adjacent wall panels by pressing the first and second flaps against the respective wall panels so as to activate the first adhesive and bond the first and second flaps to the wall panels. A variety of pressure sensitive adhesives are suitable for use in the joint supports and methods of the disclosure. Pressure sensitive adhesives are typically based on an elastomeric material, often with a tackifier to provide stickiness. In certain embodiments of the joint support as otherwise described herein, the pressure sensitive adhesive substance is based on an acrylic polymer, e.g., based on one or more acrylate or methacrylate monomers such as acrylic acid, isobutyl acrylate, n-propyl acrylate, n-butyl acrylate, ethyl acrylate, isopropyl acrylate, 2-ethylhexyl acrylate, lauryl acrylate, lauryl methacrylate, isodecyl acrylate, isooctyl acrylate, tridecyl methacrylate, tridecyl acrylate, 2-ethylhexyl methacrylate, and caprolactone acrylate. Other suitable systems can include epoxy resins, polyvinyl acetate, ethylene-vinyl acetate copolymer (e.g., with high vinyl acetate content); butyl rubbers, natural rubbers, nitriles, silicone rubbers, polyurethane, styrene-butadiene rubbers, styrene-isoprene rubbers, styrene block copolymers like styrene-butadiene-styrene (SBS), styrene-ethylene/butylene-styrene (SEBS), styrene-ethylene/propylene (SEP), and styrene-isoprene-styrene (SIS). A variety of tackifiers can be used, depending on the elastomer, e.g., resins (e.g. rosins and their derivates, terpenes and modified terpenes, aliphatic, cycloaliphatic and aromatic resins, hydrogenated hydrocarbon resins, and their mixtures, terpene-phenol resins (especially with ethylene-vinyl acetate adhesives)), novolacs, silicone tackifiers based on so-called "MQ" silicate resins (based on monofunctional trimethylsilane reacted with silicon tetrachloride, especially for silicone rubbers). Many other adhesives and adhesive precursors are known in the art with different modes of operation and may be used as the pressure sensitive adhesive substance. The pressure sensitive adhesive substance can be selected to provide compatibility with the other materials and provide a necessary amount of strength to bond with a building surface.

In certain embodiments of the joint support as otherwise described herein, the first adhesive is water activated. For example, in some embodiments, the first adhesive disposed on the first and second flaps becomes activated when wet with water. Accordingly, during installation, the installer may wet the surface of the first and second flaps and then apply them to the respective wall panels on either side of the joint seam. The adhesive will then form a bond between the flaps and the respective wall panel surfaces.

In certain embodiments of the joint support as otherwise described herein, the facing sheet extends across the width of the outer surface. For example, facing sheet 3430 of joint support 3410 extends across the entire width of the joint support 3410 passing over the entire outer surface 3419 of support strip 3412. Thus, the lateral sides of facing sheet 3430 form the first flap 3432 and second flap 3433. In other embodiments, the facing sheet includes respective sections that form the first flap and second flap. For example, in some embodiments the facing sheet is formed by two strips that are respectively attached near the first and second side edges of the support strip with a gap along the center of the support strip. Further, in some embodiments, the facing sheet extends along the entire length of the support strip, while in other embodiments the facing sheet is formed in sections along the outer surface of the support strip.

In certain embodiments of the joint support as otherwise described herein, the facing sheet is paper. In other embodiments, the facing sheet is formed of another sheet of material, such as a woven or non-woven mat. For example, in some embodiments the facing sheet includes a fiberglass mat or a polymer sheet. Other material sheets are also possible.

In certain embodiments of the joint support as otherwise described herein, the facing sheet is sandable or dissolvable. Accordingly, in some embodiments, the facing sheet of the joint support can be finished in manner similar to a typical joint formed primarily of joint compound.

In certain embodiments of the joint support as otherwise described herein, the joint support further includes a release liner covering the inner surface of the first flap and the inner surface of the second flap. Such release liners serve to prevent unwanted adhesion of the first adhesive with other structures or parts prior to installation of the joint support. For example, before applying the joint support to a building surface, the release liners may be peeled off or otherwise removed from the inside surface of the first flap and the inside surface of the second flap so as to expose the first adhesive disposed on the inside surface of the first flap and the inside surface of the second flap to adhere to the respective wall panels.

In certain embodiments of the joint support as otherwise described herein, the joint support further includes a second adhesive disposed on the inner surface of the support strip. For example, in some embodiments, adhesive is provided across the entire width of the joint support on its inside surface, including the first adhesive on the first and second flaps of the facing sheet and the second adhesive on the inside surface of the support strip. Accordingly, such a joint support may be adhered to the wall panels across its entire width. In other embodiments, the second adhesive is provided on only a portion of the inside surface of the support strip, such as near the first and second edges. In some embodiments, the second adhesive has the same composition as the first adhesive. In other embodiments, the second adhesive has a different composition than the first adhesive. Further, in some embodiments, the inside surface of the support strip is free of any adhesive and the joint support is adhered to the wall panels only using the first and second flaps of the facing sheet.

In certain embodiments of the joint support as otherwise described herein, the facing sheet is secured to the outer surface of the support strip with a third adhesive. For example, in some embodiments, a third adhesive is provided between the support strip and the facing sheet so as to bond the facing sheet to the support strip. In other embodiments the facing sheet and support strip are attached by another means. For example, in some embodiments the facing sheet is bonded to the support strip during a manufacturing process.

In certain embodiments of the joint support as otherwise described herein, the support strip is formed of plastic. For example, the support strip may include at least one of High Density Polyethylene (HDPE), Polyethylene Terephthalate (PET), Acrylonitrile Butadiene Styrene (ABS) copolymer, Acrylonitrile Styrene Acrylate (ASA) copolymer, Polyvinyl Chloride (PVC), PETG, high-impact polystyrene (HIPS), Polycarbonate (PC), Polylactic Acid (PLA), or Polyester. In certain embodiments of the joint support as otherwise described herein, the support strip is reinforced with a fibrous material. For example, in some embodiments, the support strip is reinforced with glass fibers. In other embodiments, the support strip is reinforced with cellulous or other fibers. In other embodiments of the joint support as otherwise described herein, the support strip is formed of metal. For example, in some embodiments, the support strip of the support strip is formed of steel. In other embodiments, the support strip is formed of aluminum or an aluminum alloy.

In another aspect, the disclosure provides a joint supported wall panel construction including a first wall panel, a second wall panel and a joint support according to the disclosure. The second wall panel is adjacent to and substantially coplanar with the first wall panel forming a seam between the between the first wall panel and the second wall panel. The joint support is disposed over the first wall panel and the second wall panel and covers at least a portion of the seam.

Figure 36:
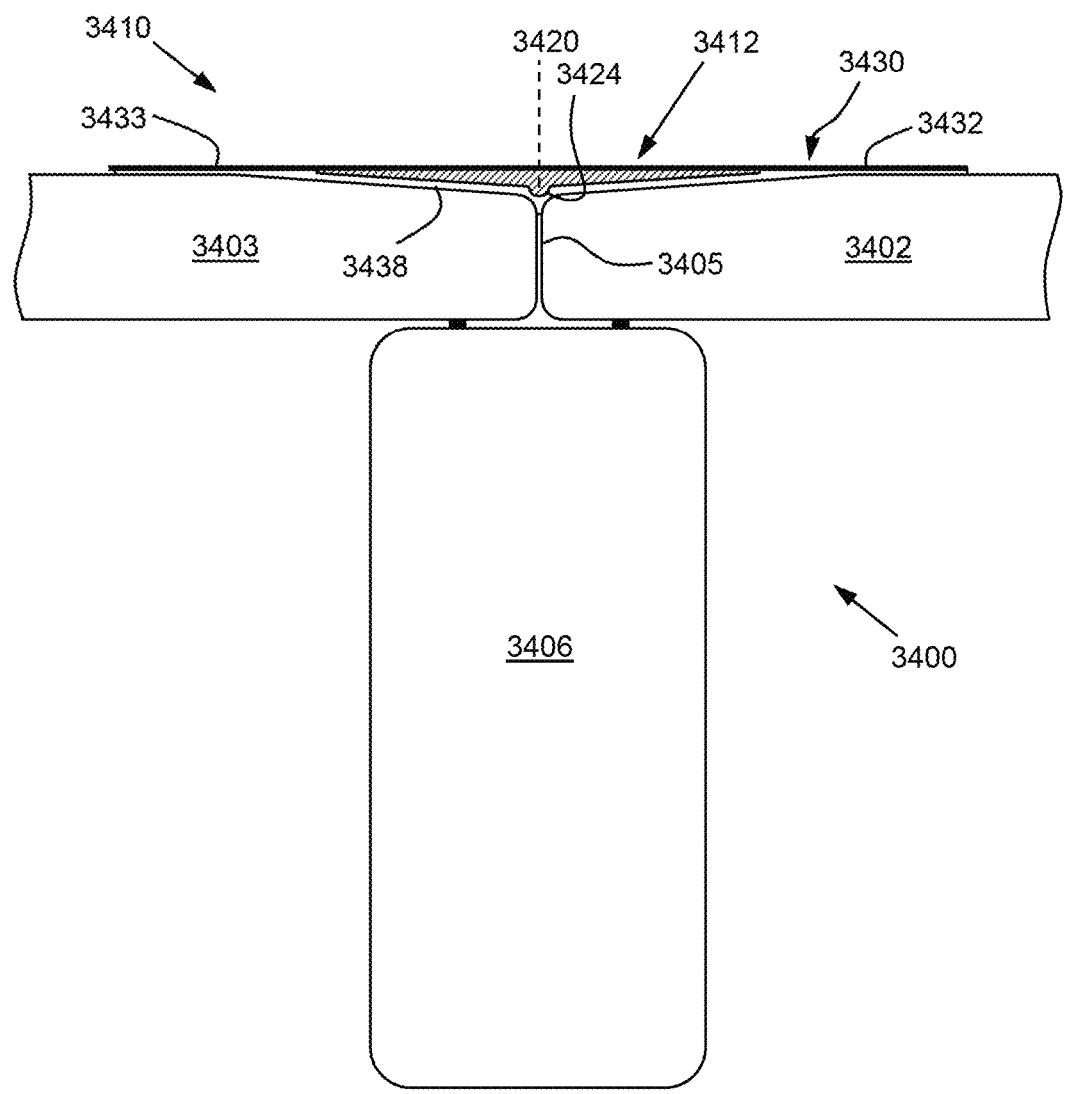
FIG. 36 is a schematic cross-sectional view of a portion of a wall panel construction using the joint support of FIG. 34 according to an embodiment of the disclosure.

A cross-sectional view of such a joint supported wall panel construction utilizing joint support 3410 is shown in FIG. 36. Wall panel construction 3400 includes a first wall panel 3402 and a second wall panel 3403. Second wall panel 3403 is adjacent to first wall panel 3402 and forms a seam 3405 therebetween. Further, first wall panel 3402 and second wall panel are coplanar. As set forth above, the term coplanar, as used herein, includes wall boards that are substantially coplanar, for example, including wall panels that are angled no more than 3 degrees from one another in any direction, or no more than 2 degrees, or no more than 34 degree, or no more than 0.5 degrees. Each of the wall panels 3402, 3403 is secured to a stud 3406 that forms a framing member of a wall frame. Joint support 3410 is disposed over the first wall panel 3402 and the second wall panel 3403 and covers the seam 3405 between the panels.

In certain embodiments of the joint supported wall panel construction as otherwise described herein, the first flap is adhered to the first wall panel and the second flap is adhered to the second wall panel. For example, as set forth above, joint support 3410 has a facing sheet 3430 including a first flap 3432 that extends laterally beyond support strip 3412 and a second flap 3433 that extends laterally beyond the opposite side of support strip 3412. As show in FIG. 36, in the wall panel construction 3400, first flap 3432 is adhered to first wall panel 3402 with a first adhesive 3438. Likewise second flap 3433 is adhered to second wall panel 3403 with the first adhesive 3438.

In certain embodiments of the joint supported wall panel construction as otherwise described herein, the inner surface of the support strip includes a ridge extending along the center line, and the ridge is aligned with the seam between the first wall panel and the second wall panel. For example, ridge 3424 of support strip 3412, which extends along center line 3420 of support strip 3412, is aligned with the seam 3405 between first wall panel 3402 and second wall panel 3403. Ridge 3424 sits in a groove formed at the front surface of the interface of the two wall panels 3402, 3403, both filling the groove and helping to align joint support 3410 with the seam 3405 between the wall panels 3402, 3403.

In certain embodiments of the joint supported wall panel construction as otherwise described herein, the wall panels are drywall panels. For example, as will be appreciated by the person of ordinary skill in the art will appreciate, the wall panels may include a core that can be formed of a variety of materials. In certain embodiments, the core of the wall panel is formed from a gypsum plaster. In other embodiments, the core of the wall panel is formed from a struvite-K/syngenite plaster, such as a material described in International Patent Application Publication no. 2015/057732, which is hereby incorporated herein by reference in its entireties. Various additional materials suitable for use as a core of the wall panel include concrete, fiber-reinforced materials, foamed polymeric materials such as foamed polystyrene, mineral board materials, mineral fiber board materials, cellulosic materials, particle board materials, oriented strand board materials, or a combination thereof. Of course, the person of ordinary skill in the art will appreciate that other suitable materials may be used. The core can include a variety of fillers and additives, as the person of ordinary skill in the art will appreciate. For example, in some embodiments, the core may include one or more fillers, for example, selected from calcium carbonate, starch, sand, ceramic microspheres, perlite, foam, fibers, fly ash, slag, or cellulosic fillers, including wood particles and fibers. Similarly, in some embodiments, the core may include one or more additives including accelerators to increase the setting time, such as BMA or potash, water resistance, such as wax or silicone, sugars, retarders, cellulosic fibers, fiberglass fibers, boric acid, fire resistance, such as vermiculite, or other additives as the person of ordinary skill in the art will appreciate. The person of ordinary skill in the art will select filler(s) and/or additive(s) based on the particular core material and the particular properties desired for the overall wall panel. Further still, the wall panel may be formed of other materials, such as plywood, fiber board, acrylic, or sheets of other materials.

In certain embodiments of the joint supported wall panel construction as otherwise described herein, the construction further includes joint compound covering an outer surface of the joint support. For example, in some embodiments, after securing the joint support over the first and second wall panels, the joint support is covered with joint compound, as explained in more detail below. The joint compound may provide a smooth surface over the joint support obscuring any material edges or slight bumps in the vicinity of the joint support.

In certain embodiments of the joint supported wall panel construction as otherwise described herein, an interface between the inner surface of the support strip and the wall panels is free of joint compound. For example, in some embodiments, the joint support is secured over the wall panels before any joint compound is applied to the wall panels in the vicinity of the seam. For example, the space between the inner surface of support strip 3412 and the surface of the wall panels 3402, 3403 is filled with first adhesive 3438 and is free of any joint compound. In other embodiments, the interface between the support strip and the wall panels is closed tightly and free of any substances. Still, in other embodiments, joint compound is provided between the support strip and wall panels to seal the interface.

In certain embodiments of the joint supported wall panel construction as otherwise described herein, the construction further includes a layer of paint covering the joint compound. For example, in some embodiments, the joint is painted after joint compound provided over the joint support has dried. Further, in some embodiments, layers of primer and paint cover the joint compound that is applied over the joint support.

In another aspect, the disclosure provides a method of installing the joint support of the disclosure on a joint between two substantially coplanar wall panels so as to form the joint supported wall panel construction according to the disclosure. The method includes placing the joint support over first and second wall panels that are substantially coplanar so as to cover at least a portion of a seam between the first and second wall panels and with the inner surface of the support strip of the joint support adjacent to a surface of the wall panels. The method also includes securing the joint support to the wall panels by adhering the first flap of the facing sheet of the joint support to the first wall panel and adhering the second flap of the facing sheet of the joint support to the second wall panel.

Figure 37:
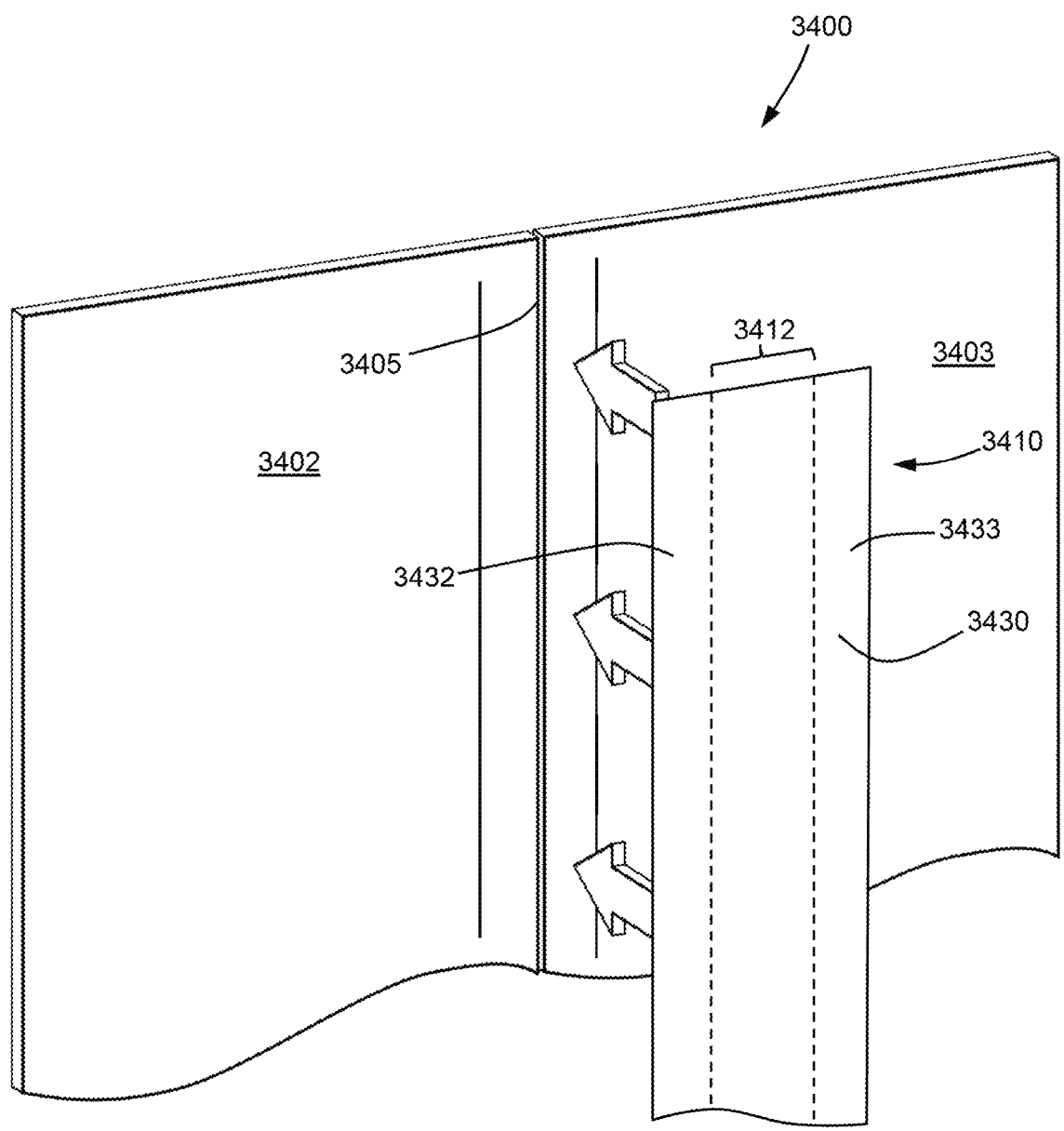
FIG. 37 is a schematic perspective view of a step in a method of installing a joint support according to an embodiment of the disclosure.
Figure 38:
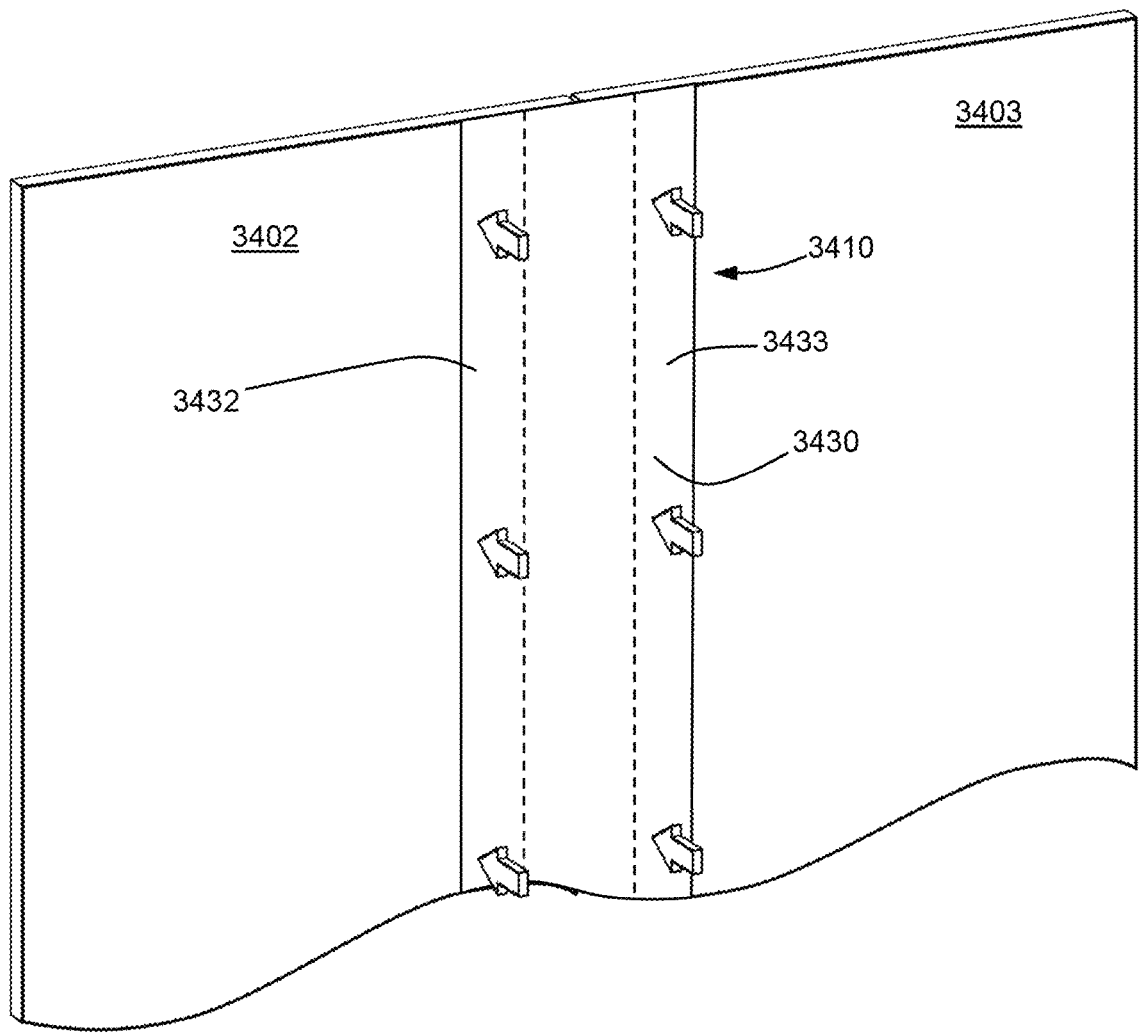
FIG. 38 is a schematic perspective view of another step in a method of installing a joint support according to an embodiment of the disclosure.

Such a method is shown in FIGS. 37 and 38, utilizing joint support 3410 to form joint support wall panel 3400. As shown in FIG. 37, joint support 3410 is placed over first wall panel 3402 and second wall panel 3403 so as to cover the seam 3405 between the wall panels 3402, 3403. Further, first wall panel 3402 and second wall panel 3403 are substantially coplanar and form a substantially flat surface with a seam. The inner surface of the support strip 3412 of the joint support 3410 is positioned adjacent to a surface of the wall panels 3402, 3403. As shown in FIG. 38, the joint support 3410 is secured to the wall panels 3402, 3403 by adhering the first flap 3432 of the facing sheet 3430 of joint support 3410 to the first wall panel 3402 and adhering the second flap 3433 of facing sheet 3430 of joint support 3410 to the second wall panel 3403. For example, the first and second flaps 3432, 3433 are pressed against the respective wall panels 3402, 3403, as shown in FIG. 38.

In certain embodiments of the method of installing the joint support as otherwise described herein, the joint support is secured to the wall panels without applying tape or joint compound between the joint support and the wall panels. For example, in the method shown in FIG. 37, joint support 3410 is applied directly to the facing sheets of the first and second wall panels 3402, 3403, with the adhesive on the joint support 3410 holding it in place.

Figure 39:
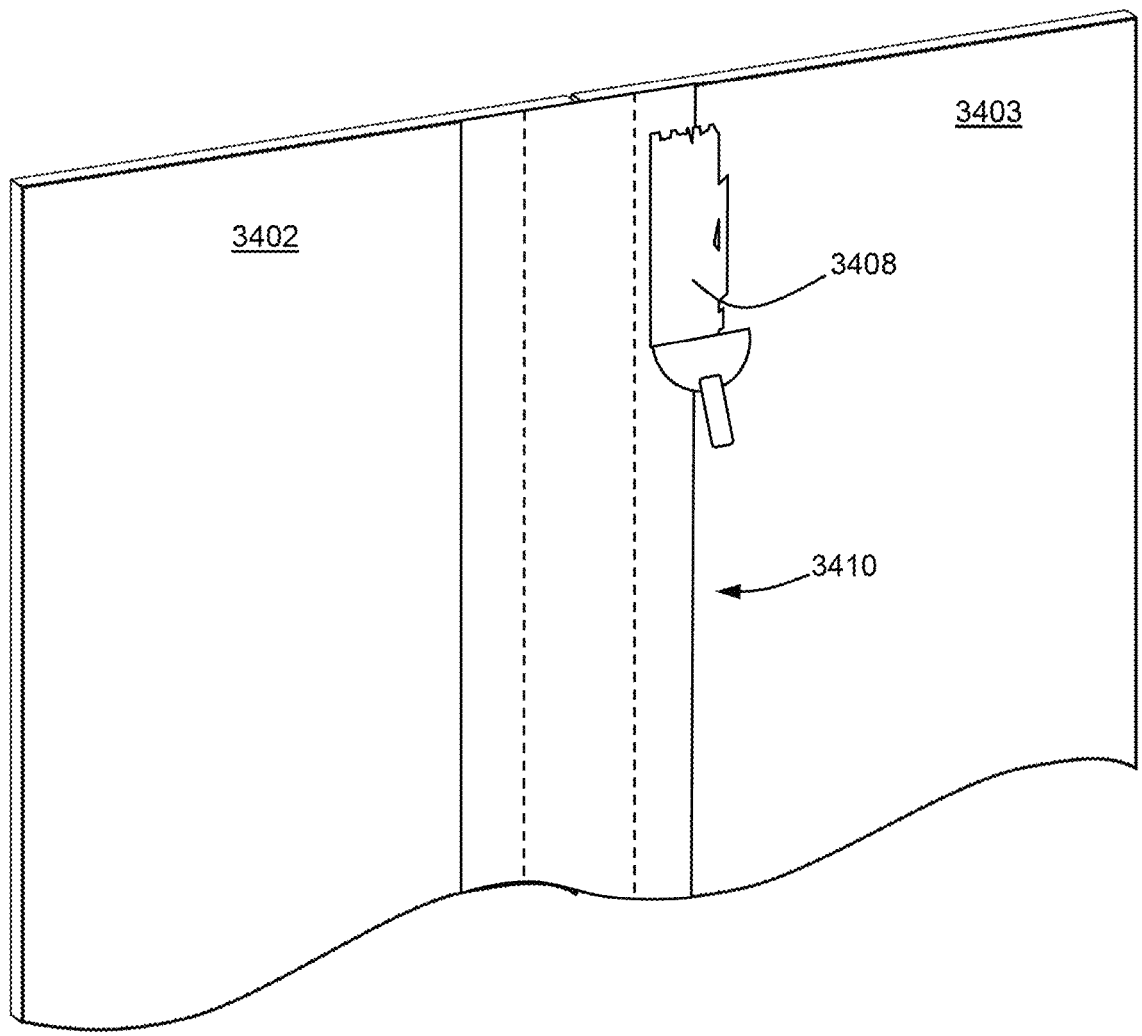
FIG. 39 is a schematic perspective view of yet another step in a method of installing a joint support according to an embodiment of the disclosure.

In certain embodiments of the method of installing the joint support as otherwise described herein, the method further includes coating the facing sheet with joint compound. For example, as shown in the example method illustrated in FIG. 39, joint compound 3408 is applied over the joint support 3410. The joint compound may be feathered outward from the seam to form a smooth transition from the joint support to the wall panels 3402, 3403.

Figure 40:
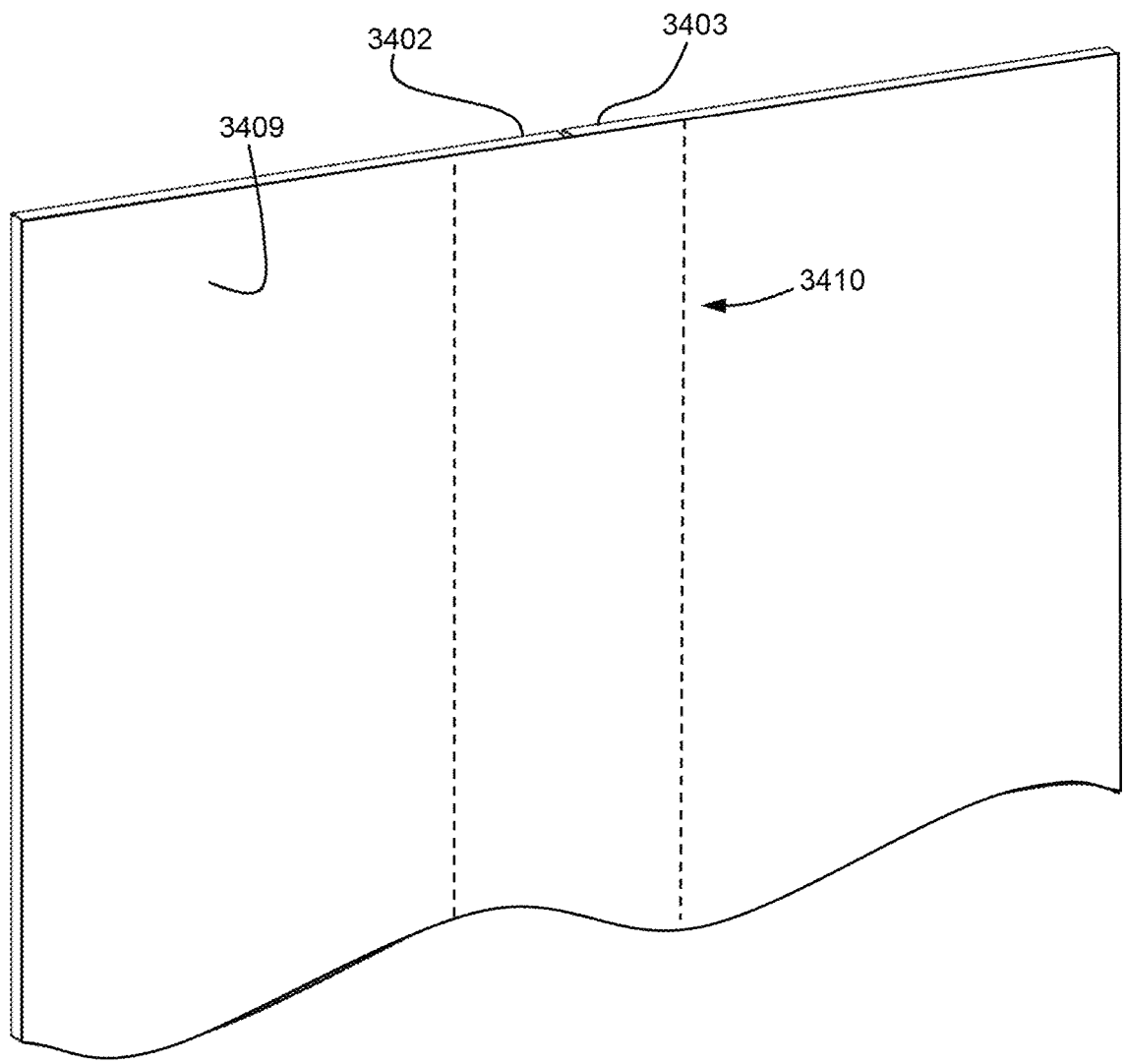
FIG. 40 is a schematic perspective view of another step in a method of installing a joint support according to an embodiment of the disclosure.

In certain embodiments of the method of installing the joint support as otherwise described herein, the method further includes covering the joint compound with a layer of paint. For example, as shown in the example method illustrated in FIG. 40, paint 3409 is applied over the joint compound that covers the joint support and the surface of the wall panels 3402, 3403, thereby forming a smooth wall surface.

In another aspect, the disclosure provides an overlapping wall panel construction that includes a first wall panel, a second wall panel, and a joint adhesive disposed between the first and second wall panels. The first wall panel has a front face, a rear face, a first edge, a second edge, and a rear projection along the first edge that is coextensive with the rear face and extends past the front face. The rear projection of the first wall panel includes a front-facing attachment surface. The second wall panel also has a front face, a rear face, a first edge, and a second edge. The second wall panel further includes a front projection along the second edge that is coextensive with the front face and extends past the rear face. The front projection of the second wall panel includes a rear-facing attachment surface and overlaps the rear projection of the first wall panel so as to form an overlapping joint and an interface between the front-facing attachment surface of the first wall panel and the rear-facing attachment surface of the front projection of the second wall panel. The joint adhesive is disposed in the interface and bonds the front projection of the second wall panel to the rear projection of the first wall panel.

It should be understood that the front and rear facing attachment surfaces may directly "face" the corresponding directions or may be angled with respect to these directions. For example, the front facing attachment surface of the rear projection at least partially faces the front direction of the wall panels. Likewise, the rear facing attachment surface of the front projection at least partially faces the front direction of the wall panels. In other words, before the wall panels are joined, the front facing attachment surface is viewable from the front of the wall panels and the rear facing attachment surface is viewable from behind the wall panels.

Figure 41:
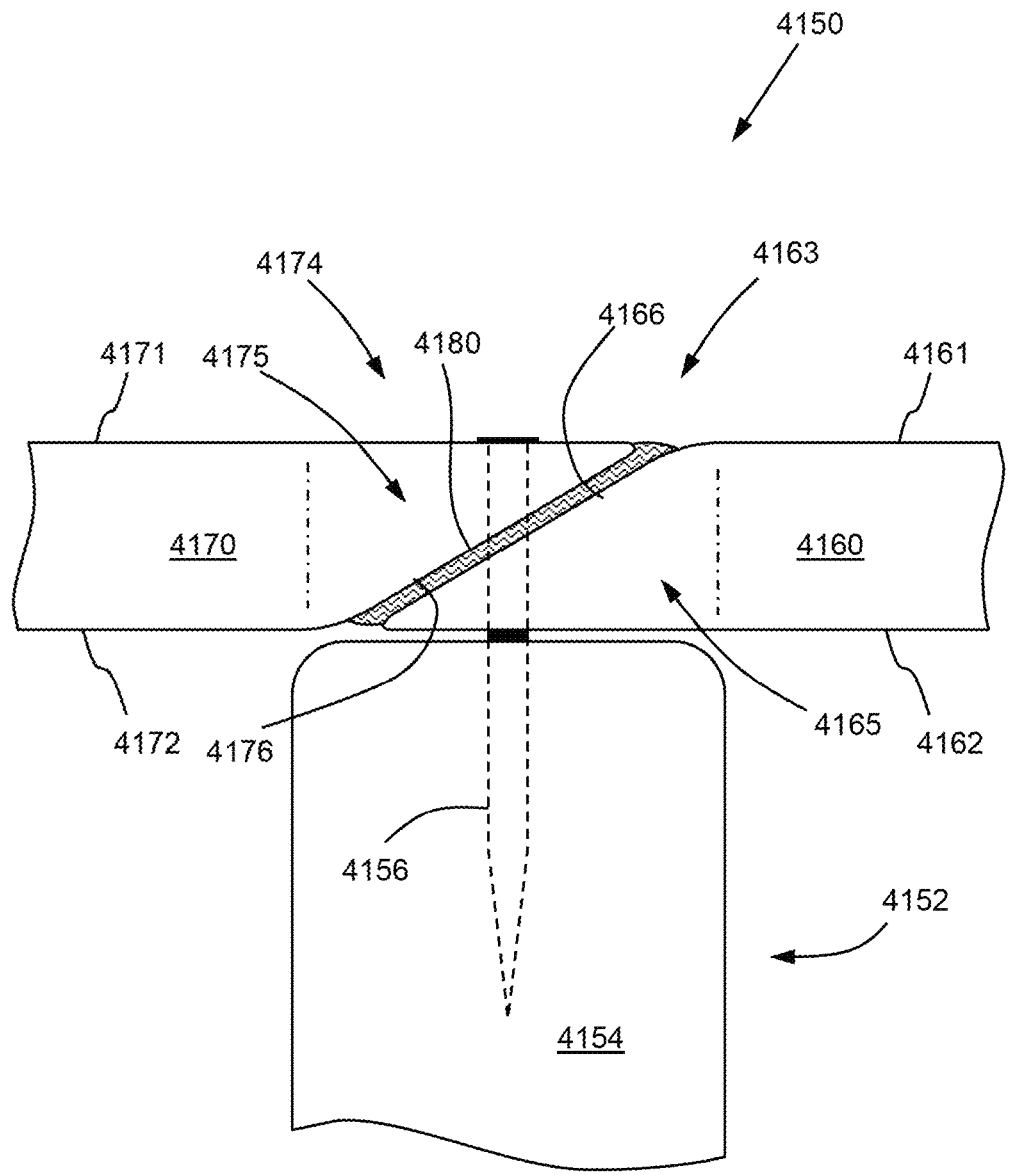
FIG. 41 is a schematic cross-sectional view of a portion of an overlapping wall panel construction according to an embodiment of the disclosure.

A section of such an overlapping wall panel construction is shown in FIG. 41. Overlapping wall panel construction 4150 includes a first wall panel 4160, a second wall panel 4170, and a joint adhesive 4180 disposed between the first and second wall panels 4160, 4170. The first wall panel has a front face 4161, a rear face 4162, a first edge 4163, and a second edge 4164 (see FIG. 44). The first wall panel 4160 also includes a rear projection 4165 that runs along first edge 4163, is coextensive with rear face 4162, and extends past the front face 4161. The rear projection 4165 of first wall panel 4160 also includes a front-facing attachment surface 4166. Similar to first wall panel 4160, second wall panel 4170 also has a front face 4171, a rear face 4172, a first edge 4173 (see FIG. 47), and a second edge 4174. The second wall panel 4170 further includes a front projection 4175 extending along the second edge 4174 that is coextensive with the front face 4171 and extends past the rear face 4172. The front projection 4175 of the second wall panel 4170 includes a rear-facing attachment surface 4176 and overlaps the rear projection 4165 of the first wall panel 4169. Accordingly, the first and second wall panels 4160, 4170 form an overlapping joint with an interface between the front-facing attachment surface 4166 of the rear projection 4165 of the first wall panel 4160 and the rear-facing attachment surface 4176 of the front projection 4175 of the second wall panel 4170. The joint adhesive 4180 is disposed in the interface and bonds the front projection 4175 of the second wall panel 4170 to the rear projection 4165 of the first wall panel 4160.

In certain embodiments of the overlapping wall panel construction as otherwise described herein, the front-facing attachment surface of the rear projection of the first wall panel extends at an angle to the rear face of the first wall panel, and the rear-facing attachment surface of the front projection of the second wall panel extends at an angle to the front face of the second wall panel. For example, front-facing attachment surface 4166 of rear projection 4165 of the first wall panel 4160 extends at an angle to the rear face 4162 of first wall panel 4160. Likewise, rear-facing attachment surface 4176 of front projection 4175 of second wall panel 4170 extends at an angle to the front face 4171 of second wall panel 4170. Accordingly, the interface between front-facing attachment surface 4166 and rear-facing attachment surface 4176 is disposed at an angel to the plane of the first and second wall panels 4160, 4170. The angle increases the area of both attachment surfaces thereby strengthening the bond between the first and second wall panels 4160, 4170 that is formed by the joint adhesive.

In certain embodiments of the overlapping wall panel construction as otherwise described herein, the rear projection of the first wall panel has the shape of a triangular prism and the front-facing attachment surface extends from the rear face of the first wall panel to the front face of the first wall panel, and the front projection of the second wall panel has the shape of a triangular prism and the rear-facing attachment surface extends from the front face of the second wall panel to the rear face of the second wall panel. For example, rear projection 4165 of first wall panel 4160 has the shape of a triangular prism, as indicated by the triangular shape of the cross-section shown in FIG. 41. The front-facing attachment surface 4166 extends at an angle from the rear face 4162 of first wall panel 4160 to the front face 4163 of first wall panel 4160. Likewise, front projection 4175 of second wall panel 4170 also has the shape of a triangular prism and rear-facing attachment surface 4176 extends at an angle from front face 4171 of second wall panel 4170 to rear face 4172 of second wall panel 4170. The dashed lines within the wall panels of FIG. 41 help identify the portion of the wall panels 4160, 4170 identified as respective projections 4165, 4175.

In certain embodiments of the overlapping wall panel construction as otherwise described herein, an angle between the front-facing attachment surface of the rear projection and the rear face of the first wall panel is substantially the same as an angle between the rear-facing attachment surface of the front projection and the front face of the second wall panel. The phrase "substantially the same," as used herein, refers to values that are within 5% of one another. For example, the angle between front-facing attachment surface 4166 and rear face 4162 of first wall panel 4160 is the same as the angle between rear facing attachment surface 4176 and front face 4171 of second wall panel 4170. Accordingly, with the first and second wall panels 4160, 4170 adjacent to one another, front-facing attachment surface 4166 lies parallel to rear-facing attachment surface 4176 so that a thin layer of joint adhesive may bond the two surfaces together.

Figure 42:
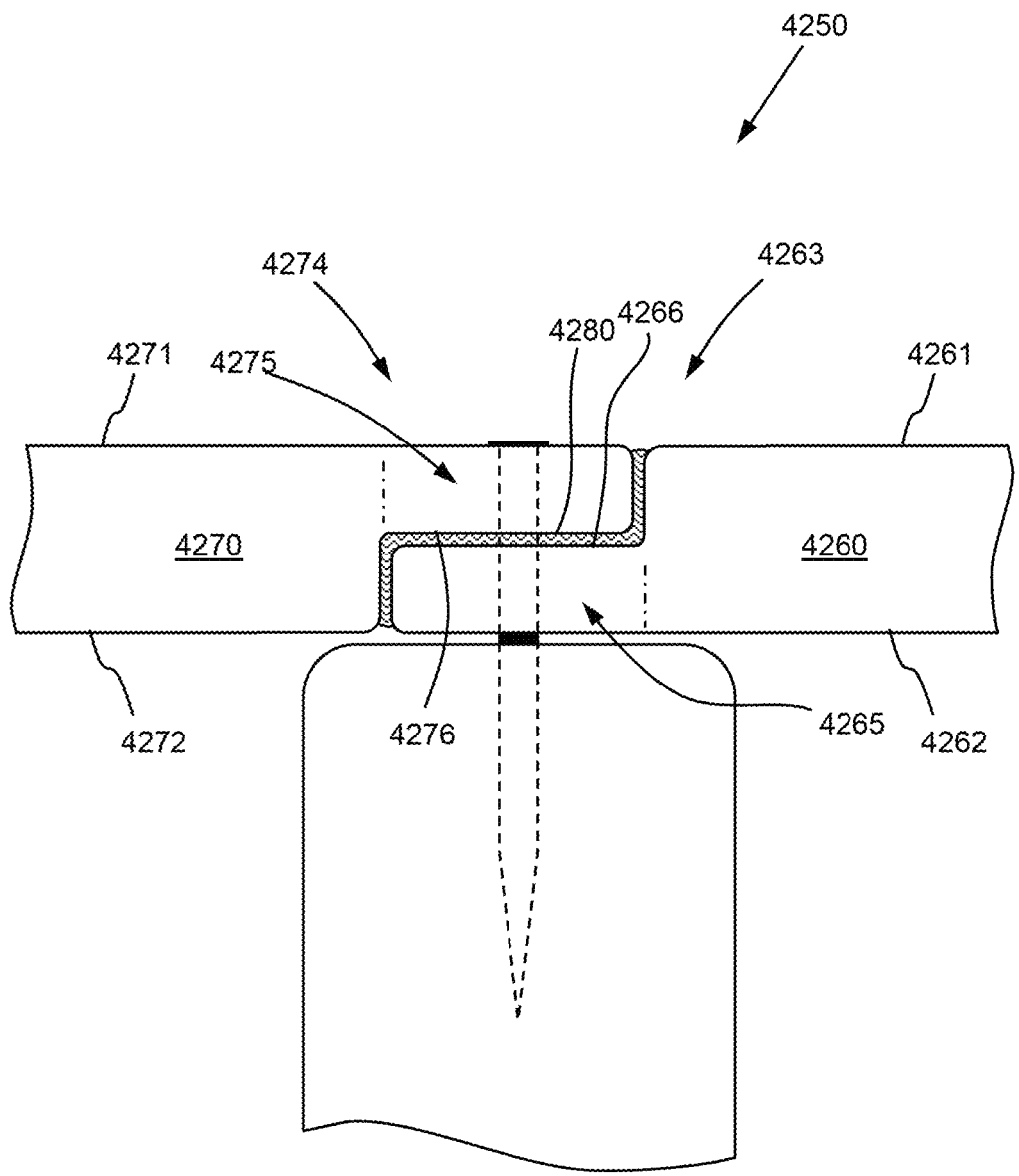
FIG. 42 is a schematic cross-sectional view of a portion of an overlapping wall panel construction according to another embodiment of the disclosure.

In certain embodiments of the overlapping wall panel construction as otherwise described herein, the rear projection of the first wall panel is flat and the front projection of the second wall panel is flat. A section of such an overlapping wall panel construction is shown in FIG. 42. Overlapping wall panel construction 4250 includes a first wall panel 4260, a second wall panel 4270, and a joint adhesive 4280 disposed between the first and second wall panels 4260, 4270. The first wall panel 4260 has a front face 4261, a rear face 4262, a first edge 4263, and a second edge opposite the first edge. The first wall panel 4260 also includes a rear projection 4265 that runs along first edge 4263, is coextensive with rear face 4262, and extends past the front face 4261. The rear projection 4265 of first wall panel 4260 also includes a front-facing attachment surface 4266. Similar to first wall panel 4260, second wall panel 4270 also has a front face 4271, a rear face 4272, a first edge, and a second edge 4274. The second wall panel 4270 further includes a front projection 4275 extending along the second edge 4274 that is coextensive with the front face 4271 and extends past the rear face 4272. The front projection 4275 of the second wall panel 4270 includes a rear-facing attachment surface 4276 and overlaps the rear projection 4265 of the first wall panel 4269. Both the rear projection 4265 of first wall panel 4260 and the front projection 4275 of second wall panel 4270 are flat so as to form a lapped configuration with an interface between the front-facing attachment surface 4266 of the rear projection 4265 of the first wall panel 4260 and the rear-facing attachment surface 4276 of the front projection 4275 of the second wall panel 4270. The joint adhesive 4280 is disposed in the interface and bonds the front projection 4275 of the second wall panel 4270 to the rear projection 4265 of the first wall panel 4260.

In certain embodiments of the overlapping wall panel construction as otherwise described herein, a thickness of the rear projection is substantially the same as a thickness of the front projection. Further, in some embodiments, the thickness of the rear projection of the first wall panel is about half the thickness of the first wall panel and the thickness of the front projection of the second wall panel is about half the thickness of the second wall panel. For example, the thickness of rear projection 4265 of first wall panel 4260 is slightly less than half the thickness of first wall panel 4260. Likewise, the thickness of front projection 4275 of second wall panel 4270 is slightly less than half the thickness of second wall panel 4270. Because the first and second wall panels 4260 and 4270 are the same thickness, the thickness of the rear projection 4265 of first wall panel 4260 is the same as the thickness of front projection 4275 of second wall panel 4270. Accordingly, when front projection 4275 overlaps rear projection 4265, the thickness of the overlapping projections is substantially equal to the thickness of each wall panel 4260, 4270. Thus, the overlapping wall panels may form a smooth surface.

In certain embodiments of the overlapping wall panel construction as otherwise described herein, the rear projection of the first wall panel includes a first base that is coextensive with the rear face of the first wall panel and a first flange that extends forward from the base and forms a first groove between the first flange and a core of the first wall panel. Likewise, the front projection of the second wall panel includes a second base that is coextensive with the front face of the second wall panel and a second flange that extends rearward from the second base and forms a second groove between the second flange and a core of the second wall panel. Further, the first flange of the first wall panel fits in the second groove of the second wall panel and the second flange of the second wall panel fits in the first groove of the first wall panel.

Figure 43:
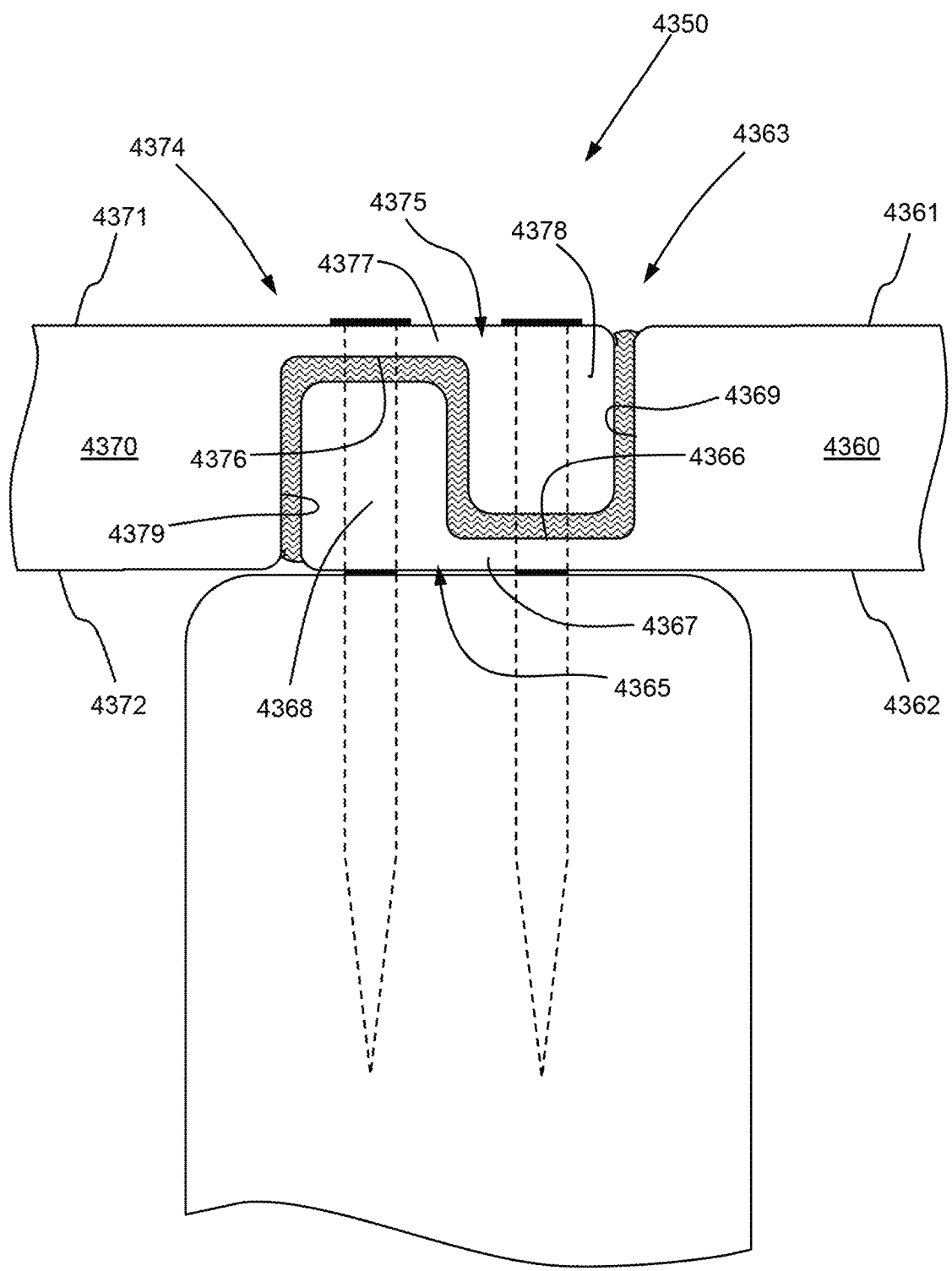
FIG. 43 is a schematic cross-sectional view of a portion of an overlapping wall panel construction according to yet another embodiment of the disclosure.

A section of such an overlapping wall panel construction is shown in FIG. 43. Overlapping wall panel construction 4350 includes a first wall panel 4360, a second wall panel 4370, and a joint adhesive 4380 disposed between the first and second wall panels 4360, 4370. The first wall panel 4360 has a front face 4361, a rear face 4362, a first edge 4363, and a second edge opposite the first edge. The first wall panel 4360 also includes a rear projection 4365 that runs along first edge 4363, is coextensive with rear face 4362, and extends past the front face 4361. The rear projection 4365 of first wall panel 4360 includes a first base 4367 that is coextensive with the rear face 4362 of the first wall panel 4360 and a first flange 4368 that extends forward from the first base 4367 and forms a first groove 4369 between the first flange 4368 and a core of the first wall panel 4360. The rear projection 4365 also includes a front-facing attachment surface 4366.

Similar to first wall panel 4360, second wall panel 4370 also has a front face 4371, a rear face 4372, a first edge, and a second edge 4374. The second wall panel 4370 further includes a front projection 4375 extending along the second edge 4374 that is coextensive with the front face 4371 and extends past the rear face 4372. The front projection 4375 of second wall panel 4370 includes a second base 4377 that is coextensive with the front face 4371 of the first wall panel 4370 and a second flange 4378 that extends forward from the second base 4377 and forms a second groove 4379 between the second flange 4378 and a core of the second wall panel 4370. The front projection 4375 of the second wall panel 4370 also includes a rear-facing attachment surface 4376 and overlaps the rear projection 4365 of the first wall panel 4369. The rear projection 4365 of the first wall panel 4360 and the front projection 4375 of the second wall panel 4370 are configured to form a clasp connection, whereby the first flange 4368 of rear projection 4365 fits into the second groove 4379 of second wall panel 4370 while the second flange 4378 of front projection 4370 fits into the first groove 4369 of first wall panel 4360. This configuration provides a winding interface between the front-facing attachment surface 4366 of the rear projection 4365 of the first wall panel 4360 and the rear-facing attachment surface 4376 of the front projection 4375 of the second wall panel 4370. The joint adhesive 4380 is disposed in the interface and bonds the front projection 4375 of the second wall panel 4370 to the rear projection 4365 of the first wall panel 4360.

In certain embodiments of the overlapping wall panel construction as otherwise described herein, the first wall panel has a width from the first side to the second side of at least 36 inches, e.g., at least 48 inches. In some embodiments, the first wall panel has a width from the first side to the second side of no more than 72 inches, e.g., no more than 60 inches. For example, in some embodiments, the first wall panel has a width in a range from 36 inches to 72 inches, e.g., from 48 inches to 60 inches. Further, in some embodiments, the second wall panel has the same width as the first wall panel.

In certain embodiments of the overlapping wall panel construction as otherwise described herein, the first wall panel has a length from a first end to a second end of at least 6 feet, e.g., at least 8 feet. In some embodiments, the first wall panel has a length from a first end to a second end of no more than 20 feet, e.g., no more than 16 feet. For example, in some embodiments, the first wall panel has a length in a range from 6 feet to 20 feet, e.g., from 8 feet to 16 feet. Further, in some embodiments, the second wall panel has the same length as the first wall panel.

In certain embodiments of the overlapping wall panel construction as otherwise described herein, the first wall panel has a thickness of at least ⅛ inch, e.g., at least ¼ inch, e.g., at least ⅜ inch. In some embodiments, the first wall panel has a thickness of no more than 1.5 inches, e.g., no more than 1¼ inches. For example, in some embodiments, the first wall panel has a thickness in a range from ⅛ inch to 1.5 inches, e.g., from ¼ inch to 1¼ inches, e.g., from ⅜ inch to 1 inch. Further, in some embodiments, the second wall panel has the same thickness as the first wall panel.

In certain embodiments of the overlapping wall panel construction as otherwise described herein, each of the first wall panel and second wall panel is a drywall panel. For example, as will be appreciated by the person of ordinary skill in the art will appreciate, the wall panels may include a core that can be formed of a variety of materials. In certain embodiments, the core of the wall panel is formed from a gypsum plaster. In other embodiments, the core of the wall panel is formed from a struvite-K/syngenite plaster, such as a material described in International Patent Application Publication no. 2015/057732, which is hereby incorporated herein by reference in its entireties. Various additional materials suitable for use as a core of the wall panel include concrete, fiber-reinforced materials, foamed polymeric materials such as foamed polystyrene, mineral board materials, mineral fiber board materials, cellulosic materials, particle board materials, oriented strand board materials, or a combination thereof. Of course, the person of ordinary skill in the art will appreciate that other suitable materials may be used. The core can include a variety of fillers and additives, as the person of ordinary skill in the art will appreciate. For example, in some embodiments, the core may include one or more fillers, for example, selected from calcium carbonate, starch, sand, ceramic microspheres, perlite, foam, fibers, fly ash, slag, or cellulosic fillers, including wood particles and fibers. Similarly, in some embodiments, the core may include one or more additives including accelerators to increase the setting time, such as BMA or potash, water resistance, such as wax or silicone, sugars, retarders, cellulosic fibers, fiberglass fibers, boric acid, fire resistance, such as vermiculite, or other additives as the person of ordinary skill in the art will appreciate. The person of ordinary skill in the art will select filler(s) and/or additive(s) based on the particular core material and the particular properties desired for the overall wall panel.

In certain embodiments of the overlapping wall panel construction as otherwise described herein, the joint adhesive cures quickly, e.g., in less than an hour. For example, in some embodiments the joint adhesive cures and dries in a short time, which allows for additional layers, such as joint compound or paint, to be applied promptly after securing the first and second wall panels to the support structure. As an example, in some embodiments, the joint adhesive is a hot melt adhesive, such as a hot melt glue.

In certain embodiments of the overlapping wall panel construction as otherwise described herein, the overlapping wall panel construction further includes a support structure, and the first and second wall panels are secured to the support structure. For example, the wall panels 4160, 4170 of overlapping wall panel construction 4150 are secured to a support structure 4152. FIG. 41 shows a portion of a single frame member 4154 of support structure 4152 in the form of a wooden stud. First wall panel 4160 and second wall panel 4170 are secured to frame member 4154.

In certain embodiments of the overlapping wall panel construction as otherwise described herein, the first and second wall panels are secured to the support structure using a plurality of mechanical fasteners. In some embodiments, a first mechanical fastener of the plurality of mechanical fasteners passes through the rear projection of the first wall panel and through the front projection of the second wall panel. For example, first mechanical fastener 4156 in FIG. 41 passes through rear projection 4165 of first wall panel 4160 and through front projection 4175 of second wall panel 4170. In some embodiments, the overlapping wall panel construction includes a group of fasteners that each pass through the rear projection of the first wall panel and the front projection of the second wall panel along the overlapping joint.

In another aspect, the disclosure provides a method of installing an overlapping wall panel construction according to the disclosure. The method includes placing the first wall panel adjacent to and coplanar with the second wall panel with the front projection of the second wall panel overlapping the rear projection of the first wall panel so as to form an overlapping joint and an interface between the front-facing attachment surface of the first wall panel and the rear-facing attachment surface of the front projection of the second wall panel. The method also includes providing joint adhesive in the interface between the front-facing attachment surface of the first wall panel and the rear-facing attachment surface of the second wall panel.

Figure 44:
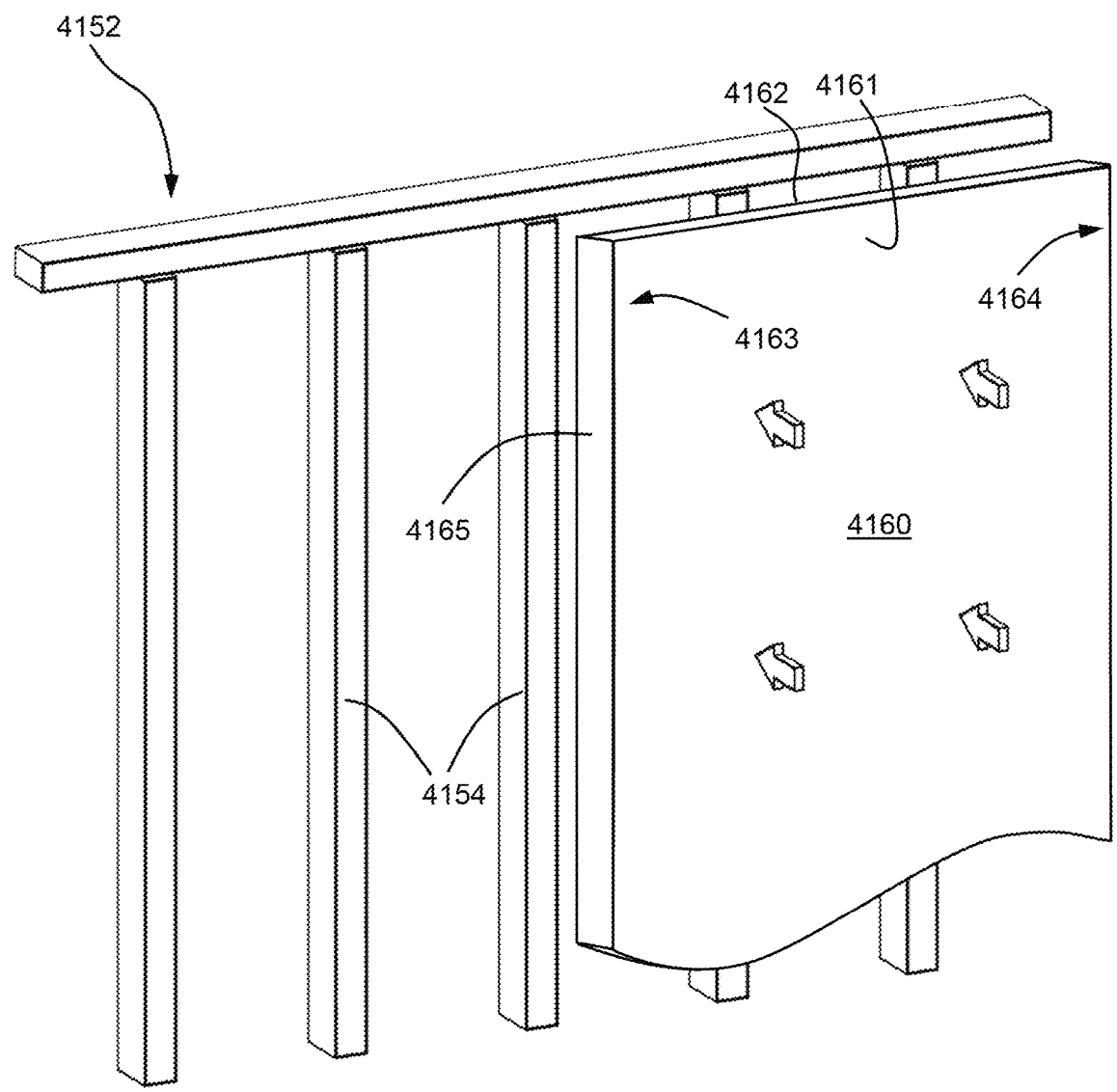
FIG. 44 is a schematic perspective view of a step in a method of installing an overlapping wall panel construction according to an embodiment of the disclosure.

Such a method is shown in FIGS. 44-47 to form overlapping wall panel construction 4150, a section of which is illustrated in FIG. 41. FIG. 44 schematically depicts first wall panel 4160 being placed over a support structure 4152. The first wall panel 4160 includes a front face 4161, a rear face 4162, a first edge 4163, and a second edge 4164. The first wall panel 4160 also includes a rear projection 4165 that runs along first edge 4163, is coextensive with rear face 4162, and extends past the front face 4161. The support structure 4152 includes a plurality of frame members 4154 in the form of wood studs.

Figure 45:
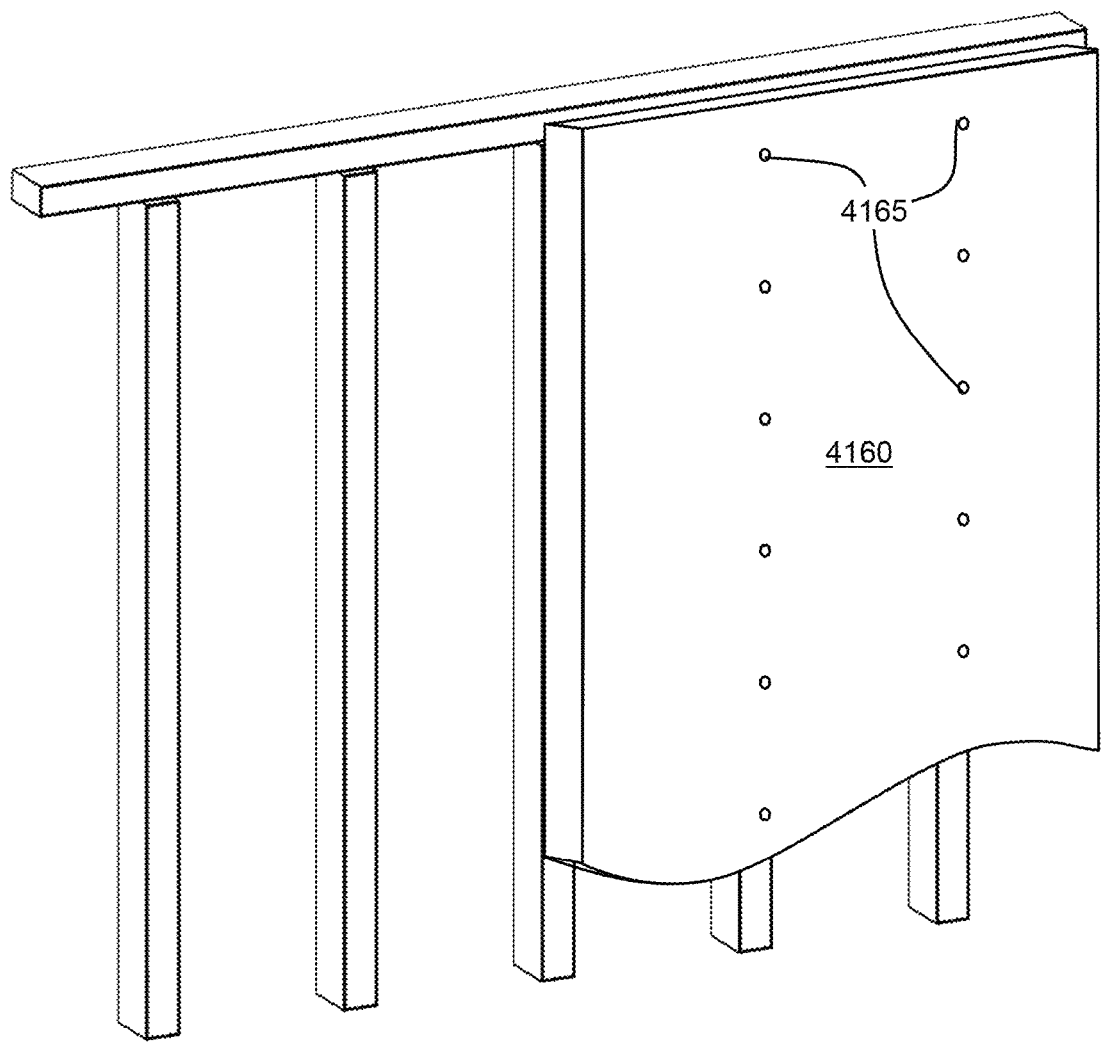
FIG. 45 is a schematic perspective view of another step in a method of installing an overlapping wall panel construction according to an embodiment of the disclosure.
Figure 46:
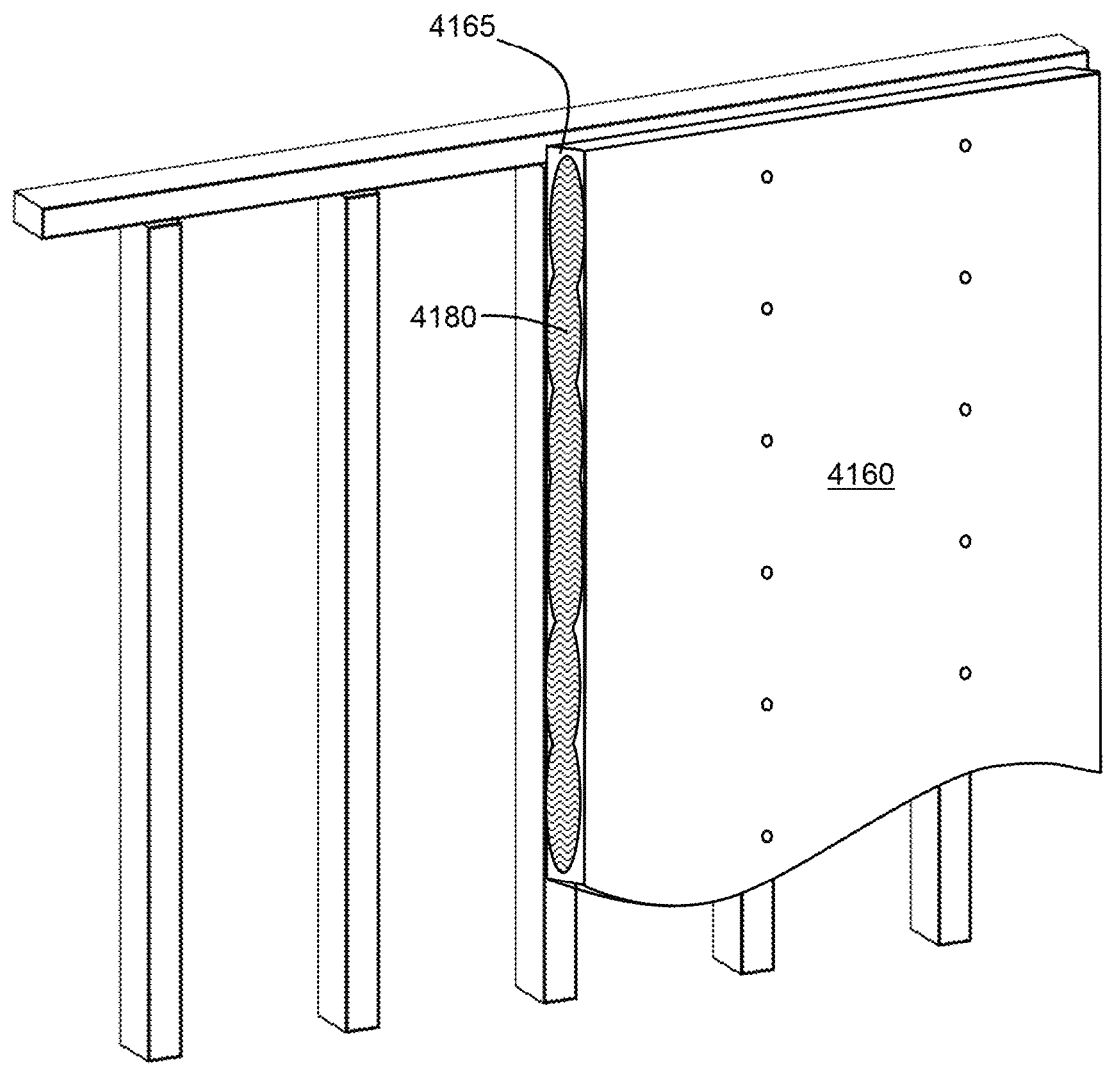
FIG. 46 is a schematic perspective view of yet another step in a method of installing an overlapping wall panel construction according to an embodiment of the disclosure.
Figure 47:
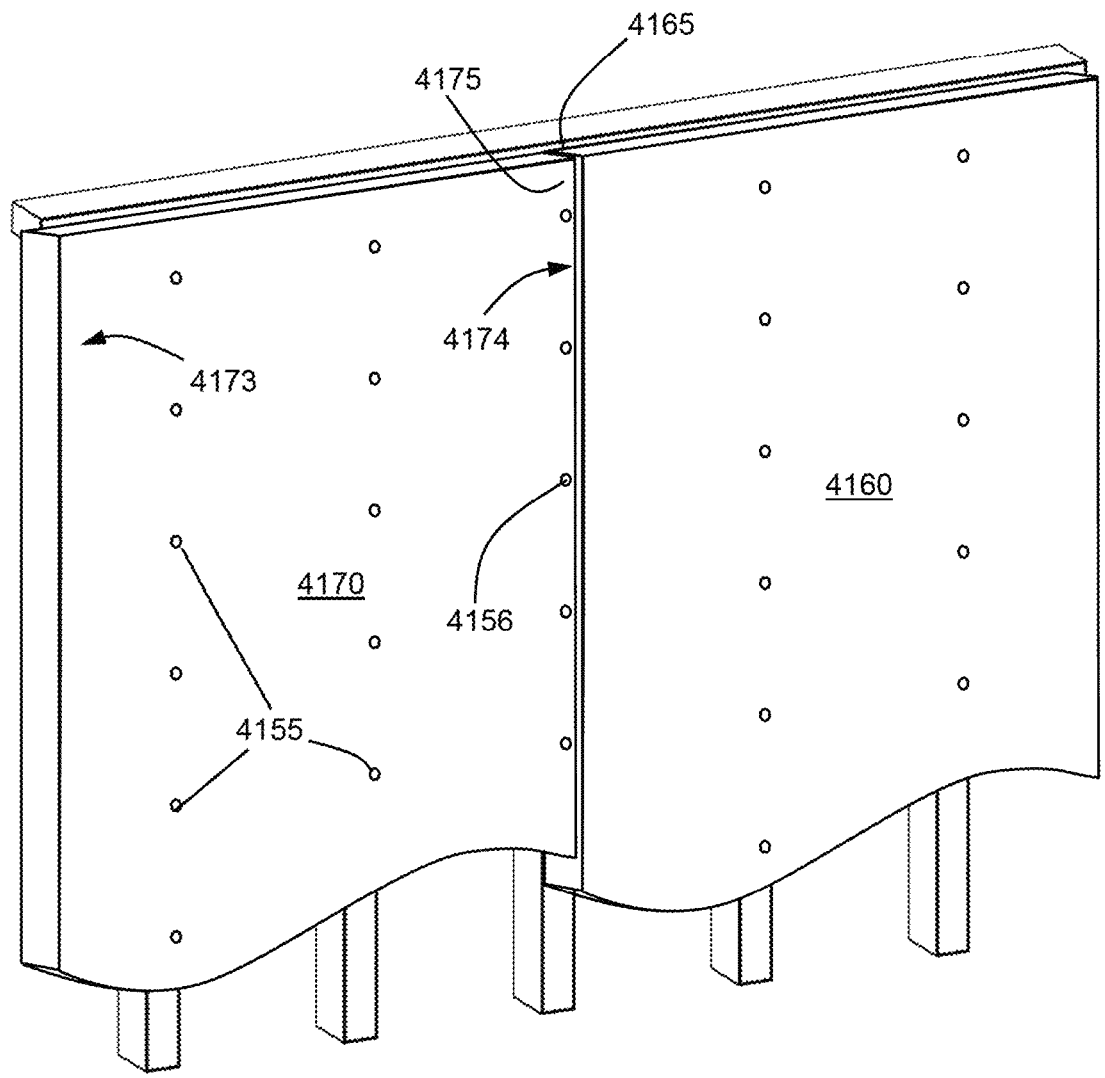
FIG. 47 is a schematic perspective view of another step in a method of installing an overlapping wall panel construction according to an embodiment of the disclosure.

Once first wall panel 4160 is in place over support structure 4152, first wall panel 4160 is secured to support structure 4152 using a plurality of mechanical fasteners 4155, as shown in FIG. 45. The mechanical fasteners are driven through first wall panel 4160 into frame members 4154 so as to hold first wall panel 4160 against support structure 4152. Joint adhesive 4180 is then placed over the front-facing attachment surface of the rear projection 4165 of first wall panel 4160, as shown in FIG. 46. The second wall panel 4170 is then placed against support structure 4152, as shown in FIG. 47, with first edge 4173 remote from first wall panel 4160 and second edge 4174 adjacent to first wall panel 4160. In particular, front projection 4175 of second wall panel 4170 overlaps rear projection 4165 of first wall panel with joint adhesive 4180 disposed in the interface between the projections 4165, 4175. The second wall panel 4170 is then secured to support structure 4152 using additional mechanical fasteners 4155.

In other embodiments, the order of the above-described steps is different. For example, in some embodiments, the joint adhesive is applied to the first wall panel before it is placed on the support structure. Likewise, in some embodiments, the joint adhesive is applied to the second wall panel before it is placed in an overlapping configuration over the first wall panel. Further still, in some embodiments, the second wall panel is initially secured to the support structure, and the rear projection of the first wall panel is slid behind the front projection of the second wall panel. Moreover, in some embodiments, the joint adhesive is injected into the interface between the wall panels after both wall panels are placed on the support structure.

While the embodiment of the method shown in FIGS. 44-47 uses mechanical fasteners, such as nails or screws, to secure the first and second wall panels to the support structure, in other embodiments the first and second wall panels are secured to the support structure using adhesive or fastening clips.

In certain embodiments of the method of forming an overlapping wall panel construction as otherwise described herein, the method includes inserting a first mechanical fastener through the front projection of the second wall panel, the rear projection of the first wall panel and a frame member of the support structure. For example, as shown in FIG. 47, several mechanical fasteners, including first mechanical fastener 4156 are inserted through both of the respective projections of the first wall panel 4160 and the second wall panel 4170 to secure the wall panels 4160, 4170 to the support structure 4152.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

EMBODIMENTS

Embodiment 1. A building surface product comprising:
a substantially planar gypsum panel having an upper edge, a lower edge, and two ends, wherein the gypsum panel includes:
  a body comprising a front face, a rear face, and a thickness between the front face and the rear face;
  an upper interlocking structure disposed at the upper edge of the gypsum panel, the upper interlocking structure including a first upper projection extending upward from the body and having a thickness that is smaller than the thickness of the body; and
  a lower interlocking structure disposed at the lower edge of the gypsum panel, the lower interlocking structure including a first lower projection extending downward from the body and having a thickness that is smaller than the thickness of the body, and
  wherein the upper interlocking structure and lower interlocking structure are configured to cooperate with neighboring gypsum panels so as to form a building surface.

Embodiment 2. The building surface product according to embodiment 1, wherein the gypsum panel comprises a reinforced gypsum material.

Embodiment 3. The building surface product according to embodiment 1 or embodiment 2, wherein the gypsum panel includes at least 1% by weight polymer.

Embodiment 4. The building surface product according to any of embodiments 1 to 3, wherein the polymer includes starch and/or polyvinyl acetate.

Embodiment 5. The building surface product according to any of embodiments 1 to 4, wherein the gypsum panel includes at least 1% by weight of reinforcing fibers.

Embodiment 6. The building surface product according to any of embodiments 1 to 5, wherein the first lower projection is coextensive with the front face of the body.

Embodiment 7. The building surface product according to any of embodiments 1 to 6, wherein the lower interlocking structure includes a lower recess formed next to the first lower projection, and wherein the first upper projection is configured to fit in the lower recess of a neighboring building surface product.

Embodiment 8. The building surface product according to any of embodiments 1 to 7, wherein the first upper projection is coextensive with the rear face of the body.

Embodiment 9. The building surface product according to any of embodiments 1 to 7, wherein the lower interlocking structure includes a second lower projection adjacent the rear face of the body, and wherein the lower recess is in the form of a lower groove disposed between the first lower projection and the second lower projection.

Embodiment 10. The building surface product according to embodiment 9, wherein the first upper projection is disposed between the front face and the rear face and forms a tongue configured for insertion into the groove of a neighboring building surface product.

Embodiment 11. The building surface product according to embodiment 9, wherein the upper interlocking structure includes a second upper projection, wherein an upper groove is disposed between the first upper projection and the second upper projection, and wherein the upper groove and the lower groove are each configured to receive an insert that cooperates with a corresponding groove of a neighboring building surface product.

Embodiment 12. The building surface product according to any of embodiments 1 to 11, wherein the first lower projection has a chamfered edge.

Embodiment 13. The building surface product according to any of embodiments 1 to 11, wherein the first lower projection has a rounded edge.

Embodiment 14. The building surface product according to any of embodiments 1 to 13, wherein the upper side of the body has a chamfered edge.

Embodiment 15. The building surface product according to any of embodiments 1 to 13, wherein the upper side of the body has a rounded edge.

Embodiment 16. The building surface product according to any of embodiments 1 to 15, wherein the ends are perpendicular to the upper edge and the lower edge.

Embodiment 17. The building surface product according to any of embodiments 1 to 15, wherein the ends are disposed at an angle to the upper edge and lower edge.

Embodiment 18. The building surface product according to embodiment 17, wherein the angle is in a range of 30 degrees to 80 degrees.

Embodiment 19. The building surface product according to any of embodiments 1 to 15, wherein the ends are curved.

Embodiment 20. The building surface product according to any of embodiments 1 to 11, wherein a portion of a first end of the gypsum panel is configured to overlap with a portion of a neighboring building surface product.

Embodiment 21. The building surface product according to any of embodiments 1 to 20, further comprising a facing lining at least a portion of the gypsum panel.

Embodiment 22. The building surface product according to embodiment 21, wherein the facing is a paper facing.

Embodiment 23. The building surface product according to embodiment 21 or embodiment 22, wherein the facing surrounds the gypsum panel along its length.

Embodiment 24. The building surface product according to any of embodiments 21 to 23, wherein the facing includes a reinforcing sheet disposed at the rear face of the gypsum panel.

Embodiment 25. The building surface product according to any of embodiments 1 to 24, wherein a front surface of the building surface product includes a textured surface.

Embodiment 26. The building surface product according to embodiment 25, wherein the front face of the body includes grooves along the length of the gypsum panel.

Embodiment 27. The building surface product according to embodiment 26, further comprising fastener holes extending through the gypsum panel.

Embodiment 28. The building surface product according to embodiment 25, wherein the front surface of the building surface product is roughened.

Embodiment 29. The building surface product according to any of embodiments 25 to 28, wherein the front surface of the building surface product provides acoustical dampening to the building surface product.

Embodiment 30. The building surface product according to any of embodiments 1 to 29, wherein a front surface of the building surface product is painted.

Embodiment 31. The building surface product according to any of embodiments 1 to 30, wherein a width from the upper edge to the lower edge is in a range from 3 inches to 4 feet, e.g., from 4 inches to 2 feet, e.g., from 6 inches to 1 foot.

Embodiment 32. The building surface product according to any of embodiments 1 to 31, wherein a length from a first end of the gypsum panel to a second end of the gypsum panel is in a range from 1 foot to 20 feet, e.g., from 2 feet to 15 feet, e.g., from 4 feet to 12 feet.

Embodiment 33. The building surface product according to any of embodiments 1 to 32, wherein the thickness of the gypsum panel is in a range of ¼ inch to 3 inches, e.g., from ½ inch to 2 inches.

Embodiment 34. A method of making a building surface product according to any of embodiments 1 to 33, the method comprising:
forming the substantially planar gypsum panel with the upper edge, the lower edge, the upper interlocking structure disposed at the upper edge, the lower interlocking structure disposed at the lower edge, and the two ends.

Embodiment 35. The method according to embodiment 34, wherein forming the gypsum panel includes depositing a gypsum slurry over a forming surface and allowing the gypsum slurry to set.

Embodiment 36. The method according to embodiment 35, wherein the forming surface is configured to form a sheet of gypsum material, and wherein the gypsum panel is cut from the sheet of gypsum material.

Embodiment 37. The method according to embodiment 35, wherein the forming surface is configured to form the gypsum panel.

Embodiment 38. The method according to embodiment 36 or embodiment 37, wherein the upper interlocking structure and the lower interlocking structure are machined into the gypsum panel.

Embodiment 39. The method according to any of embodiments 35 to 37, wherein the forming surface is part of a mold that includes a first portion configured to form the upper interlocking structure and a second portion configured to form the lower interlocking structure.

Embodiment 40. The method according to any of embodiments 35 to 39, further comprising positioning a flexible sheet on the forming surface so as to provide a facing that lines at least a portion of the gypsum panel.

Embodiment 41. The method according to embodiment 40, further comprising positioning a second flexible sheet over the gypsum panel so as to provide the facing that lines another portion of the gypsum panel.

Embodiment 42. The method according to embodiment 41, further comprising connecting the flexible sheet and the second flexible sheet such that the facing surrounds the gypsum panel.

Embodiment 43. The method according to any of embodiments 34 to 43, further comprising forming a surface texture on a front surface of the building surface product.

Embodiment 44. The method according to embodiment 43, wherein forming the surface texture includes spraying a heterogeneous coating on the front surface of the building surface product.

Embodiment 45. The method according to embodiment 43, wherein the forming the surface texture includes forming grooves in the front face of the body of the gypsum panel.

Embodiment 46. The method according to embodiment 45, wherein the grooves are machined into the front face of the body of the gypsum panel.

Embodiment 47. The method according to embodiment 45, wherein the grooves are provided by the forming surface.

Embodiment 48. The method according to any of embodiments 34 to 47, further comprising providing fastener holes through the gypsum panel.

Embodiment 49. A building surface system comprising:
a plurality of building surface products according to any of embodiments 1 to 33 secured to a support structure and arranged so as to provide a building surface,
wherein the plurality of building surface products includes a first building surface product with an upper interlocking structure coupled to a lower interlocking structure of a second building surface product.

Embodiment 50. The building surface system according to embodiment 49, wherein the first upper projection of the upper interlocking structure of the first building surface product is covered by a first lower projection of the lower interlocking structure of the second building surface product.

Embodiment 51. The building surface system according to embodiment 49 or embodiment 50, further comprising mechanical fasteners securing the plurality of building surface products to the support structure.

Embodiment 52. The building surface system according to embodiment 51, wherein a first group of the mechanical fasteners extend through the first upper projection of the upper interlocking structure of the first building surface product into the support structure, and wherein the first lower projection of the lower interlocking structure of the second building surface product covers the first group of mechanical fasteners.

Embodiment 53. The building surface system according to embodiment 49 or embodiment 50, wherein each of the building surface products includes a cleat disposed on the rear face of the body, and wherein the support structure includes corresponding cleats adapted to engage the cleats of the building surface products.

Embodiment 54. The building surface system according to any of embodiments 49 to 53, wherein a portion of the second building surface product is attached to a portion of the first building surface product using an adhesive.

Embodiment 55. The building surface system according to any of embodiments 49 to 53, wherein a rear surface of a portion of the second building surface product is attached to a front surface of a portion of the first building surface product using a fastener.

Embodiment 56. The building surface system according to any of embodiments 49 to 55, wherein the plurality of building surface products have different shapes that are arranged in a pattern, and wherein the first building surface product has a first shape and the second building surface product has a second shape.

Embodiment 57. The building surface product according to any of embodiments 49 to 56, wherein a joint between the first building surface product and the second building surface product is free of any joint compound.

Embodiment 58. The building surface system according to any of embodiments 49 to 57, wherein a front surface of the first building surface product and a front surface of the second building surface product are covered with a layer of paint.

Embodiment 59. The building surface system according to embodiment 58, wherein the first building surface product is painted a first color and the second building surface product is painted a second color.

Embodiment 60. A building surface product comprising:
a substantially planar gypsum panel having a first edge, a second edge, and two ends, wherein the gypsum panel includes:
a body comprising a front face, a rear face, and a thickness between the front face and the rear face, and
a first lapping projection extending outward from the body at the second edge, the first lapping projection being configured to overlap a portion of a neighboring gypsum panel so as to form a building surface; and
a first press-on connector disposed on the rear face of the body toward the first edge of the gypsum panel, the press-on connector being configured to engage a corresponding second press-on connector.

Embodiment 61. The building surface product according to embodiment 60, wherein the first press-on connector is a first snap-fit connector and the corresponding second press-on connector is a second snap-fit connector.

Embodiment 62. The building surface product according to embodiment 61, wherein the first snap-fit connector includes a connector body and a first flange that extends laterally outward from the connector body and is configured to engage the second snap-fit connector.

Embodiment 63. The building surface product according to embodiment 62, wherein the first snap-fit connector includes a second flange that extends from the connector body in an opposite direction of the first flange and is configured to engage the second snap-fit connector.

Embodiment 64. The building surface product according to any of embodiments 61 to 63, wherein the first snap-fit connector is in the form of a rail that extends along a length of the building surface product.

Embodiment 65. The building surface product according to embodiment 64, wherein the rail extends across at least 50% of the length of the building surface product, e.g., at least 80% of the length of the building surface product, e.g., at least 90% of the length of the building surface product.

Embodiment 66. The building surface product according to any of embodiments 61 to 65, wherein a distance between the first snap-fit connector and the first edge is less than 30% of the width of the gypsum panel body, e.g., less than 20%, e.g., less than 10%.

Embodiment 67. The building surface product according to any of embodiments 61 to 66, wherein the first snap-fit connector is attached to the gypsum panel using adhesive.

Embodiment 68. The building surface product according to any of embodiments 60 to 66, wherein the first lapping projection is disposed behind the body of the gypsum panel, and wherein the first projection is configured to extend behind the body of the gypsum panel of a neighboring building surface product.

Embodiment 69. The building surface product according to any of embodiments 60 to 68, wherein the first lapping projection extends outward from the body in a direction of the plane of the gypsum panel a distance in a range of ¼ inch to 3 inches, e.g., ⅜ inch to 2.5 inches, e.g., 1½ inch to 2 inches.

Embodiment 70. The building surface product according to any of embodiments 60 to 69, wherein the first edge includes a folded gypsum edge.

Embodiment 71. The building surface product according to embodiment 70, wherein the folded edge is a flat fold including a first folded section adhered to the body of the gypsum panel along an angled slit, and wherein the body of the gypsum panel and the first folded section are covered by a continuous facing sheet.

Embodiment 72. The building surface product according to embodiment 70, wherein the folded edge is a corner fold including a first folded section and a second folded section, the first folded section being adhered to the body of the gypsum panel along a first angled slit and the second folded section being adhered to the first folded section along a second angled slit, and wherein the body the gypsum panel, the first folded section, and the second folded section are all covered by a continuous facing sheet.

Embodiment 73. The building surface product according to embodiment 72, wherein the second folded section is adhered to the first snap-fit connector.

Embodiment 74. The building surface product according to embodiment 72 or embodiment 73, wherein the first snap-fit connector includes a base extending outward from the connector body, wherein the base is adhered to the body of the gypsum panel, and wherein the second folded section overlaps the base of the first snap-fit connector.

Embodiment 75. The building surface product according to embodiment 72 or embodiment 73, wherein the first snap-fit connector is disposed on the folded edge of the gypsum panel.

Embodiment 76. The building surface product according to any of embodiments 60 to 75, wherein the gypsum panel comprises a reinforced gypsum material.

Embodiment 77. The building surface product according to any of embodiments 60 to 76, wherein the gypsum panel includes at least 1% by weight polymer.

Embodiment 78. The building surface product according to any of embodiments 60 to 77, wherein the polymer includes starch and/or polyvinyl acetate.

Embodiment 79. The building surface product according to any of embodiments 60 to 78, wherein the gypsum panel includes at least 1% by weight of reinforcing fibers.

Embodiment 80. The building surface product according to any of embodiments 60 to 79, wherein the ends are perpendicular to the upper edge and the lower edge.

Embodiment 81. The building surface product according to any of embodiments 60 to 79, wherein the ends are disposed at an angle to the upper edge and lower edge.

Embodiment 82. The building surface product according to embodiment 81, wherein the angle is in a range of 30 degrees to 80 degrees.

Embodiment 83. The building surface product according to any of embodiments 60 to 79, wherein the ends are curved.

Embodiment 84. The building surface product according to any of embodiments 60 to 83, wherein a portion of a first end of the gypsum panel is configured to overlap with a portion of a neighboring building surface product.

Embodiment 85. The building surface product according to any of embodiments 60 to 84, further comprising a facing lining at least a portion of the gypsum panel.

Embodiment 86. The building surface product according to embodiment 85, wherein the facing is a paper facing.

Embodiment 87. The building surface product according to any of embodiments 60 to 86, wherein a front surface of the building surface product includes a textured surface.

Embodiment 88. The building surface product according to embodiment 87, wherein the front face of the body includes grooves along the length of the gypsum panel.

Embodiment 89. The building surface product according to embodiment 7, wherein the front surface of the building surface product is roughened.

Embodiment 90. The building surface product according to any of embodiments 87 to 89, wherein the front surface of the building surface product provides acoustical dampening to the building surface product.

Embodiment 91. The building surface product according to any of embodiments 60 to 90, wherein a front surface of the building surface product is painted.

Embodiment 92. The building surface product according to any of embodiments 60 to 91, wherein a width from the upper edge to the lower edge is in a range from 3 inches to 4 feet, e.g., from 4 inches to 2 feet, e.g., from 6 inches to 1 foot.

Embodiment 93. The building surface product according to any of embodiments 60 to 92, wherein a length from a first end of the gypsum panel to a second end of the gypsum panel is in a range from 1 foot to 20 feet, e.g., from 2 feet to 15 feet, e.g., from 4 feet to 12 feet.

Embodiment 94. The building surface product according to any of embodiments 60 to 93, wherein the thickness of the gypsum panel is in a range of ¼ inch to 3 inches, e.g., from ½ inch to 2 inches.

Embodiment 95. A method of making a building surface product according to any of embodiments 60 to 94, the method comprising:
  forming the substantially planar gypsum panel with the first edge, the second edge, first lapping projection extending outward from the body at the second edge, and the two ends;
  attaching the first press-on connector to the rear face of the body of the gypsum panel.

Embodiment 96. The method according to embodiment 95, wherein forming the gypsum panel includes depositing a gypsum slurry over a forming surface and allowing the gypsum slurry to set.

Embodiment 97. The method according to embodiment 96, wherein the forming surface is configured to form a sheet of gypsum material, and
  wherein the gypsum panel is cut from the sheet of gypsum material.

Embodiment 98. The method according to any of embodiment 96 or embodiment 97, further comprising positioning a flexible sheet on the forming surface so as to provide a facing that lines at least a portion of the gypsum panel.

Embodiment 99. The method according to embodiment 98, further comprising positioning a second flexible sheet over the gypsum panel so as to provide a facing that lines another portion of the gypsum panel.

Embodiment 100. The method according to any of embodiments 97 to 99, further comprising forming the first edge of the gypsum panel as a folded edge with a flat fold by:
  cutting a first notch in the sheet of gypsum material so as to form a first folded section adjacent to the body of the gypsum panel,
  folding the first folded section toward the body of the gypsum panel so as to close the notch, and
  adhering the first folded section to the body of the gypsum panel.

Embodiment 101. The method according to any of embodiments 97 to 99, further comprising forming the first edge of the gypsum panel as a folded edge with a corner fold by:
  cutting a first notch in the sheet of gypsum material so as to form a first folded section adjacent to the body of the gypsum panel,
  cutting a second notch in the sheet of gypsum material so as to form a second folded section adjacent to the first folded section,
  folding the second folded section toward the first folded section so as to close the second notch,
  adhering the second folded section to the first folded section,
  folding the first folded section toward the body of the gypsum panel so as to close the first notch and to place the second folded section over the body of the gypsum panel, and
  adhering the first folded section to the body of the gypsum panel.

Embodiment 102. The method according to embodiment 101, wherein the first press-on connector is a snap-fit connector, the method further comprising adhering the second folded section to the snap-fit connector.

Embodiment 103. The method according to embodiment 102, wherein the snap-fit connector includes a base extending outward from the connector body, the method further comprising folding the second folded section over the base of the snap-fit connector so as to place the base of the snap-fit connector between the second folded section and the body of the gypsum panel.

Embodiment 104. The method according to any of embodiments 101 to 103, wherein the method further comprises adhering the snap-fit connector onto the folded edge of the gypsum panel.

Embodiment 105. The method according to any of embodiments 95 to 104, wherein the first lapping projection is machined into the gypsum panel.

Embodiment 106. The method according to embodiments 95 to 104, wherein the first lapping projection is adhered to the body of the gypsum panel.

Embodiment 107. The method according to any of embodiments 95 to 106, further comprising forming a surface texture on a front surface of the building surface product.

Embodiment 108. The method according to embodiment 107, wherein forming the surface texture includes spraying a heterogeneous coating on the front surface of the building surface product.

Embodiment 109. The method according to embodiment 107, wherein the forming the surface texture includes forming grooves in the front face of the body of the gypsum panel.

Embodiment 110. The method according to embodiment 109, wherein the grooves are machined into the front face of the body of the gypsum panel.

Embodiment 111. The method according to embodiment 109, wherein the grooves are provided by the forming surface.

Embodiment 112. A building surface system comprising:
a support structure;
a plurality of second press-on connectors disposed on a front side of the support structure, and
a plurality of building surface products according to any of embodiments 60 to 94 secured to the support structure and arranged so as to provide a building surface,
wherein the first press-on connector of each building surface product is coupled to at least one of the second press-on connectors, and
wherein the first edge of the gypsum panel of each building surface product overlaps the first lapping projection of a neighboring building surface product.

Embodiment 113. The building surface system according to embodiment 112, wherein the first press-on connectors are first snap-fit connectors and the second press-on connectors are second snap-fit connectors.

Embodiment 114. The building surface system according to embodiment 113, wherein each of the first snap-fit connectors includes a connector body and a first flange that extends laterally outward from the connector body, and wherein each of the second snap-fit connectors includes a clip having a first flexible hook configured to engage the first flange.

Embodiment 115. The building surface system according to embodiment 114, wherein each of the first snap-fit connectors includes a second flange that extends from the connector body in an opposite direction of the first flange, and wherein the second snap-fit connector includes a second flexible hook configured to engage the second flange.

Embodiment 116. The building surface system according to embodiment 114 or 115, wherein each first flexible hook includes an outer angled ramp surface configured to deflect the flexible hook as the first snap-fit connector is inserted into the clip.

Embodiment 117. The building surface system according to any of embodiments 114 to 116, wherein each first flexible hook includes a sharp inner edge configured to inhibit removal of the first snap-fit connector from the clip of the second snap-fit connector.

Embodiment 118. The building surface system according to any of embodiments 114 to 116, wherein each first flexible hook includes an angled inner edge configured to deflect the flexible hook as the first snap-fit connector is removed from the clip.

Embodiment 119. The building surface system according to any of embodiments 113 to 118, wherein each of the second snap-fit connectors is secured to the support structure with at least one mechanical fastener.

Embodiment 120. The building surface system according to any of embodiments 113 to 118, wherein each of the second snap fit connectors includes a support platform, and wherein each support platform provides a contact surface for a respective first lapping projection of a building surface product.

Embodiment 121. The building surface system according to any of embodiments 112 to 120, wherein the plurality of building surface products have different shapes that are arranged in a pattern, and wherein the first building surface product has a first shape and the second building surface product has a second shape.

Embodiment 122. The building surface system according to any of embodiments 112 to 121, wherein a joint between the first building surface product and the second building surface product is free of any joint compound.

Embodiment 123. The building surface system according to any of embodiments 112 to 122, wherein a front surface of each of the building surface products is covered with a layer of paint.

Embodiment 124. The building surface system according to embodiment 123, wherein a first of the building surface products is painted a first color and a second of the building surface products is painted a second color.

Embodiment 125. A joint support configured to cover a joint between coplanar wall panels, the joint support comprising:
an elongate support strip including a first end, a second end, a first side edge, a second side edge, an inner surface, and an outer surface; and
a facing sheet secured to the outer surface of the support strip, the facing sheet including:
a first flap extending laterally beyond the first side edge of the support strip,
a second flap extending laterally beyond the second side edge of the support strip, and
a first adhesive disposed on an inside surface of the first flap and an inside surface of the second flap.

Embodiment 126. The joint support according to embodiment 125, wherein, at a first position along a length of the support strip, the outer surface extends in a straight line from the first side edge to the second side edge.

Embodiment 127. The joint support according to embodiment 126, wherein the outer surface extends in a straight line from the first side edge to the second side edge at every position along the length of the support strip.

Embodiment 128. The joint support according to any of embodiments 125 to 127, wherein the outer surface of the support strip is planar.

Embodiment 129. The joint support according to any of embodiments 125 to 127, wherein the joint support is a rolled product.

Embodiment 130. The joint support according to any of embodiment 127 to 129, wherein a cross section of the support strip is uniform in shape along the length of the support strip.

Embodiment 131. The joint support according to any of embodiments 125 to 130, wherein a length of the joint support is at least 4 feet, e.g., at least 6 feet, e.g., at least 8 feet.

Embodiment 132. The joint support according to any of embodiments 125 to 131, wherein the joint support is substantially planar and a length of the joint support is no more than 20 feet, e.g., no more than 15 feet, e.g., no more than 12 feet.

Embodiment 133. The joint support according to any of embodiments 125 to 132, wherein a width of the support strip is at least 1 inch, e.g., at least 2 inches, e.g., at least 3 inches.

Embodiment 134. The joint support according to any of embodiments 125 to 133, wherein a width of the support strip is no more than 10 inches, e.g., no more than 8 inches, e.g., no more than 5 inches.

Embodiment 135. The joint support according to any of embodiments 125 to 134, wherein the first and second flaps of the facing sheet extend at least 1 inch beyond the respective first and second side edges of the support strip, e.g., at least 1.5 inches, e.g., at least 2 inches.

Embodiment 136. The joint support according to any of embodiments 125 to 135, wherein the first and second flaps of the facing sheet extend no more than 6 inches beyond the respective first and second side edges of the support strip, e.g., no more than 5 inches, e.g., no more than 4.5 inches.

Embodiment 137. The joint support according to any of embodiments 125 to 136, wherein a thickness of the support strip is at least 0.02 inches, e.g., at least 0.03 inches, e.g., at least 0.05 inches.

Embodiment 138. The joint support according to any of embodiments 125 to 137, wherein a thickness of the support strip is no more than 0.25 inches, e.g., no more than 0.15 inches, e.g., no more than 0.1 inches.

Embodiment 139. The joint support according to any of embodiments 125 to 138, wherein a thickness of the support strip is greatest at a center line that extends along the length of the support strip.

Embodiment 140. The joint support according to embodiment 139, wherein the support strip includes a first portion that extends from the center line to the first side edge that tapers to a reduced thickness at the first side edge, and a second portion that extends from the center line to the second side edge that tapers to a reduced thickness at the second side edge.

Embodiment 141. The joint support according to embodiment 140, wherein a thickness of the support strip at the first side edge is at least 0.005 inches, e.g., at least 0.010 inches, e.g., at least 0.015 inches.

Embodiment 142. The joint support according to any of embodiment 139 to 141, wherein the inner surface of the support strip includes a ridge extending along the center line.

Embodiment 143. The joint support according to any of embodiments 125 to 142, wherein the first adhesive is a pressure sensitive adhesive.

Embodiment 144. The joint support according to any of embodiments 125 to 142, wherein the first adhesive is water activated.

Embodiment 145. The joint support according to any of embodiments 125 to 144, wherein the facing sheet extends across the width of the outer surface.

Embodiment 146. The joint support according to any of embodiments 125 to 145, wherein the facing sheet is paper.

Embodiment 147. The joint support according to any of embodiments 125 to 146, wherein the facing sheet is sandable or dissolvable.

Embodiment 148. The joint support according to any of embodiments 125 to 147, further comprising a release liner covering the inner surface of the first flap and the inner surface of the second flap.

Embodiment 149. The joint support according to any of embodiments 125 to 148, further comprising a second adhesive disposed on the inner surface of the support strip.

Embodiment 150. The joint support according to any of embodiments 125 to 149, wherein the facing sheet is secured to the outer surface of the support strip with a third adhesive.

Embodiment 151. The joint support according to any of embodiments 125 to 150, wherein the support strip is formed of plastic.

Embodiment 152. A joint supported wall panel construction comprising:
a first wall panel;
a second wall panel adjacent to and substantially coplanar with the first wall panel forming a seam between the between the first wall panel and the second wall panel;
a joint support according to any of embodiments 125 to 151 disposed over the first wall panel and the second wall panel and covering at least a portion of the seam.

Embodiment 153. The joint supported wall panel construction according to embodiment 152, wherein the first flap is adhered to the first wall panel and the second flap is adhered to the second wall panel.

Embodiment 154. The joint supported wall panel construction according to embodiment 152 or embodiment 153, wherein the inner surface of the support strip includes a ridge extending along the center line, and
wherein the ridge is aligned with the seam between the first wall panel and the second wall panel.

Embodiment 155. The joint supported wall panel construction according to any of embodiments 152 to 154, wherein the wall panels are drywall panels.

Embodiment 156. The joint supported wall panel construction according to any of embodiments 152 to 155, further comprising joint compound covering an outer surface of the joint support.

Embodiment 157. The joint supported wall panel construction according to embodiment 156, wherein an interface between the inner surface of the support strip and the wall panels is free of joint compound.

Embodiment 158. The joint supported wall panel construction according to embodiment 156 or embodiment 157, further comprising a layer of paint covering the joint compound.

Embodiment 159. A method of installing the joint support according to any of embodiments 125 to 151 on a joint between two substantially coplanar wall panels so as to form the joint supported wall panel construction according to any of embodiments 152 to 158, the method comprising:
placing the joint support over first and second wall panels that are substantially coplanar so as to cover at least a portion of a seam between the first and second wall panels and with the inner surface of the support strip of the joint support adjacent to a surface of the wall panels;
securing the joint support to the wall panels by adhering the first flap of the facing sheet of the joint support to the first wall panel and adhering the second flap of the facing sheet of the joint support to the second wall panel.

Embodiment 160. The method of installing a joint support according to embodiment 159, wherein the joint support is secured to the wall panels without applying tape or joint compound between the joint support and the wall panels.

Embodiment 161. The method of installing a joint support according to embodiment 159 or embodiment 160, further comprising coating the facing sheet with joint compound.

Embodiment 162. The method of installing a joint support according to embodiment 161, further comprising covering the joint compound with a layer of paint.

Embodiment 163. An overlapping wall panel construction comprising:
- a first wall panel having a front face, a rear face, a first edge, a second edge, and a rear projection along the first edge that is coextensive with the rear face and extends past the front face, wherein the rear projection of the first wall panel includes a front-facing attachment surface;
- a second wall panel having a front face, a rear face, a first edge, a second edge, and a front projection along the second edge that is coextensive with the front face and extends past the rear face, wherein the front projection of the second wall panel includes a rear-facing attachment surface and overlaps the rear projection of the first wall panel so as to form an overlapping joint and an interface between the front-facing attachment surface of the first wall panel and the rear-facing attachment surface of the front projection of the second wall panel; and
- a joint adhesive disposed in the interface and bonding the front projection of the second wall panel to the rear projection of the first wall panel.

Embodiment 164. The overlapping wall panel construction according to embodiment 163, wherein the front-facing attachment surface of the rear projection of the first wall panel extends at an angle to the rear face of the first wall panel, and
- wherein the rear-facing attachment surface of the front projection of the second wall panel extends at an angle to the front face of the second wall panel.

Embodiment 165. The overlapping wall panel construction according to embodiment 164, wherein the rear projection of the first wall panel has the shape of a triangular prism and the front-facing attachment surface extends from the rear face of the first wall panel to the front face of the first wall panel, and
- wherein the front projection of the second wall panel has the shape of a triangular prism and the rear-facing attachment surface extends from the front face of the second wall panel to the rear face of the second wall panel.

Embodiment 166. The overlapping wall panel construction according to any of embodiments 164 or embodiment 165, wherein an angle between the front-facing attachment surface of the rear projection and the rear face of the first wall panel is substantially the same as an angle between the rear-facing attachment surface of the front projection and the front face of the second wall panel.

Embodiment 167. The overlapping wall panel construction according to embodiment 163, wherein the rear projection of the first wall panel is flat and the front projection of the second wall panel is flat.

Embodiment 168. The overlapping wall panel construction according to embodiment 167, wherein a thickness of the rear projection is substantially the same as a thickness of the front projection.

Embodiment 169. The overlapping wall panel construction according to embodiment 168, wherein the thickness of the rear projection of the first wall panel is about half the thickness of the first wall panel and the thickness of the front projection of the second wall panel is about half the thickness of the second wall panel.

Embodiment 170. The overlapping wall panel construction according to embodiment 163, wherein the rear projection of the first wall panel includes a first base that is coextensive with the rear face of the first wall panel and a first flange that extends forward from the base and forms a first groove between the first flange and a core of the first wall panel,
- wherein the front projection of the second wall panel includes a second base that is coextensive with the front face of the second wall panel and a second flange that extends rearward from the second base and forms a second groove between the second flange and a core of the second wall panel, and
- wherein the first flange of the first wall panel fits in the second groove of the second wall panel and the second flange of the second wall panel fits in the first groove of the first wall panel.

Embodiment 171. The overlapping wall panel construction according to any of embodiments 163 to 170, wherein the first wall panel has a width from the first side to the second side of at least 36 inches, e.g., at least 48 inches.

Embodiment 172. The overlapping wall panel construction according to any of embodiments 163 to 171, wherein the first wall panel has a width from the first side to the second side of no more than 72 inches, e.g., no more than 60 inches.

Embodiment 173. The overlapping wall panel construction according to any of embodiments 163 to 172, wherein the first wall panel has a length from a first end to a second end of at least 6 feet, e.g., at least 8 feet.

Embodiment 174. The overlapping wall panel construction according to any of embodiments 163 to 173, wherein the first wall panel has a length from a first end to a second end of no more than 20 feet, e.g., no more than 16 feet.

Embodiment 175. The overlapping wall panel construction according to any of embodiments 163 to 174, wherein the first wall panel has a thickness of at least ⅛ inch, e.g., at least ¼ inch, e.g., at least ⅜ inch.

Embodiment 176. The overlapping wall panel construction according to any of embodiments 163 to 175, wherein the first wall panel has a thickness of no more than 1.5 inches, e.g., no more than 1¼ inches Embodiment 177. The overlapping wall panel construction according to any of embodiments 163 to 176, wherein each of the first wall panel and second wall panel is a drywall panel.

Embodiment 178. The overlapping wall panel construction according to any of embodiments 163 to 177, wherein the joint adhesive is a hot melt adhesive.

Embodiment 179. The overlapping wall panel construction according to any of embodiments 163 to 178, further comprising a support structure, wherein the first and second wall panels are secured to the support structure.

Embodiment 180. The overlapping wall panel construction according to embodiment 179, wherein the first and second wall panels are secured to the support structure using a plurality of mechanical fasteners.

Embodiment 181. The overlapping wall panel construction according to embodiment 180, wherein a first mechanical fastener of the plurality of mechanical fasteners passes through the rear projection of the first wall panel and through the front projection of the second wall panel.

Embodiment 182. A method of installing an overlapping wall panel construction according to any of embodiments 163 to 180, the method comprising:
- placing the first wall panel adjacent to and coplanar with the second wall panel with the front projection of the second wall panel overlapping the rear projection of the first wall panel so as to form an overlapping joint and an interface between the front-facing attachment surface of the first wall panel and the rear-facing attachment surface of the front projection of the second wall panel;

providing joint adhesive in the interface between the front-facing attachment surface of the first wall panel and the rear-facing attachment surface of the second wall panel.

Embodiment 183. The method of installing an overlapping wall panel construction according to embodiment 182, wherein placing the first wall panel adjacent to and coplanar with the second wall panel includes:

securing the first wall panel to a support structure, placing the second wall panel against the support structure such that the front projection of the second wall panel overlaps the rear projection of the first wall panel, and securing the second wall panel to the support structure.

Embodiment 184. The method of installing an overlapping wall panel construction according to embodiment 183, wherein the first wall panel and second wall panel are secured to the support structure using mechanical fasteners.

Embodiment 185. The method of installing an overlapping wall panel construction according to embodiment 183 or embodiment 184, wherein providing joint adhesive in the interface includes applying the joint adhesive to the front-facing attachment surface of the first wall panel before placing the second wall panel against the support structure such that the front projection of the second wall panel overlaps the rear projection of the first wall panel.

Embodiment 186. The method of installing an overlapping wall panel construction according to any of embodiments 183 to 185, further comprising inserting a first mechanical fastener through the front projection of the second wall panel, the rear projection of the first wall panel and a frame member of the support structure.

What is claimed is:

1. A building surface system comprising:
a support structure;
a plurality of second press-on connectors disposed on a front side of the support structure, and
a plurality of building surface products secured to the support structure and arranged so as to provide a building surface, each building surface product of the plurality comprising:
a substantially planar gypsum panel having a first edge, a second edge, and two ends, wherein the gypsum panel includes:
a body comprising a front face, a rear face, and a thickness between the front face and the rear face, and
a first lapping projection extending outward from the body at the second edge, the first lapping projection being configured to overlap a portion of a neighboring gypsum panel so as to form a building surface; and
a first press-on connector disposed on the rear face of the body toward the first edge of the gypsum panel, the press-on connector being configured to engage a corresponding second press-on connector,
wherein the first press-on connector of each building surface product is coupled to at least one of the second press-on connectors,
wherein the first edge of the gypsum panel of each building surface product overlaps the first lapping projection of a neighboring building surface product, and wherein in each building surface product of the plurality the first edge includes a folded gypsum edge that is a flat fold including a first folded section adhered to the body of the gypsum panel along an angled slit, and wherein the body of the gypsum panel and the first folded section are covered by a continuous facing sheet.

2. The building surface system according to claim 1, wherein the first press-on connectors are snap-fit connectors and the second press-on connectors are second snap-fit connectors.

3. The building surface system according to claim 2, wherein each of the second snap-fit connectors includes a clip having a first flexible hook configured to engage a first flange of the first snap-fit connector and a second flexible hook configured to configured to engage a second flange of the first snap-fit connector.

4. The building surface system according to claim 1, wherein each of the second press-on connectors includes a support platform, and wherein each support platform provides a contact surface for a respective first lapping projection of a building surface product.

5. The building surface system according to claim 1, wherein the plurality of building surface products include a first building surface product and a second building surface product, and
wherein a joint between the first building surface product and the second building surface product is free of any joint compound.

6. The building surface system according to claim 1, wherein in each building surface product of the plurality, the gypsum panel comprises a reinforced gypsum material.

7. The building surface system according to claim 6, wherein in each building surface product of the plurality, the gypsum panel includes at least 1% by weight polymer.

8. The building surface product according to claim 6, wherein in each building surface product of the plurality, the gypsum panel includes at least 1% by weight of reinforcing fibers.

9. The building surface system according to claim 1, wherein each of the first snap-fit connectors includes a connector body and a first flange that extends laterally outward from the connector body, and wherein each of the second snap-fit connectors includes a clip having a first flexible hook configured to engage the first flange.

10. The building surface system according to claim 9, wherein each of the first snap-fit connectors includes a second flange that extends from the connector body in an opposite direction of the first flange, and wherein the second snap-fit connector includes a second flexible hook configured to engage the second flange.

11. The building surface system according to claim 9, wherein each first flexible hook includes an outer angled ramp surface configured to deflect the flexible hook as the first snap-fit connector is inserted into the clip.

12. The building surface system according to claim 9, wherein each first flexible hook includes a sharp inner edge configured to inhibit removal of the first snap-fit connector from the clip of the second snap-fit connector.

13. The building surface system according to claim 9, wherein each first flexible hook includes an angled inner edge configured to deflect the flexible hook as the first snap-fit connector is removed from the clip.

14. The building surface system according to claim 1, wherein in each building surface product of the plurality the first press-on connector is a first snap-fit connector and the corresponding second press-on connector is a second snap-fit connector.

15. The building surface system according to claim 14, wherein in each building surface product of the plurality the first snap-fit connector includes a connector body, a first flange that extends laterally outward from the connector body, and a second flange that extends from the connector body in an opposite direction of the first flange, and wherein the first and second flanges are configured to engage the second snap-fit connector.

16. The building surface system according to claim 15, wherein in each building surface product of the plurality the first snap-fit connector is in the form of a rail that extends along a length of the building surface product.

17. A building surface system comprising:
   a support structure;
   a plurality of second press-on connectors disposed on a front side of the support structure, and
   a plurality of building surface products secured to the support structure and arranged so as to provide a building surface, each building surface product of the plurality comprising:
      a substantially planar gypsum panel having a first edge, a second edge, and two ends, wherein the gypsum panel includes:
         a body comprising a front face, a rear face, and a thickness between the front face and the rear face, and
         a first lapping projection extending outward from the body at the second edge, the first lapping projection being configured to overlap a portion of a neighboring gypsum panel so as to form a building surface; and
         a first press-on connector disposed on the rear face of the body toward the first edge of the gypsum panel, the press-on connector being configured to engage a corresponding second press-on connector,
   wherein the first press-on connector of each building surface product is coupled to at least one of the second press-on connectors,
   wherein the first edge of the gypsum panel of each building surface product overlaps the first lapping projection of a neighboring building surface product, and
   wherein in each building surface product of the plurality the first edge includes a folded gypsum edge that is a corner fold including a first folded section and a second folded section, the first folded section being adhered to the body of the gypsum panel along a first angled slit and the second folded section being adhered to the first folded section along a second angled slit, and wherein the body of the gypsum panel, the first folded section, and the second folded section are all covered by a continuous facing sheet.

18. The building surface system according to claim 1, wherein the plurality of building surface products have different shapes that are arranged in a pattern, and wherein a first building surface product of the plurality has a first shape and a second building surface product of the plurality has a second shape different from the first.

19. The building surface system according to claim 1, wherein a joint between a first building surface product of the plurality and a second building surface product of the plurality is free of any joint compound.

20. The building surface system according to claim 1, wherein a front surface of a first building surface product of the plurality and a front surface of a second building surface product of the plurality are covered with a layer of paint.

21. The building surface system according to claim 20, wherein each of the first building surface product and the second building surface product includes a paper facing disposed at the front surface thereof, the paint being disposed against the facing.

22. The building surface system according to claim 17, wherein the plurality of building surface products include a first building surface product and a second building surface product, and wherein a joint between the first building surface product and the second building surface product is free of any joint compound.

* * * * *